(12) United States Patent
Chen et al.

(10) Patent No.: US 10,567,804 B2
(45) Date of Patent: Feb. 18, 2020

(54) CARRIAGE OF HEVC EXTENSION BITSTREAMS AND BUFFER MODEL WITH MPEG-2 SYSTEMS

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 14/591,649

(22) Filed: Jan. 7, 2015

(65) Prior Publication Data

US 2015/0195578 A1    Jul. 9, 2015

Related U.S. Application Data

(60) Provisional application No. 61/925,191, filed on Jan. 8, 2014.

(51) Int. Cl.
*H04N 19/187* (2014.01)
*H04N 19/31* (2014.01)
(Continued)

(52) U.S. Cl.
CPC ........... *H04N 19/70* (2014.11); *H04N 19/172* (2014.11); *H04N 19/30* (2014.11); *H04N 19/423* (2014.11);
(Continued)

(58) Field of Classification Search
CPC ...... H04N 19/70; H04N 19/172; H04N 19/30; H04N 19/423; H04N 19/44;
(Continued)

(56) References Cited

U.S. PATENT DOCUMENTS

2011/0267423 A1* 11/2011 Suh ................... H04N 21/21805
                                                        348/42
2012/0106921 A1* 5/2012 Sasaki ................ H04N 21/2362
                                                        386/230

(Continued)

FOREIGN PATENT DOCUMENTS

CN        102405646 A    4/2012
RU       2435235 C2   11/2011
(Continued)

OTHER PUBLICATIONS

Narasimhan et al: "Consideration of buffer management issues and layer management in HEVC scalability", 13. JCT-VC Meeting; 104. MPEG Meeting; Apr. 18, 2013-Apr. 26, 2013; Incheon; (Joint Collaborating Team on Video Coding of ISO/IEC JTC1/SC29/WG11 and ITU-T"SG. 16); URL: http://wftp3.itu.int/av-arch/jctvc-site/, No. JCTVC-M0254, Apr. 10, 2013 (Apr. 10, 2013).*

(Continued)

*Primary Examiner* — Jamie J Atala
*Assistant Examiner* — Patrick E Demosky
(74) *Attorney, Agent, or Firm* — Shumaker & Sieffert, P.A.

(57) ABSTRACT

A video decoder assembles, in a buffer model, an access unit from a plurality of elementary streams of a video data stream. The video data stream may be a transport stream or a program stream. The same buffer model is used regardless of whether the elementary streams contain Scalable High Efficiency Video Coding (SHVC), Multi-View HEVC (MV-HEVC), or 3D-HEVC bitstreams. Furthermore, the video decoder decodes the access unit.

28 Claims, 9 Drawing Sheets

(51) Int. Cl.
| | |
|---|---|
| *H04N 19/70* | (2014.01) |
| *H04N 19/172* | (2014.01) |
| *H04N 21/845* | (2011.01) |
| *H04N 21/24* | (2011.01) |
| *H04N 19/423* | (2014.01) |
| *H04N 21/2343* | (2011.01) |
| *H04N 21/44* | (2011.01) |
| *H04N 19/30* | (2014.01) |
| *H04N 19/44* | (2014.01) |
| *H04N 21/236* | (2011.01) |

(52) U.S. Cl.
CPC ..... *H04N 19/44* (2014.11); *H04N 21/234327* (2013.01); *H04N 21/2401* (2013.01); *H04N 21/44004* (2013.01); *H04N 21/8451* (2013.01); *H04N 21/236* (2013.01)

(58) Field of Classification Search
CPC ....... H04N 21/234327; H04N 21/2401; H04N 21/44004; H04N 21/8451; H04N 21/236
USPC .................................................. 375/240.26
See application file for complete search history.

(56) References Cited

U.S. PATENT DOCUMENTS

| | | | |
|---|---|---|---|
| 2013/0128990 A1 | 5/2013 | Narasimhan | |
| 2013/0182755 A1 | 7/2013 | Chen et al. | |
| 2015/0016547 A1* | 1/2015 | Tabatabai ............. | H04N 19/423 375/240.26 |
| 2015/0189322 A1* | 7/2015 | He ....................... | H04N 19/597 375/240.16 |

FOREIGN PATENT DOCUMENTS

| | | |
|---|---|---|
| WO | 2008084184 A2 | 7/2008 |
| WO | 2015009693 A1 | 1/2015 |

OTHER PUBLICATIONS

Gruneberg: "Text of ISO/IEC 13818-1:2007/FDAM3.2 Carriage of SVC in MPEG-2 Systems", 85. MPEG Meeting; Jul. 21, 2008-Jul. 25, 2008; Hannover; (Motion Picture Expert Group or ISO/IEC JTC1/SC29/WG11), No. N10059, Oct. 10, 2008 (Oct. 10, 2008), XP030016552.*
Narasimhan et al: "Consideration of buffer management issues and layer management in HEVC scalability", 13. JCT-VC Meeting; 104. MPEG Meeting; Apr. 18, 2013-Apr. 26, 2013; Incheon; (Joint Collaborating Team on Video Coding of ISO/IEC JTC1/SC29/WG11 and ITU-T"SG. 16); URL: http://wftp3.itu.int/av-arch/jctvc-site/.*
Gruneberg: "Text of ISO/IEC 13818-1:2007/FDAM3.2 Carriage of SVC in MPEG-2 Systems", 85. MPEG Meeting; Jul. 21, 2008-Jul. 25, 2008; Hannover; (Motion Picture Expert Group or ISO/IEC JTC1/SC29/WG11), No. N10059, Oct. 10, 2008 (Oct. 10, 2008), XP030016552 (Year: 2008).*
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Response to Second Written Opinion dated Dec. 10, 2015, from International Application No. PCT/US2015/010559, filed on Feb. 8, 2016, 29 pp.
Second Written Opinion from International Application No. PCT/US2015/010559, dated Dec. 10, 2015, 9 pp.
Response to Written Opinion dated Apr. 21, 2015, from International Application No. PCT/US2015/010559, filed on Oct. 30, 2015, 5 pp.
International Search Report and Written Opinion from International Application No. PCT/US2015/010559, dated Apr. 21, 2015, 15 pp.
Narasimhan , et al., "Consideration of Buffer Management Issues and Layer Management in HEVC Scalability", JCT-VC Meeting; MPEG Meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/ No. JCTVC-M0254, Apr. 10, 2013, 4 pp., XP030114211.
Tech, et al., "3D-HEVC Draft Text 1," JCT-VC Meeting; MPEG Meeting; (Joint Collaborative Team on Video Coding of ISO/IEC JTC1/SC29/WG11 and ITU-T SG.16 ); Jul. 27-Aug. 2, 2013; No. JCT3V-E1001_v3, Sep. 11, 2013; 89 pp.
Tech, et al. "MV-HEVC Draft Text 5," MPEG Meeting; (Joint Collaborative Team on Video Coding of ISO/IEC JTC1/SC29/WG11 and ITU-T SG.16 ); Jul. 27-Aug. 2, 2013; No. JCT3V-E1004_v6, Aug. 7, 2013; 65 pp.
Wang, et al., "High Efficiency Video Coding (HEVC) Defect Report," MPEG Meeting; (Joint Collaborative Team on Video Coding of ISO/IEC JTC1/SC29/WG11 and ITU-T SG.16 ); Jul. 25-Aug. 2, 2013; No. JCTVC-N1003_v1, Sep. 27, 2013; 311 pp.

(56) References Cited

OTHER PUBLICATIONS

Flynn, et al., "High Efficiency Video Coding (HEVC) Range Extensions text specification: Draft 4," JVT-MPEG Meeting; (Joint Collaborative Team on Video Coding of ISO/IEC JTC1/SC29/WG11 and ITU-T SG.16 ); Apr. 18-26, 2013; No. JCTVC-N1005_v1, Aug. 7, 2013; 322 pp.

Chen, et al., "High efficiency video coding (HEVC) scalable extension draft 3," JVT-MPEG Meeting; (Joint Collaborative Team on Video Coding of ISO/IEC JTC1/SC29/WG11 and ITU-T SG.16 ); Jul. 25-Aug. 2, 2013; No. JCTVC-N1008_v3, Sep. 16, 2013; 68 pp.

ITU-T H.222.0, Series H: Audiovisual and Multimedia Systems, Infrastructure of audiovisual services—Transmission multiplexing and synchronization, Information technology—Generic coding of moving pictures and associated audio information: systems, The International Telecommunication Union. Feb. 2000, 171 pp.

Flynn, et al., "High Efficiency Video Coding (HEVC) Range Extensions text specification: Draft 4," JVT-MPEG Meeting; (Joint Collaborative Team on Video Coding of ISO/IEC JTC1/SC29/WG11 and ITU-T SG.16 ); Apr. 18-26, 2013; No. JCTVC-N1005_v3, Aug. 8, 2013; 332 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pp.

Chen, et al., "Carriage of HEVC multi-layer Extension Streams over MPEG-2 Systems", MPEG Meeting; Jan. 13-17, 2014; San Jose; (Motion Picture Expert Group or ISO/IEC JTC1/SC29/WG11) No. m32295, Jan. 8, 2014, 7 pp.

Chen, et al., "Carriage of HEVC Extension Streams with MPEG-2 Systems", Mpeg Meeting; Oct. 28-Nov. 1, 2013; (Motion Picture Expert Group or ISO/IEC JTC1/SC29/WG11), No. m31430, XP030059882, Oct. 24, 2013, 6 pp.

"WD of ISO/IEC 13818-1:2013 AMD 7 Carriage of Layered HEVC", MPEG Meeting; Jan. 13-17, 2014; San Jose; (Motion Picture Expert Group or ISO/IEC JTC1/SC29/WG11) No. N14118, Feb. 13, 2014, 27 pp.

International Preliminary Report on Patentability from International Application No. PCT/US2015/010559, dated Apr. 20, 2016, 28 pp.

Office Action, and translation thereof, from counterpart Russian Patent Application No. 2016127197, dated Jul. 2, 2018, 11 pp.

Boyce J., et al., VPS Support for Out-of-Band Signaling and Hybrid Codec Scalability, Joint Collaborative Team on Video Coding (JCTVC), of ITU-T SG16 WP3 and ISO/IEC JTC1/SC29/WG11, JCTVCK0206, 11th Meeting: Shanghai, Oct. 10-19, 2012, 6 pages.

Information technology—Generic coding of moving pictures and associated audio information—Part 1: Systems Amendment 3, Amendment_ISO/IEC 13818-1:2013 FDAM 3_ISO/IEC JTC 1_Secretariat, ISO, Sep. 2013, 21 pages.

Series H: Audiovisual and Multimedia Systems, Rec. ITU-T H.222.0 | ISO/IEC 13818-1 Amendment 3, ITU-T Standard Documents (Series H), Mar. 2009, 28 pages.

Wang Y-K., Solutions Considered for NAL Unit Header and Video Parameter Set for HEVC extensions, JCTVC-J1007, Joint Collaborative Team on Video Coding (JCT-VC) of ITU-T, Jul. 2012, 8 pages.

* cited by examiner

CARRIAGE OF HEVC EXTENSION BITSTREAMS AND BUFFER MODEL WITH MPEG-2 SYSTEMS

This application claims the benefit of U.S. Provisional Patent Application 61/925,191, filed Jan. 8, 2014, the entire content of which is incorporated herein by reference.

TECHNICAL FIELD

This disclosure relates to video coding and, more particularly, to carriage of HEVC multi-layer extension bitstreams.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Various devices may implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. Multi-view HEVC (MV-HEVC), scalable HEVC (SHVC), and three-dimensional HEVC (3D-HEVC) are examples of multi-layer extensions to the HEVC standard.

SUMMARY

In general, this disclosure describes techniques for carriage of High-Efficiency Video Coding (HEVC) multi-layer extension bitstreams, including multiview HEVC (MV-HEVC), scalable HEVC (SHVC), and three-dimensional HEVC (3D-HEVC) extension bitstreams, with MPEG-2 systems. In accordance with one or more techniques of this disclosure, a video decoder assembles, in a buffer model, an access unit from a plurality of elementary streams of a data stream. The data stream may be a transport stream or a program stream. The same buffer model is used regardless of whether the elementary streams contain SHVC, MV-HEVC, or 3D-HEVC bitstreams. Furthermore, the video decoder decodes the access unit.

In one aspect, this disclosure describes a method of decoding video data, the method comprising: receiving a video data stream comprising a plurality of elementary streams; assembling, in a buffer model, an access unit from the plurality of elementary streams of the video data stream, wherein: the video data stream is a transport stream or a program stream, and the same buffer model is used to assemble the access unit regardless of whether the elementary streams contain any of a plurality of different types of multi-layer coded bitstream; and decoding the access unit, the access unit comprising one or more pictures of the video data.

In another aspect, this disclosure describes a video decoding device comprising: a memory configured to store video data; and one or more processors configured to: receive a video data stream comprising a plurality of elementary streams; assemble, in a buffer model, an access unit from the plurality of elementary streams of the video data stream, wherein: the video data stream is a transport stream or a program stream, and the same buffer model is used to assemble the access unit regardless of whether the elementary streams contain any of a plurality of different types of multi-layer coded bitstream; and decode the access unit, the access unit comprising one or more pictures of the video data.

In another aspect, this disclosure describes a video decoding device comprising: means for receiving a video data stream comprising a plurality of elementary streams; means for assembling, in a buffer model, an access unit from the plurality of elementary streams of the video data stream, wherein: the video data stream is a transport stream or a program stream, and the same buffer model is used to assemble the access unit regardless of whether the elementary streams contain any of a plurality of different types of multi-layer coded bitstream; and means for decoding the access unit, the access unit comprising one or more pictures of the video data.

In another aspect, this disclosure describes a computer-readable data storage medium having instructions stored thereon that, when executed, cause a video decoding device to: receive a video data stream comprising a plurality of elementary streams; assemble, in a buffer model, an access unit from the plurality of elementary streams of the video data stream, wherein: the video data stream is a transport stream or a program stream, and the same buffer model is used to assemble the access unit regardless of whether the elementary streams contain any of a plurality of different types of multi-layer coded bitstream; and decode the access unit, the access unit comprising one or more pictures of the video data.

The details of one or more aspects of the disclosure are set forth in the accompanying drawings and the description below. Other features, objects, and advantages of the techniques described in this disclosure will be apparent from the description, drawings, and from the claims.

DETAILED DESCRIPTION

Figure 1:
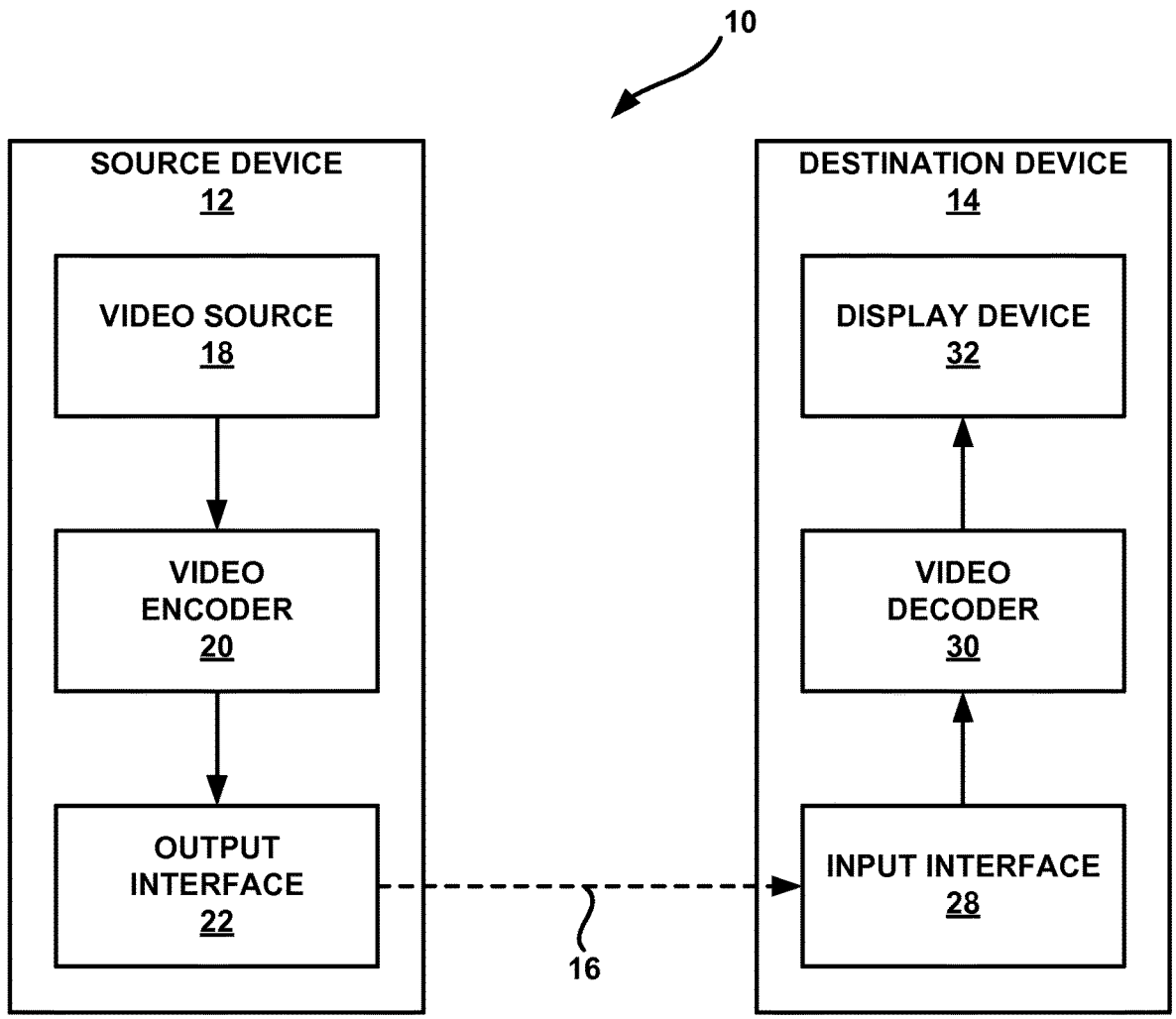
FIG. 1 is a block diagram illustrating an example video encoding and decoding system that may utilize the techniques of this disclosure.

This disclosure describes techniques for carriage of HEVC multi-layer extension bitstreams, including multiview HEVC (MV-HEVC), scalable HEVC (SHVC), and three-dimensional HEVC (3D-HEVC) extension bitstreams, with MPEG-2 systems. In MV-HEVC, multiple views may be coded, e.g., for different perspectives. In SHVC, multiple layers may be coded, e.g., to support spatial scalability, temporal scalability, or quality scalability. In 3D-HEVC, multiple views may be coded, e.g., with texture and depth components, to support 3D representations. In general, a view in MV-HEVC, a layer in SHVC, or a view in 3D-HEVC may each be generally referred to as a layer. Hence, SHVC, MV-HEVC, and 3D-HEVC may be collectively referred to as Layered HEVC or multi-layer HEVC coding techniques.

The MPEG-2 Systems specification describes how compressed multimedia (video and audio) data streams may be multiplexed together with other data to form a single data stream suitable for digital transmission or storage. The MPEG-2 Systems specification defines the concepts of a program stream and a transport stream. Program streams are biased for the storage and display of a single program from a digital storage service and a program stream is intended for use in error-free environments. In contrast, transport streams are intended for the simultaneous delivery of a number of programs over potentially error-prone channels. Program streams and transport streams include packetized elementary stream (PES) packets. The PES packets of program streams and transport streams belong to one or more elementary streams. An elementary stream is a single, digitally coded (possibly MPEG-compressed) component of a program. For example, the coded video or audio part of the program can be an elementary stream.

A video decoder receives the PES packets of program streams and transport streams. The video decoder may decode video data obtained from the PES packets. In Layered HEVC, an access unit (AU) may include pictures associated with the same time instance, but different layers. Prior to decoding the pictures of an access unit, the video decoder may need to reassemble encoded data corresponding to the access unit from data in the PES packets. In other words, the video decoder may need to have the encoded data corresponding to the access unit in a state ready for decoding.

Grüneberg et al., "Text of ISO/IEC 13818-1: 2013/Final Draft Amendment 3—Transport of HEVC video over MPEG-2 Systems," ISO/IEC JTC1/SC29/WG11 MPEG105/N13656, July 2013, Vienna, Austria (herein, "n13656" or "FDAM 3") describes the transport of HEVC video in MPEG-2 systems. Furthermore, Chen et al., "Carriage of HEVC extension streams with MPEG-2 Systems," MPEG input document m31430, the 106th MPEG meeting, October 2013, Geneva, Switzerland, MPEG input document m31430 (herein, "MPEG input document m31430"), proposed a basic design of the Carriage of HEVC extension streams with MPEG-2 Systems. HEVC extension streams are HEVC streams conforming to SHVC, MV-HEVC, and 3D-HEVC. Neither FDAM 3 nor MPEG input document m31430 describes how a video decoder reassembles access units of HEVC extension streams. For instance, neither FDAM 3 nor MPEG input document m31430 describes a buffer model that a video decoder can use for the reassembly of access units of HEVC extension streams.

In accordance with one or more techniques of this disclosure, the video decoder assembles, in a buffer model, an access unit from a plurality of elementary streams of a data stream, such as a transport stream or a program stream. The same buffer model is used regardless of whether the elementary streams contain SHVC, MV-HEVC, or 3D-HEVC bitstreams. The video decoder may then decode the access unit. By using a buffering model, the video decoder is able to marshall data from PES packets of a transport stream or program stream for reassembly into access units ready for decoding. Using a unified buffer model for SHVC, MV-HEVC, and 3D-HEVC may minimize the added complexity of the video decoder for supporting SHVC, MV-HEVC, and 3D-HEVC.

FIG. 1 is a block diagram illustrating an example video encoding and decoding system 10 that may be configured to utilize various techniques of this disclosure, such as techniques for carriage of HEVC multi-layer extension bitstreams, including multiview HEVC (MV-HEVC), scalable HEVC (SHVC), and three-dimensional HEVC (3D-HEVC) extension bitstreams, with MPEG-2 systems.

As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, televisions, cameras, display devices, digital media players, video gaming consoles, video streaming device, or the like. In some cases, source device 12 and destination device 14 may be equipped for wireless communication.

Destination device 14 may receive the encoded video data via computer-readable medium 16. Computer-readable medium 16 may comprise any type of medium or device capable of moving the encoded video data from source device 12 to destination device 14. In one example, computer-readable medium 16 may comprise a communication medium, such as a transmission channel, to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, such as a non-transitory computer-readable storage medium, i.e., a data storage device. Similarly, encoded data may be accessed from the storage device by input interface. The storage device may include any of a variety of distributed or locally accessed non-transitory data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device, e.g., via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of wired or wireless multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

This disclosure describes video encoder 20 and video decoder 30 in the context of HEVC coding extensions and, in particular, MV-HEVC, SHVC, and 3D-HEVC coding extensions. However, the techniques of this disclosure may be applicable to other video coding standards or methods. The techniques described in this disclosure may be performed by video encoder 20, video decoder 30, or other devices, such as splicing engines, media aware network elements, streaming servers, routers, and other devices that encode, decode, assemble, construct, extract or otherwise process coded video bitstreams.

The illustrated system 10 of FIG. 1 is merely one example. Techniques described in this disclosure may be performed by a digital video encoding and/or decoding device. Although generally the techniques of this disclosure are performed by video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some examples, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. ITU-T H.264|ISO/IEC 14496-10 defines the H.264/AVC video coding standard. Particular annexes of ITU-T H.264|ISO/IEC 14496-10 define extensions of the H.264/AVC video coding standard. For instance, Annex B of ITU-T H.264|ISO/IEC 14496-10 defines a byte stream format for H.264/AVC. Annex G of ITU-T H.264|ISO/IEC 14496-10 defines the SVC extension of H.264/AVC. Annex H of ITU-T H.264|ISO/IEC 14496-10 defines the MVC extension of H.264/AVC.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to the HEVC standard and, more particularly, the Multi-View HEVC (MV-HEVC), Scalable HEVC (SHVC), or 3D-HEVC extensions of the HEVC standard, as referenced in this disclosure. HEVC presumes several additional capabilities of video coding devices relative to devices configured to perform coding according to other processes, such as, e.g., ITU-T H.264/AVC. For example, whereas H.264 provides nine intra-prediction encoding modes, the reference model of HEVC may provide as many as thirty-five intra-prediction encoding modes.

A HEVC draft specification, Wang et al., Document JCTVC-N1003_v1, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, and referred to as "HEVC WD" or "HEVC" herein, is available from: http://phenix.int-evry.fr/jct/doc_end_user/documents/14_Vienna/wg11/JCTVC-N1003-v1.zip. Rec. ITU-T H.265|ISO/IEC 23008-2 is a final version of the HEVC standard.

The Joint Collaborative Team on 3D Video Coding Extension Development (JCT-3V) is developing the multiview extension to HEVC, namely MV-HEVC. A recent Working Draft (WD) of MV-HEVC, Tech et al., Document JCT3V-E1004-v6, Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013, referred to as "MV-HEVC WD5" or "MV-HEVC" herein, is available from: http://phenix.it-sudparis.eu/jct2/doc_end_user/documents/5_Vienna/wg11/JCT3V-E1004-v6.zip.

Tech et al., Document JCT3V-E1001-v3, Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013 (herein, "JCT3V-E1001" or "3D-HEVC") is a recent working draft of the 3D extension of HEVC, namely 3D-HEVC. JCT3V-E1001 is available from http://phenix.int-evey.fr/jct2/doc_end_user/documents/5_Vienna/wg11/JCT3V-E1001-v3.zip.

The JCT-VC is also developing a scalable extension to HEVC, named SHVC. Chen et al., Document JCTVC-N1008 v3, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 (herein, "SHVC WD3" or simply, "SHVC"), is a recent Working Draft (WD) of SHVC. SHVC WD3 is available from http://phenix.it-sudparis.eu/jct/doc_end_user/documents/14_Vienna/wg11/JCTVC-N1008-v3.zip.

Flynn et al., Document JCTVC-N1005_v1, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, document JCTVC-N1005, (herein, JCTVC-N1005) is a recent working draft of the range extension of HEVC. JCTVC-N1005 is available from http://phenix.int-evry.fr/jct/doc_end_user/documents/14_Vienna/wg11/JCTVC-N1005-v3.zip.

In general, HEVC specifies that a video picture (or "frame") may be divided into a sequence of largest coding units referred to as coding tree units (CTUs). A CTU may include corresponding luma and chroma components, referred to as coding tree blocks (CTB), e.g., luma CTB and chroma CTBs, including luma and chroma samples, respectively. Syntax data within a bitstream may define a size for the CTU, which is a largest coding unit in terms of the number of pixels. A slice includes a number of consecutive CTBs in coding order. A picture may be partitioned into one or more slices. Each CTB may be split into one or more coding units (CUs) according to a quadtree partitioning structure. In general, a quadtree data structure includes one node per CU, with a root node corresponding to the CTB. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs may be referred to as leaf-CUs although the 16×16 CU was never split.

A CU in HEVC has a similar purpose as a macroblock of the H.264 standard, except that a CU does not have a size distinction. For example, a CTB may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTB may be split, referred to as a maximum CU depth, and may also define a minimum size of the coding nodes. Accordingly, in some examples, a bitstream may also define a smallest coding unit.

A CU includes a coding node and one or more prediction units (PUs) and one or more transform units (TUs) associated with the coding node. This disclosure may use the term "block" to refer to any of a CU, prediction unit (PU), transform unit (TU), or partition thereof, in the context of HEVC, or similar data structures in the context of other standards. A size of the CU corresponds to a size of the coding node. The size of the CU may range from 8×8 pixels up to the size of the CTB with a maximum of 64×64 pixels or greater.

Syntax data associated with a CU may describe partitioning of the CU into one or more PUs. In general, a PU represents a spatial area corresponding to all or a portion of a CU. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

A PU may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU.

As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList 0 or RefPicList 1) for the motion vector.

HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N is the same size as the CU in which the PU resides. HEVC supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. For depth coding, JCT3V-E1001 further supports partitioning of PUs according to depth modeling modes (DMMs), including non-rectangular partitions, as will be described.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Syntax data associated with a CU may also describe partitioning of the CU into one or more TUs according to a quadtree. A TU can be square or non-square (e.g., rectangular) in shape. A TU of a CU may comprise a transform block of luma samples, two corresponding transform blocks of chroma samples, and syntax structures used to transform the transform block samples. In monochrome pictures or pictures having three separate color planes, a TU may comprise a single transform block and syntax structures used to transform the samples of the transform block. The HEVC standard allows for transformations according to TUs. Video encoder 20 may transform pixel difference values associated with the TUs to produce transform coefficients.

In some examples, the sizes of TUs of a CU are based on the sizes of PUs of the CU, although this may not always be the case. Furthermore, in some examples, the TUs are the same size or smaller than the PUs. Residual samples (i.e., pixel difference values) corresponding to a CU may be subdivided into smaller units (i.e., transform blocks) using a quadtree structure known as "residual quad tree" (RQT). In other words, a leaf-CU may include a quadtree indicating how the leaf-CU is partitioned into TUs. The root node of a TU quadtree (i.e., an RQT) generally corresponds to a leaf-CU. The leaf nodes of the RQT correspond to TUs. TUs of the RQT that are not split are referred to as leaf-TUs. In general, this disclosure uses the terms CU and TU to refer to a leaf-CU and leaf-TU, respectively, unless noted otherwise.

The TU may be specified using an RQT (also referred to as a TU quadtree structure), as discussed above. For example, a split flag may indicate whether a leaf-CU is split into four TUs. Then, each TU may be split further into further sub-TUs. When a TU is not split further, the TU may be referred to as a leaf-TU. In some examples, for intra coding, all the leaf-TUs belonging to a leaf-CU share the same intra prediction mode. That is, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Following regular intra predictive or inter predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs, for regular residual coding, may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the quantized transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive binary arithmetic coding (CABAC), as used in HEVC. Examples of other entropy coding processes include context-adaptive variable length coding (CAVLC), syntax-based context-adaptive binary arithmetic coding (SBAC), and Probability Interval Partitioning Entropy (PIPE) coding. Video encoder 20 may also entropy encode syntax elements associated with encoded video data for use by video decoder 30 in decoding video data.

A video sequence typically includes a series of pictures. As described herein, "picture" and "frame" may be used interchangeably. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

Video encoder 20 and/or video decoder 30 may perform intra-picture prediction coding of depth data and inter-prediction coding of depth data. In HEVC, assuming that the size of a CU is 2N×2N, video encoder 20 and video decoder 30 may support various PU sizes of 2N×2N or N×N for intra-prediction, and symmetric PU sizes of 2N×2N, 2N×N, N×2N, N×N, or similar sizes for inter-prediction. A video encoder and video decoder may also support asymmetric partitioning for PU sizes of 2N×nU, 2N×nD, nL×2N, and nR×2N for inter-prediction.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits.

Each of the NAL units may include a NAL unit header and may encapsulate an RBSP. The NAL unit header may include various syntax elements, such as a syntax element that indicates a NAL unit type code. Any syntax element contained in a NAL unit header may be referred to herein as a NAL unit header syntax element. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, etc.) may be referred to as parameter set NAL units. NAL units that contain SEI messages may be referred to as SEI NAL units. Supplemental Enhancement Information (SEI) contains information that is not necessary to decode the samples of coded pictures from VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20 to encode the video data. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component.

A texture view component (i.e., a texture picture) may be a coded representation of the texture of a view in a single access unit. A texture view may be a sequence of texture view components associated with an identical value of a view order index. A view order index of a view may indicate a camera position of the view relative to other views. A depth view component (i.e., a depth picture) may be a coded representation of the depth of a view in a single access unit. A depth view may be a set or sequence of one or more depth view components associated with an identical value of view order index.

In MV-HEVC, 3D-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of 3D video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a layer may be referred to as a "base layer" if a video decoder can decode pictures in the layer without reference to data of any other layer. The base layer may conform to the HEVC base specification (e.g., HEVC WD).

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

To implement the layers, headers of NAL units may include nuh_reserved_zero_6 bits syntax elements. In the HEVC WD, the nuh_reserved_zero_6 bits syntax element is reserved. However, in MV-HEVC, 3D-HEVC, and SVC, the nuh_reserved_zero_6 bits syntax element is referred to as the nuh_layer_id syntax element. The nuh_layer_id syntax element specifies an identifier of a layer. NAL units of a bitstream that have nuh_layer_id syntax elements that specify different values belong to different layers of the bitstream.

In some examples, the nuh_layer_id syntax element of a NAL unit is equal to 0 if the NAL unit relates to a base layer in multi-view coding (e.g., MV-HEVC), 3DV coding (e.g. 3D-HEVC), or scalable video coding (e.g., SHVC). If a NAL unit does not relate to a base layer in multi-view coding, 3DV, or scalable video coding, the nuh_layer_id syntax element of the NAL unit may have a non-zero value.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a layer may have a different temporal identifier. In general, if the temporal identifier of a first NAL unit of a layer is less than the temporal identifier of a second NAL unit of the same layer, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may correspond to a subset (e.g., a proper subset) of NAL units in the bitstream.

The MPEG-2 Systems specification describes how compressed multimedia (video and audio) data streams may be multiplexed together with other data to form a single data stream suitable for digital transmission or storage. The latest specification of MPEG-2 TS is the ITU-T recommendation H.222.0, 2012 June version (herein, "MPEG-2 TS"), wherein the support of advanced video coding (AVC) and AVC extensions are provided. Recently, the amendment of MPEG-2 TS for HEVC has been developed. The latest document is "Text of ISO/IEC 13818-1: 2013/Final Draft Amendment 3—Transport of HEVC video over MPEG-2 Systems," in MPEG output document N13656, July 2013.

The MPEG-2 Systems specification defines the concept of an elementary stream. Specifically, an elementary stream is a single, digitally coded (possibly MPEG-compressed) component of a program. For example, the coded video or audio part of the program can be an elementary stream. An elementary stream is firstly converted into a packetized elementary stream (PES) before being multiplexed into a program stream or transport stream. Within the same program, stream_id is used to distinguish the PES-packets belonging to one elementary stream from another.

Additionally, the MPEG-2 Systems specification defines the concepts of a program stream and a transport stream. Program streams and transport streams are two alternative multiplexes targeting on different applications. Program streams are biased for the storage and display of a single program from a digital storage service and a program stream is intended for use in error-free environments because it is rather susceptible to errors. In contrast, transport streams are intended for the simultaneous delivery of a number of programs over potentially error-prone channels. In general, a transport stream is a multiplex devised for multi-program applications such as broadcasting, so that a single transport stream can accommodate many independent programs. A program stream simply comprises the elementary streams belonging to it and usually contains packets with variable length packets.

In a program stream, PES-packets that are derived from the contributing elementary streams are organized into 'packs.' A pack comprises a pack-header, an optional system header, and any number of PES-packets taken from any of contributing elementary streams (i.e., elementary streams of the program stream), in any order. The system header contains a summary of the characteristics of the program stream such as: the maximum data rate of the program stream, the number of contributing video and audio elementary streams of the program stream, and further timing information. A decoder, such as decoder 30, may use the information contained in a system header to determine whether or not the decoder is capable of decoding the program stream.

A transport stream comprises a succession of transport packets. Transport packets are a type of PES-packets. Each of the transport packets is 188-bytes long. The use of short, fixed length packets in transport streams means that the transport streams are not as susceptible to errors as program streams. Further, processing the transport packet through a standard error protection process, such as Reed-Solomon encoding may give each 188-byte-long transport packet additional error protection. The improved error resilience of a transport stream means that the transport stream has a better chance of surviving error-prone channels, such as those found in a broadcast environment. Given the increased error resilience of transport streams and the ability to carry many simultaneous programs in a transport stream, it might seem that transport streams are clearly the better of the two multiplexes (i.e., program streams and transport streams). However, the transport stream is a more sophisticated multiplex than the program stream and is consequently more difficult to create and to demultiplex.

The first byte of a transport packet is a synchronization byte, which is 0x47. A single transport stream may carry many different programs, each comprising many packetised elementary streams. In addition, a transport packet includes a 13-bit Packet Identifier (PID) field. The PID field is used to distinguish transport packets containing the data of one elementary stream from transport packets carrying data of other elementary streams. It is the responsibility of the multiplexer to ensure that each elementary stream is awarded a unique PID value. The last byte of a transport packet is the continuity count field. The value of the continuity count field is incremented between successive transport packets belonging to the same elementary stream. Incrementing the value of the continuity count field enables a decoder, such as decoder 30, to detect the loss or gain of a transport packet and potentially conceal errors that might otherwise result from the loss or gain of a transport packet.

Although an elementary stream to which a transport packet belongs may be determined based on a PID value of the transport packet, a decoder may need to be able to determine which elementary streams belong to which program. Accordingly, program specific information explicitly specifies the relationship between programs and component elementary streams. For instance, the program specific information may specify a relationship between a program and elementary streams belonging to the program. The program specific information of a transport stream may include a program map table (PMT), a program association table (PAT), a conditional access table, and a network information table.

Every program carried in a transport stream is associated with a Program Map Table (PMT). A PMT is permitted to include more than one program. For instance, multiple programs carried in a transport stream may be associated with the same PMT. A PMT associated with a program gives details about the program and the elementary streams that comprise the program. For example, a program with number 3 may contain the video with PID 33, English audio with PID 57, Chinese audio with PID 60. In other words, in this example, the PMT may specify that an elementary stream whose transport packets include PID fields with values equal to 33 contains video of a program with a number (e.g., program_number) equal to 3, that an elementary stream whose transport packets include PID fields with values equal to 57 contains English audio of the program with number 3, and that an elementary stream whose transport packets include PID fields with values equal to 60 contains Chinese audio of the program with number 3.

A basic PMT may be embellished with some of the many descriptors specified within the MPEG-2 systems specification. In other words, a PMT may include one or more descriptors. The descriptors convey further information about a program or component elementary streams of the program. The descriptors may include video encoding parameters, audio encoding parameters, language identification information, pan-and-scan information, conditional access details, copyright information, and so on. A broadcaster or other user may define additional private descriptors, if required. In video related component elementary streams, there is also a hierarchy descriptor. The hierarchy descriptor provides information identifying the program elements containing components of hierarchically-coded video, audio, and private streams. The private streams may include metadata, such as a stream of program specific information. In general, a program element is one of the data or elementary streams that are included in a program (i.e., a component elementary stream of the program). In MPEG-2 transport streams, program elements are usually packetized. In MPEG-2 program streams, the program elements are not packetized.

Program-specific information of a program stream may include a program stream map (PSM). A PSM of a program stream provides a description of elementary streams in the program stream and the relationships of the elementary streams to one another. When carried in a Transport Stream this structure shall not be modified. The PSM is present as a PES packet when the stream_id value is 0xBC.

As indicated above, the program-specific information of a transport stream may include a program association table (PAT). The PAT of a transport stream contains a complete list of all the programs available in the transport stream. The PAT always has the PID value 0. In other words, transport packets having PID values equal to 0 contain the PAT. The PAT lists each respective program of a transport stream along with the PID value of the transport packets that contain the Program Map Table associated with the respective program. For instance, in the example PMT described above, the PAT may include information specifying that the PMT that specifies the elementary streams of program number 3 has a PID of 1001 and may include information specifying that another PMT has another PID of 1002. In other words, in this example, the PAT may specify that transport packets whose PID fields have values equal to 1001 contain the PMT of program number 3 and the PAT may specify that transport packets whose PID fields have values equal to 1002 contain the PMT of another program.

Furthermore, as indicated above, the program-specific information of a transport stream may include a network information table (NIT). The program number zero, specified in a PAT of a transport stream, has special meaning Specifically, program number 0 points to the NIT. The NIT of a transport stream is optional and when present, the NIT provides information about the physical network carrying the transport stream. For instance the NIT may provide information such as channel frequencies, satellite transponder details, modulation characteristics, service originator, service name and details of alternative networks available.

As indicated above, the program-specific information of a transport stream may include a conditional access table (CAT). A CAT must be present if any elementary stream within a transport stream is scrambled. The CAT provides details of the scrambling system(s) in use and provides the PID values of transport packets that contain the conditional access management and entitlement information. MPEG-2 does not specify the format of this information.

As indicated above, a PMT may include one or more descriptors that convey information about a program or compoenent elementary stream of a program. The one or more descriptors in a PMT may include a hierarchy descriptor. In MPEG-2 transport stream (TS), the hierarchy descriptor is designed to signal the hierarchy of the sub-bitstreams in different elementary streams. The hierarchy descriptor provides information to identify the program elements containing components of hierarchically-coded video, audio, and private streams. Table 2-49, below, shows a syntax of a hierarchy descriptor. The paragraphs following Table 2-49 describe semantics of the fields of the hierarchy descriptor.

TABLE 2-49

Hierarchy descriptor

| Syntax | No. of bits | Mnemonic |
|---|---|---|
| hierarchy_descriptor( ) { | | |
| descriptor_tag | 8 | uimsbf |
| descriptor_length | 8 | uimsbf |
| reserved | 1 | bslbf |
| temporal_scalability_flag | 1 | bslbf |
| spatial_scalability_flag | 1 | bslbf |
| quality_scalability_flag | 1 | bslbf |
| hierarchy_type | 4 | uimsbf |
| reserved | 2 | bslbf |

TABLE 2-49-continued

Hierarchy descriptor

| Syntax | No. of bits | Mnemonic |
|---|---|---|
| hierarchy_layer_index | 6 | uimsbf |
| tref_present_flag | 1 | bslbf |
| reserved | 1 | bslbf |
| hierarchy_embedded_layer_index | 6 | uimsbf |
| reserved | 2 | bslbf |
| hierarchy_channel | 6 | uimsbf |
| } | | | temporal_scalability_flag—A 1-bit flag, which when set to '0' indicates that the associated program element enhances the frame rate of the bit-stream resulting from the program element referenced by the hierarchy_embedded_layer_index. The value of '1' for this flag is reserved.

spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bit-stream resulting from the program element referenced by the hierarchy_embedded_layer_index. The value of '1' for this flag is reserved.

hierarchy_type—The hierarchical relation between the associated hierarchy layer and its hierarchy-embedded layer is defined in Table 2-50 (shown below). If scalability applies in more than one dimension, this field shall be set to the value of '8' ("Combined Scalability"), and the flags temporal_scalability_flag, spatial_scalability_flag and quality_scalability_flag shall be set accordingly. For MVC video sub-bitstreams, this field shall be set to the value of '9' ("MVC video sub-bitstream") and the flags temporal_scalability_flag, spatial_scalability_flag and quality_scalability_flag shall be set to '1'. For MVC base view sub-bitstreams, the hierarchy_type field shall be set to the value of '15' and the flags temporal_scalability_flag, spatial_scalability_flag and quality_scalability_flag shall be set to '1'.

hierarchy_layer_index—The hierarchy_layer_index is a 6-bit field that defines a unique index of the associated program element in a table of coding layer hierarchies. Indices shall be unique within a single program definition. For video sub-bitstreams of AVC video streams conforming to one or more profiles defined in Annex G of Rec. ITU-T H.264|ISO/IEC 14496-10, this is the program element index, which is assigned in a way that the bitstream order will be correct if associated SVC dependency representations of the video sub-bitstreams of the same access unit are re-assembled in increasing order of hierarchy_layer_index. For MVC video sub-bitstreams of AVC video streams conforming to one or more profiles defined in Annex H of Rec. ITU-T H.264|ISO/IEC 14496-10, this is the program element index, which is assigned in a way that the bitstream order will be correct if associated MVC view-component subsets of the MVC video sub-bitstreams of the same access unit are re-assembled in increasing order of hierarchy_layer_index.

tref_present_flag—A 1-bit flag, which when set to '0' indicates that the TREF field may be present in the PES packet headers in the associated elementary stream. The value of '1' for this flag is reserved.

hierarchy_embedded_layer_index—The hierarchy_embedded_layer_index is a 6-bit field that defines the hierarchy_layer_index of the program element that needs to be accessed and be present in decoding order before decoding of the elementary stream associated with this hierarchy_descriptor. The hierarchy_embedded_layer_index field is undefined if the hierarchy_type value is 15.

hierarchy_channel—The hierarchy_channel is a 6-bit field that indicates the intended channel number for the associated program element in an ordered set of transmission channels. The most robust transmission channel is defined by the lowest value of this field with respect to the overall transmission hierarchy definition. A given hierarchy_channel may at the same time be assigned to several program elements.

Table 2-50, below, describes the meaning of values of the hierarchy_type field of a hierarchy descriptor.

TABLE 2-50

Hierarchy_type field values

| Value | Description |
| --- | --- |
| 0 | Reserved |
| 1 | Spatial Scalability |
| 2 | SNR Scalability |
| 3 | Temporal Scalability |
| 4 | Data partitioning |
| 5 | Extension bitstream |
| 6 | Private Stream |
| 7 | Multi-view Profile |
| 8 | Combined Scalability |
| 9 | MVC video sub-bitstream |
| 10-14 | Reserved |
| 15 | Base layer or MVC base view sub-bitstream or AVC video sub-bitstream of MVC |

As indicated above, a PMT may include one or more descriptors that convey information about a program or compoenent elementary stream of a program. In MPEG-2 TS, two descriptors signal characteristics of the sub-bitstreams for SVC and MVC respectively: a SVC extension descriptor and an MVC extension descriptor. In addition, there is an MVC operation point descriptor that describes the characteristics of operation points. The syntax and semantics of the three descriptors are provided below.

For video sub-bitstreams of AVC video streams conforming to one or more profiles defined in Annex G of Rec. ITU-T H.264|ISO/IEC 14496-10, the SVC extension descriptor provides information about the AVC video stream resulting from re-assembling (up to) the associated video sub-bitstream and provides information about scalability and re-assembly of the associated video sub-bitstream. There may be one SVC extension descriptor associated with any of the video sub-bitstreams of an AVC video stream conforming to one or more profiles defined in Annex G of Rec. ITU-T H.264|ISO/IEC 14496-10. Table 2-96 describes the syntax of the SVC extension descriptor. The paragraphs following Table 2-96 describe the semantics of fields of the SVC extension descriptor.

TABLE 2-96

SVC extension descriptor

| Syntax | No. of bits | Mnemonic |
| --- | --- | --- |
| SVC_extension_descriptor( ) { | | |
|     descriptor_tag | 8 | uimsbf |
|     descriptor_length | 8 | uimsbf |
|     width | 16 | uimsbf |
|     height | 16 | uimsbf |

TABLE 2-96-continued

SVC extension descriptor

| Syntax | No. of bits | Mnemonic |
| --- | --- | --- |
|     frame_rate | 16 | uimsbf |
|     average_bitrate | 16 | uimsbf |
|     maximum_bitrate | 16 | uimsbf |
|     dependency_id | 3 | bslbf |
|     reserved | 5 | bslbf |
|     quality_id_start | 4 | bslbf |
|     quality_id_end | 4 | bslbf |
|     temporal_id_start | 3 | bslbf |
|     temporal_id_end | 3 | bslbf |
|     no_sei_nal_unit_present | 1 | bslbf |
|     reserved | 1 | bslbf |
| } | | | width—This 16-bit field indicates the maximum image width resolution, in pixels of the re-assembled AVC video stream.

height—This 16-bit field indicates the maximum image height resolution, in pixels of the re-assembled AVC video stream.

frame_rate—This 16-bit field indicates the maximum frame rate, in frames/256 seconds of the re-assembled AVC video stream.

average_bitrate—This 16-bit field indicates the average bit rate, in kbit per second, of the re-assembled AVC video stream.

maximum_bitrate—This 16-bit field indicates the maximum bit rate, in kbit per second, of the re-assembled AVC video stream.

dependency_id—This 3-bit field indicates the value of dependency_id associated with the video sub-bitstream.

quality_id_start—This 4-bit field indicates the minimum value of the quality_id of the NAL unit header syntax element of all the NAL units contained in the associated video sub-bitstream. The quality_id specifies a quality identifier for the NAL unit.

quality_id_end—This 4-bit field indicates the maximum value of the quality_id of the NAL unit header syntax element of all the NAL units contained in the associated video sub-bitstream.

temporal_id_start—This 3-bit field indicates the minimum value of the temporal_id of the NAL unit header syntax element of all the NAL units contained in the associated video sub-bitstream.

temporal_id_end—This 3-bit field indicates the maximum value of the temporal_id of the NAL unit header syntax element of all the NAL units contained in the associated video sub-bitstream.

no_sei_nal_unit_present—This 1-bit flag when set to '1' indicates that no SEI NAL units are present in the associated video sub-bitstream. In case the no_sei_nal_unit_present flag is set to '1' for all SVC video sub-bitstreams and is not set to '1' or not present for the AVC video sub-bitstream of SVC, any SEI NAL units, if present, are included in the AVC video sub-bitstream of SVC. If the SVC extension descriptor is absent for all video sub-bitstreams, SEI NAL units may be present in any SVC dependency representation of an SVC video sub-bitstream, and may require reordering to the order of NAL units within an access unit as defined in Rec. ITU-T H.264|ISO/IEC 14496-10 before access unit re-assembling.

For MVC video sub-bitstreams of AVC video streams conforming to one or more profiles defined in Annex H of Rec. ITU-T H.264|ISO/IEC 14496-10, the MVC extension descriptor provides information about the AVC video stream resulting from re-assembling (up to) the associated MVC video sub-bitstream and provides information about the contained MVC video sub-bitstream and for the re-assembly of the associated MVC video sub-bitstream. There may be one MVC extension descriptor associated with any of the MVC video sub-bitstreams (with stream_type equal to 0x20) of an AVC video stream conforming to one or more profiles defined in Annex H of Rec. ITU-T H.264|ISO/IEC 14496-10. When the MVC video sub-bitstream is an MVC base view sub-bitstream, the MVC extension descriptor shall be present in the associated PMT or PSM for stream_type equal to 0x1B. Table 2-97 describes the syntax of the MVC extension descriptor. The paragraphs following Table 2-97 describe semantics of particular fields of the MVC extension descriptor.

TABLE 2-97

MVC extension descriptor

| Syntax | No. of bits | Mnemonic |
|---|---|---|
| MVC_extension_descriptor( ) { | | |
|   descriptor_tag | 8 | Uimsbf |
|   descriptor_length | 8 | Uimsbf |
|   average_bit_rate | 16 | Uimsbf |
|   maximum_bitrate | 16 | Uimsbf |
|   reserved | 4 | Bslbf |
|   view_order_index_min | 10 | Bslbf |
|   view_order_index_max | 10 | Bslbf |
|   temporal_id_start | 3 | Bslbf |
|   temporal_id_end | 3 | Bslbf |
|   no_sei_nal_unit_present | 1 | Bslbf |
|   no_prefix_nal_unit_present | 1 | Bslbf |
| } | | | average_bitrate—This 16-bit field indicates the average bit rate, in kbits per second, of the re-assembled AVC video stream. When set to 0, the average bit rate is not indicated.

maximum_bitrate—This 16-bit field indicates the maximum bit rate, in kbits per second, of the re-assembled AVC video stream. When set to 0, the maximum bit rate is not indicated.

view_order_index_min—This 10-bit field indicates the minimum value of the view order index of all the NAL units contained in the associated MVC video sub-bitstream.

view_order_index_max—This 10-bit field indicates the maximum value of the view order index of all the NAL units contained in the associated MVC video sub-bitstream.

temporal_id_start—This 3-bit field indicates the minimum value of the temporal_id of the NAL unit header syntax element of all the NAL units contained in the associated MVC video sub-bitstream.

temporal_id_end—This 3-bit field indicates the maximum value of the temporal_id of the NAL unit header syntax element of all the NAL units contained in the associated MVC video sub-bitstream.

no_sei_nal_unit_present—This 1-bit flag when set to '1' indicates that no SEI NAL units are present in the associated video sub-bitstream. In case the no_sei_nal_unit_present flag is set to '1' for all MVC video sub-bitstreams and is not set to '1' or not present for the AVC video sub-bitstream of MVC, any SEI NAL units, if present, are included in the AVC video sub-bitstream of MVC. If the MVC extension descriptor is absent for all MVC video sub-bitstreams, SEI NAL units may be present in any MVC view-component subset of an MVC video sub-bitstream, and may require reordering to the order of NAL units within an access unit as defined in Rec. ITU-T H.264|ISO/IEC 14496-10 before access unit re-assembling.

no_prefix_nal_unit_present—This 1-bit flag when set to '1' indicates that no prefix NAL units are present in either the AVC video sub-bitstream of MVC or MVC video sub-bitstreams. When this bit is set to '0', it indicates that prefix NAL units are present in the AVC video sub-bitstream of MVC only.

The MVC operation point descriptor indicate profile and level information for one or more operation points.

Each of the one or more operation points is constituted by a set of one or more MVC video sub-bitstreams. If present, the MVC operation point descriptor shall be included in the group of data elements following immediately the program_info_length field in the program_map_section. If an MVC operation point descriptor is present within a program description, at least one hierarchy descriptor shall be present for each MVC video sub-bitstream present in the same program. In order to indicate different profiles, one MVC operation point descriptor per profile is needed. Table 2-100 specifies the syntax of the MVC operation point descriptor. The paragraphs following Table 2-100 describe semantics of fields of the MVC operation point descriptor.

TABLE 2-100

MVC operation point descriptor

| Syntax | No. of bits | Mnemonic |
|---|---|---|
| MVC_operation_point_descriptor( ) { | | |
|   descriptor_tag | 8 | uimsbf |
|   descriptor_length | 8 | uimsbf |
|   profile_idc | 8 | uimsbf |
|   constraint_set0_flag | 1 | bslbf |
|   constraint_set1_flag | 1 | bslbf |
|   constraint_set2_flag | 1 | bslbf |
|   constraint_set3_flag | 1 | bslbf |
|   constraint_set4_flag | 1 | bslbf |
|   constraint_set5_flag | 1 | bslbf |
|   AVC_compatible_flags | 2 | bslbf |
|   level_count | 8 | uimsbf |
|   for ( recommendation =0; recommendation < level_count; i++ ) { | | |
|     level_idc | 8 | uimsbf |
|     operation_points_count | 8 | uimsbf |
|     for ( j =0; j< operation_points_count; j++ ) { | | |
|       reserved | 5 | bslbf |
|       applicable_temporal_id | 3 | uimsbf |
|       num_target_output_views | 8 | uimsbf |
|       ES_count | 8 | uimsbf |
|       for ( k =0; k< ES_count; k++ ) { | | |
|         reserved | 2 | bslbf |
|         ES_reference | 6 | uimsbf |
|       } | | |
|     } | | |
|   } | | |
| } | | | profile_idc—This 8-bit field indicates the profile, as defined in Rec. ITU-T H.264|ISO/IEC 14496-10, of all operation points described within this descriptor for the MVC bitstream.

constraint_set0_flag, constraint_set1_flag, constraint_set2_flag, constraint_set3_flag, constraint_set4_flag, constraint_set5_flag—These fields shall be coded according to the semantics for these fields defined in Rec. ITU-T H.264|ISO/IEC 14496-10.

AVC_compatible_flags—The semantics of AVC_compatible_flags are exactly equal to the semantics of the field(s) defined for the 2 bits between the constraint_set2 flag and the level_idc field in the sequence parameter set, as defined in Rec. ITU-T H.264|ISO/IEC 14496-10.

level_count—This 8-bit field indicates the number of levels for which operation points are described.

level_idc—This 8-bit field indicates the level, as defined in Rec. ITU-T H.264|ISO/IEC 14496-10, of the MVC bitstream for the operation points described by the following groups of data elements.

operation_points_count—This 8-bit field indicates the number of operation points described by the list included in the following group of data elements.

applicable_temporal_id—This 3-bit field indicates the highest value of the temporal_id of the VCL NAL units in the re-assembled AVC video stream.

num_target_output_views—This 8-bit field indicates the value of the number of the views, targeted for output for the associated operation point.

ES_count—This 8-bit field indicates the number of ES_reference values included in the following group of data elements. The elementary streams indicated in the following group of data elements together form an operation point of the MVC video bitstream. The value 0xff is reserved.

ES_reference—This 6-bit field indicates the hierarchy layer index value present in the hierarchy descriptor which identifies a video sub-bitstream. The profile and level for a single operation point, e.g., the entire MVC video bitstream, can be signalled using the AVC video descriptor. Beyond that, MVC allows for decoding different view subsets which can require different profiles and/or levels. The specification of the MVC operation point descriptor supports the indication of different profiles and levels for multiple operation points.

For an HEVC video stream, an HEVC video descriptor provides basic information for identifying coding parameters, such as profile and level parameters, of that HEVC video stream. For an HEVC temporal video sub-bitstream or an HEVC temporal video subset, the HEVC video descriptor provides information such as the associated HEVC highest temporal sub-layer representation contained in the elementary stream to which it applies. An HEVC temporal video sub-bitstream that contains all VCL NAL units and associated non-VCL NAL units of the temporal sub-layer, as specified in Rec. ITU-T H.265|ISO/IEC 23008-2, associated to TemporalId equal to 0 and which may additionally contain all VCL NAL units and associated non-VCL NAL units of all temporal sub-layers associated to a contiguous range of TemporalId from 1 to a value equal to or smaller than sps_max_sub_layers_minus1 included in the active sequence parameter set, as specified in Rec. ITU-T H.265|ISO/IEC 23008-2. An HEVC temporal video subset contains all VCL NAL units and the associated non-VCL NAL units of one or more temporal sub-layers, with each temporal sub-layer not being present in the corresponding HEVC temporal video sub-bitstream and TemporalId associated with each temporal sub-layer forming a contiguous range of values.

Table X-1, below, shows the syntax of the HEVC video descriptor. The paragraphs following Table X-1 provide semantic definitions of fields in the HEVC video descriptor.

TABLE X-1

| HEVC video descriptor | | |
|---|---|---|
| Syntax | No. Of bits | Mnemonic |
| HEVC_descriptor( ) { | | |
|   descriptor_tag | 8 | uimsbf |
|   descriptor_length | 8 | uimsbf |

TABLE X-1-continued

| HEVC video descriptor | | |
|---|---|---|
| Syntax | No. Of bits | Mnemonic |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_idc | 8 | uimsbf |
|   temporal_layer_subset_flag | 1 | bslbf |
|   HEVC_still_present_flag | 1 | bslbf |
|   HEVC_24hr_picture_present_flag | 1 | bslbf |
|   reserved | 5 | bslbf |
|   if ( temporal_layer_subset_flag == '1') { | | |
|     reserved | 5 | bslbf |
|     temporal_id_min | 3 | uimsbf |
|     reserved | 5 | bslbf |
|     temporal_id_max | 3 | uimsbf |
|   } | | |
| } | | | profile_space, tier_flag, profile_idc, profile_compatibility_indication, progressive_source_flag, interlaced_source_flag, non_packed_constraint_flag, frame_only_constraint_flag, reserved_zero_44 bits, level_idc—When the HEVC video descriptor applies to an HEVC video stream or to an HEVC complete temporal representation, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlacedsource_flag, general_non_packed_constraint_flag, general_frame_only_constraint_flag, general_reserved_zero_44 bits, general_level_idc, respectively, for the corresponding HEVC video stream or HEVC complete temporal representation, and the entire HEVC video stream or HEVC complete temporal representation to which the HEVC video descriptor is associated shall conform to the information signaled by these fields.

When the HEVC video descriptor applies to an HEVC temporal video sub-bitstream or HEVC temporal video subset of which the corresponding HEVC highest temporal sub-layer representation is not an HEVC complete temporal representation (i.e., a sub-layer representation as defined in Rec. ITU-T H.265|ISO/IEC 23008-2 that contains all temporal sub-layers up to the temporal sub-layer with TemporalId equal to sps_max_sub_layers_minus1+1 as included in the active sequence parameter set, as specified in Rec. ITU-T H.265|ISO/IEC 23008-2), profile_space, tier_flag, profile_idc, profile_compatibility_indication, progressive_source_flag, interlaced_source_flag, non_packed_constraint_flag, frame_only_constraint_flag, reserved_zero_44 bits, level_idc shall be coded according to semantics defined in Rec. ITU-T H.265|ISO/IEC 23008-2 for sub_layer_profile_space, sub_layer_tier_flag, sub_layer_profile_idc, sub_layer_profile_compatibility_flag[i], sub_layer_progressive_source_flag, sub_layer_interlaced_source_flag, sub_layer_non_packed_constraint_flag, sub_layer_frame_only_constraint_flag, sub_layer_reserved_zero_44 bits, sub_layer_level_idc, respectively, for the corresponding HEVC highest temporal sub-layer representation, and the entire HEVC highest temporal sub-layer representation to which the HEVC video descriptor is associated shall conform to the information signalled by these fields. An HEVC complete temporal representation is a sub-layer representation as defined in Rec. ITU-T H.265|ISO/IEC 23008-2 that contains all temporal sub-layers up to the temporal sub-layer with TemporalId equal to sps_max_sub_layers_minus1+1 as included in the active sequence parameter set, as specified in Rec. ITU-T H.265|ISO/IEC 23008-2. An HEVC highest temporal sub-layer representation is a sub-layer representation of the temporal sub-layer with the highest value of TemporalId, as defined in Rec. ITU-T H.265|ISO/IEC 23008-2, in the associated HEVC temporal video sub-bitstream or HEVC temporal video subset.

NOTE X2—In one or more sequences in the HEVC video stream the level may be lower than the level signalled in the HEVC video descriptor, while also a profile may occur that is a subset of the profile signalled in the HEVC video descriptor. However, in the entire HEVC video stream, only subsets of the entire bitstream syntax shall be used that are included in the profile signalled in the HEVC video descriptor, if present. If the sequence parameter sets in an HEVC video stream signal different profiles, and no additional constraints are signalled, then the stream may need examination to determine which profile, if any, the entire stream conforms to. If an HEVC video descriptor is to be associated with an HEVC video stream that does not conform to a single profile, then the HEVC video stream should be partitioned into two or more sub-streams, so that HEVC video descriptors can signal a single profile for each such sub-stream.

temporal_layer_subset_flag—This 1-bit flag, when set to '1', indicates that the syntax elements describing a subset of temporal layers are included in this descriptor. This field shall be set to 1 for HEVC temporal video subsets and for HEVC temporal video sub-bitstreams. When set to '0', the syntax elements temporal_id_min and temporal_id_max are not included in this descriptor.

HEVC_still_present_flag—This 1-bit field, when set to '1', indicates that the HEVC video stream or the HEVC highest temporal sub-layer representation may include HEVC still pictures. When set to '0', then the associated HEVC video stream shall not contain HEVC still pictures.

NOTE X3—According to Rec. ITU-T H.265|ISO/IEC 23008-2, IDR pictures are always associated to a TemporalId value equal to 0, Consequently, if the HEVC video descriptor applies to an HEVC temporal video subset, HEVC still pictures can only be present in the associated HEVC temporal video sub-bitstream.

HEVC_24_hour_picture_present_flag—This 1-bit flag, when set to '1', indicates that the associated HEVC video stream or the HEVC highest temporal sub-layer representation may contain HEVC 24-hour pictures. For the definition of an HEVC 24-hour picture, see 2.1.97 of Information Technology—Generic Coding of Moving Pictures and Associated Audio Information: Systems, Amendment 3, Transport of HEVC video over MPEG-2 systems. If this flag is set to '0', the associated HEVC video stream shall not contain any HEVC 24-hour picture.

temporal_id_min—This 3-bit field indicates the minimum value of the TemporalId, as defined in Rec. ITU-T H.265|ISO/IEC 23008-2, of all HEVC access units in the associated elementary stream.

temporal_id_max—This 3-bit field indicates the maximum value of the TemporalId, as defined in Rec. ITU-T H.265|ISO/IEC 23008-2, of all HEVC access units in the associated elementary stream.

Chen et al., "Carriage of HEVC extension streams with MPEG-2 Systems," MPEG input document m31430, the 106th MPEG meeting, October 2013, Geneva, Switzerland, MPEG input document m31430 (herein, "MPEG input document m31430"), proposed a basic design of the Carriage of HEVC extension streams with MPEG-2 Systems. Specifically, MPEG input document m31430 proposed that sub-bitstreams are assembled together to form operation points. This assembling of the sub-bitstreams is generic and works for any HEVC multi-layer extension standard, such as SHVC, MV-HEVC or even 3D-HEVC.

Some basic design principles of MPEG input document m31430 are summarized as follows. First, the hierarchy descriptor in Grüneberg et al., "Text of ISO/IEC 13818-1: 2013/Final Draft Amendment 3—Transport of HEVC video over MPEG-2 Systems," ISO/IEC JTC1/SC29/WG11 MPEG105/N13656, July 2013, Vienna, Austria (herein, "n13656" or "FDAM 3") is used to form a hierarchy of temporal sub-layers. Similarly, the hierarchy descriptor is used only for temporal scalability when multiple layers are involved.

A second design principle comprises the introduction, in MPEG input document m31430, of a new descriptor, namely a hierarchy extension descriptor, to form a hierarchy of layers (e.g., views, base layers, enhancement layers). Particularly, the hierarchy extension descriptor provides information to identify program elements containing components of hierarchically-coded video, audio, and private streams. MPEG input document m31430 assumes that each elementary stream contains no more than one layer. Therefore, the hierarchy extension descriptor concerns only an elementary stream corresponding to one unique layer. The syntax and semantics of the hierarchy extension descriptor, as presented in document m31430, are reproduced below.

TABLE 2-49

Hierarchy extension descriptor

| Syntax | No. of bits | Mnemonic |
|---|---|---|
| hierarchy_extension_descriptor( ) { | | |
|     descriptor_tag | 8 | uimsbf |
|     descriptor_length | 8 | uimsbf |
|     extension_dimension_bits | 16 | bslbf |
|     hierarchy_layer_index | 6 | uimsbf |
|     temporal_id | 3 | uimsbf |
|     nuh_layer_id | 6 | uimsbf |
|     tref_present_flag | 1 | bslbf |
|     num_embedded_layers | 6 | uimsbf |
|     hierarchy_channel | 6 | uimsbf |
|     reserved | 4 | bslbf |
|     for( i = 0 ; i < num_embedded_layers ; i++ ) { | | |
|         hierarchy_ext_embedded_layer_index | 6 | uimsbf |
|         reserved | 2 | bslbf |
|     } | | |
| } | | |

2.6.98 Semantic Definition of Fields in Hierarchy Extension Descriptor

When hierarchy extension descriptor is present, it is used to specify the dependency of layers present in different elementary streams. The aggregation of temporal sub-layers, however, is realized by hierarchy descriptor, as specified in Amd. 3 of ISO/IEC 13818-1.

extension_dimension_bits—A 16-bit field indicating the possible enhancement of the associated program element from the base layer resulting from the program element of the layer with nuh_layer_id equal to 0.

The allocation of the bits to enhancement dimensions is as follows.

| Index to bits | Description |
|---|---|
| 0 | Multi-view enhancement |
| 1 | Spatial scalability, including SNR |
| 2 | depth enhancement |
| 3 | AVC base layer |
| 4 | MPEG-2 base layer |
| 3~15 | Reserved |

The i-th bit equal to 1 indicates the corresponding enhance dimension is present.

hierarchy_layer_index—The hierarchy_layer_index is a 6-bit field that defines a unique index of the associated program element in a table of coding layer hierarchies. Indices shall be unique within a single program definition. For video sub-bitstreams of HEVC video streams conforming to one or more profiles defined in Annex G or H of Rec. ITU-T H.265|ISO/IEC 23008-2, this is the program element index, which is assigned in a way that the bitstream order will be correct if associated dependency layers of the video sub-bitstreams of the same access unit are re-assembled in increasing order of hierarchy_layer_index.

tref_present_flag—A 1-bit flag, which when set to '0' indicates that the TREF field may be present in the PES packet headers in the associated elementary stream. The value of '1' for this flag is reserved.

nuh_layer_id—A 6-bit field specifies the highest nuh_layer_id of the NAL units in the elementary stream associated with this hierarchy_extension_descriptor( ).

temporal_id—A 3-bit field specifies the highest TemporalId of the NAL units in the elementary stream associated with this hierarchy_extension_descriptor( ).

num_embedded_layers—A 6-bit field that specifies the number of direct dependent program elements that needs to be accessed and be present in decoding order before decoding of the elementary stream associated with this hierarchy_extension_descriptor( ).

hierarchy_ext_embedded_layer_index—The hierarchy_ext_embedded_layer_index is a 6-bit field that defines the hierarchy_layer_index of the program element that needs to be accessed and be present in decoding order before decoding of the elementary stream associated with this hierarchy_extension_descriptor. This field is undefined if the hierarchy_type value is 15.

hierarchy_channel—The hierarchy_channel is a 6-bit field that indicates the intended channel number for the associated program element in an ordered set of transmission channels. The most robust transmission channel is defined by the lowest value of this field with respect to the overall transmission hierarchy definition.

NOTE—A given hierarchy_channel may at the same time be assigned to several program elements.

A third design principle is that the hierarchy extension descriptor contains a generic design for signaling scalability types similar as in VPS extension of MV-HEVC/SHVC coding specifications. In addition, multiple dependent elementary streams may be signaled for the current elementary stream.

A fourth design principle is the proposal of an HEVC extension descriptor. The HEVC extension descriptor can be included as part of the HEVC video descriptor as in FDAM 3. The HEVC extension descriptor signals operation points, each of which corresponds to an output layer set in MV-HEVC/SHVC. An output layer set is a set of layers of a bitstream that are to be output. The bitstream may also include reference layers that a video decoder does not output, but are used by the video decoder to decode the output layer set. The composition of the operation points relies on the hierarchy extension descriptor, by specifying the layers that belong to the output layer set. The characteristics of each operation point, including profile, tier, and level, as well as bitrate and frame rate are signaled in this descriptor.

In general, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

A syntax of the HEVC extension descriptor as described in m31430 is reproduced below. The paragraphs following Table X provide semantics of the HEVC extension descriptor.

TABLE X

HEVC extension descriptor

| Syntax | No. Of bits | Mnemonic |
|---|---|---|
| HEVC_extension_descriptor( ) { | | |
|     descriptor_tag | 8 | uimsbf |
|     descriptor_length | 8 | uimsbf |
|     num_operation_points | 8 | uimsbf |
|     for( i=0; i < num_operation_points; i++) { | | bslbf |
|         profile_space | 2 | uimsbf |
|         tier_flag | 1 | bslbf |
|         profile_idc | 5 | uimsbf |
|         profile_compatibility_indication | 32 | bslbf |
|         progressive_source_flag | 1 | bslbf |
|         interlaced_source_flag | 1 | bslbf |
|         non_packed_constraint_flag | 1 | bslbf |
|         frame_only_constraint_flag | 1 | bslbf |
|         reserved_zero_44bits | 44 | bslbf |
|         level_idc | 8 | bslbf |
|         max_temporal_id | 3 | bslbf |
|         reserved_zero_5bits | 5 | bslbf |
|         for (j =0 ; j < 64 ; j++) | | |
|             hevc_output_layer_flag | 1 | bslbf |
|         average_bit_rate | 16 | |
|         maximum_bitrate | 16 | bslbf |
|         frame_rate | 16 | uimsbf |
|     } | | uimsbf |
| } | | uimsbf | num_operation_points—An 8-bit field specifies the number of specified operation points in this descriptor.

profile_space—A 2-bit field specifies the context for the interpretation of profile_idc for all values of i in the range of 0 to 31, inclusive. profile_space shall not be assigned values other than those specified in Annex A or subclause G.11 or in subclause H.11 of Rec. ITU-T H.265|ISO/IEC 23008-2. Other values of profile_idc are reserved for future use by ITU-T|ISO/IEC.

tier_flag—A 1-bit field specifies the tier context for the interpretation of level_idc as specified in Annex A or subclause G.11 or subclause H.11 of Rec. ITU-T H.265|ISO/IEC 23008-2.

profile_idc—A 5-bit field that when profile_space is equal to 0, indicates a profile to which the CVS conforms as specified in Annex A or of Rec. ITU-T H.265|ISO/IEC 23008-2. profile_idc shall not be assigned values other than those specified in Annex A or G.11 or H.11 of Rec. ITU-T H.265|ISO/IEC 23008-2. Other values of profile_idc are reserved for future use by ITU-T|ISO/IEC.

profile_compatibility_indication, progressive_source_flag, interlaced_source_flag, non_packed_constraint_flag, frame_only_constraint_flag, reserved_zero_44 bits, level_idc—When the HEVC extension video descriptor applies to an HEVC extension video stream, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, general_level_idc, respectively, for the corresponding HEVC video stream or HEVC extension video stream or HEVC complete temporal representation, and the entire HEVC video stream or HEVC complete temporal representation to which the HEVC video descriptor is associated shall conform to the information signaled by these fields.

level_idc—A 8-bit field indicates a level to which the CVS conforms as specified in Annex A, G.11 or H.11 of Rec. ITU-T H.265|ISO/IEC 23008-2. level_idc shall not be assigned values of level_idc other than those specified in Annex A, G.11 or H.11 of Rec. ITU-T H.265|ISO/IEC 23008-2. Other values of level_idc are reserved for future use by ITU-T|ISO/IEC.

max_temporal_id—A 3-bit field specifies the highest TemporalId of the NAL units of the layers in the i-th operation point.

reserved_zero_5 bits—A 5-bit field reserved of value '0'.

hevc_output_layer_flag—A 1-bit field when assigned value '1' indicates that layer with nuh_layer_id equal to i belongs to an output layer set and is required for output when the i-th operation point is decoded. When assigned value '0', the layer with nuh_layer_id equal to i does not belong to an output layer set. When the i-th hevc_output_layer_flag is equal to '1', the value of the i-th hevc_layer_present_flag shall be equal to '1'.

average_bitrate—A 16-bit field indicates the average bit rate, in kbit per second, of the HEVC extension video stream corresponding to the i-th operation point.

maximum_bitrate—A 16-bit field indicates the maximum bit rate, in kbit per second, of the HEVC extension video stream corresponding to the i-th operation point.

frame_rate—A 16-bit field indicates the maximum frame rate, in frames/256 seconds of the HEVC extension video stream corresponding to the i-th operation point.

In MPEG input document m31430, the buffer management of pictures from multiple elementary streams as defined in MPEG-2 Transport Stream or Program Stream has not been provided. For instance, MPEG input document m31430 does not describe transport stream system target decoder (T-STD) models or program stream system target decoder models for multi-layer HEVC (e.g., for SHVC, MV-HEVC, or 3D-HEVC). As a result, the existing buffering models may be incompatible with multi-layer HEVC.

This disclosure provides techniques for the carriage of the HEVC extension bitstreams based on the MPEG input document m31430. The techniques of this disclosure may be used separately or in conjunction with one another.

In accordance with a first technique of this disclosure, SHVC, MV-HEVC and 3D-HEVC buffer models (including transport stream system target decoder (T-STD) models and program stream system target decoder (P-STD) models) are unified in a same layer based model. In other words, one T-STD model may apply to SHVC, MV-HEVC and 3D-HEVC and one P-STD model may apply to SHVC, MV-HEVC and 3D-HEVC. In one alternative, such models can be designed in a way similar to the T-STD model and P-STD model as done for MVC for H.264.

In this way, video decoder 30 may assemble, in a buffer model (e.g., a P-STD model or a T-STD model), an access unit from a plurality of elementary streams of a data stream (i.e., a transport stream or a program stream). Video decoder 30 uses the same buffer model regardless of whether the elementary streams contain SHVC, MV-HEVC, or 3D-HEVC bitstreams. Subsequently, video decoder 30 may decode the access unit. In other words, video decoder 30 may decode coded pictures of the access unit.

As indicated above, transport streams and program streams comprise a respective series of PES packets. Each respective PES packet of a transport stream or a program stream is associated with an elementary stream in a plurality of elementary streams. Thus, the transport stream or program stream may be said to comprise a plurality of elementary streams. The elementary streams may include video streams, audio streams, and private streams. In accordance with one or more techniques of this disclosure, each respective temporal sub-layer of each respective layer of a bitstream may correspond to a different elementary stream. This may enable a Media Aware Network Element (MANE) or other device to selectively forward PES packets associated with particular layers and particular temporal sub-layers without parsing or interpreting HEVC data in payloads of the PES packets. Rather, the MANE or other device may be able to determine whether to forward particular PES packets based on data in PES packet headers and data in various descriptors (e.g., HEVC hierarchy descriptors, HEVC extension descriptors, etc.) in the program specific information of the transport stream or program stream.

A target decoder (e.g., video decoder 30) may need to reassemble access units of a bitstream prior to decoding pictures of the access unit. In other words, the target decoder may need to ensure that data needed to decode pictures of an access unit are available at a decoding time for the access unit. Transport streams are intended for delivery of programs over potentially error-prone channels (e.g., the Internet) in which there may be errors (e.g., lost PES packets, jitter, corruption, etc.) in the transport packets. Hence, when the target decoder is decoding video from a transport stream, the target decoder cannot assume that the data needed to decode pictures of an access unit are immediately available. Instead, the target decoder may implement a buffering model for each program of a transport stream. The buffering model for a transport stream may include a respective set of buffers for each respective elementary video stream (i.e., elementary stream containing a video stream) associated with the program.

In accordance with an example of the first technique of this disclosure, a set of buffers for an elementary video stream n may include a transport buffer $TB_n$ for the elementary video stream, a multiplexing buffer $MB_n$ for the elementary video stream, and an HEVC layer picture subset buffer $VSB_n$ for the elementary video stream. As the target decoder receives PES packets of the transport stream, the target decoder demultiplexes the transport stream such that PES packets of the transport stream belonging to different elementary streams are stored in different transport buffers. In other words, for each respective elementary stream associated with the program, the video coder may, for each respective PES packet of the transport stream belonging to the respective elementary stream, store the respective PES packet in a buffer (e.g., a transport buffer) for the respective elementary stream. Thus, the transport buffer $TB_n$ for elementary stream n receives transport packets belonging to elementary video stream n.

The target decoder removes transport packets from the transport buffer at a rate $Rx_n$. If there is no data in the transport buffer $TB_n$, the rate $Rx_n$ is 0. Otherwise, if there is data in the transport buffer $TB_n$, the rate $Rx_n$ is equal to a bit rate. As described elsewhere in this disclosure, the target decoder may determine the bit rate based on a first factor (i.e., CpbBrNalFactor), a second factor (i.e., CpbBrVclFactor), and a third factor (i.e., BitRate[SchedSelIdx]). The first, second, and third factors are defined in Rec. ITU-T H.265|ISO/IEC 23008-2.

When the target decoder removes a transport packet from the transport buffer $TB_n$ for elementary stream n, the target decoder adds the transport packet to the multiplexing buffer $MB_n$ for elementary stream n. The target decoder removes data from the multiplexing buffer $MB_n$ one byte at a time. When the target decoder removes a byte from multiplexing buffer $MB_n$, the target decoder inserts the byte into the HEVC layer picture subset buffer $VSB_n$ for elementary stream n if the byte is not a PES packet (e.g., a transport packet) header byte.

Thus, for each respective elementary stream associated with a program, the target decoder may remove PES packets from a transport buffer for the respective elementary stream. Furthermore, the target decoder may store, in a multiplexing buffer for the respective elementary stream, the PES packets removed from the transport buffer for the respective elementary stream. The target decoder may remove bytes from the multiplexing buffer for the respective elementary stream. Furthermore, the target decoder may store, in the HEVC layer picture subset buffer for the respective elementary stream, the bytes removed from the multiplexing buffer for the respective elementary stream.

In this way, HEVC layer picture subset buffer $VSB_n$ receives payload bytes of transport packets. HEVC layer picture subset buffer $VSB_n$ may serve as an assembly point for HEVC layer picture subsets. As used in this disclosure, an HEVC layer picture subset is a set of HEVC layer pictures of an access unit associated with a layer identifier set (i.e., a set of layer identifier values). An HEVC layer picture is a coded picture as defined in Rec. ITU-T H.265|ISO/IEC 23008-2 Annex F with the constraints specified in section 2.17.1 of N13656 (reproduced below).

The target decoder removes data corresponding to an access unit from the HEVC layer picture subset buffer $VSB_n$ at a decoding time for the access unit. For instance, to decode a pictures of an access unit $A_H(j)$, the target decoder may remove, from a HEVC layer picture buffer $VSB_n$ for elementary stream n, a HEVC layer picture subset $VS_n(j_n)$ corresponding to a decoding time $td_n(j_n)$. $td_n(j_n)$ indicates a decoding time, measured in seconds, in the target decoder of HEVC layer picture subset $VS_n(j_n)$ for elementary stream n. $j_n$ is an index to a layer identifier set defining HEVC layer picture subset $VS_n(j_n)$. Additionally, the target decoder removes, from HEVC layer picture buffers $VSB_{n+1}$ to $VSB_{n+m}$ for elementary streams n+1 to n+m, HEVC layer picture subsets $VS_{n+1}(j_{n+1})$ to $VS_{n+m}(j_{n+m})$ where decoding times for HEVC layer picture subsets $VS_{n+1}(j_{n+1})(j_{n+1})$ to $VS_{n+m}(j_{n+m})$ (i.e., $td_{n+1}(j_{n+1})$ to $td_{n+m}(j_{n+m})$) are equal to $td_n(j_n)$. The access unit may be the combination of the HEVC layer subsets removed from $VSB_n$ to $VSB_{n+m}$.

In this way, for each respective elementary stream associated with the program, the buffer model comprises a buffer (e.g., a HEVC layer picture buffer) for the respective elementary stream. The access unit comprises a respective HEVC layer picture subset for the respective elementary stream. The respective HEVC layer picture subset comprises HEVC layer pictures of the access unit that are associated with a respective layer identifier set. Each of the HEVC layer pictures is a coded picture as defined in Rec. ITU-T H.265|ISO/IEC 23008-2 Annex F. For each respective elementary stream associated with the program, the target decoder may remove the respective HEVC layer picture subset for the respective elementary stream from the buffer for the respective elementary stream. The target decoder may include the respective HEVC layer picture subset in the access unit.

A buffering model for a program stream (i.e., a P-STD model) may be simpler than a buffering model for a transport stream (i.e., a T-STD model) because a target decoder can assume that PES packets in a program stream are available without the errors (e.g., jitter, loss, etc.) associated with transport streams. In accordance with one or more techniques of this disclosure, each respective temporal sub-layer of each respective layer of a bitstream may correspond to a different elementary stream of a program stream. Furthermore, the P-STD model may include a HEVC layer picture subset buffer for each respective elementary stream of the program stream. As the target decoder receives PES packets of the program stream, the target decoder demultiplexes the program stream such that PES packets belonging to different elementary streams are stored in different HEVC layer picture subset buffers. The target decoder may remove data corresponding to an access unit from the HEVC layer picture subset buffers in the same manner as described above with regard to transport streams.

In some examples, the target decoder uses different buffer models, depending on the content of received transport streams or program streams. For example, responsive to determining that there is a set of HEVC layers in the program and that there is at least one HEVC layered video sub-bitstream in the plurality of elementary streams that is an HEVC extension video stream conforming to one or more profiles as defined in Annex G or Annex H of ITU-T Rec. H.265|ISO/IEC 23008-2, the target decoder may select the buffer model described with regard to the first technique of this disclosure to use in assembling an access unit.

In accordance with a second example technique of this disclosure, each HEVC layered video stream can have a T-STD model and/or a P-STD model. An HEVC layered video sub-bitstream may be assembled from one or more HEVC layered video sub-streams and is represented in an HEVC extension descriptor as an operation point. In other words, a HEVC layered video stream corresponds to an operation point and is assembled from the HEVC layered video sub-bitstreams. An HEVC layered video sub-bitstream contains multiple HEVC video layer sub-bitstreams that contain the VCL NAL units with the same value of nuh_layer_id (the layer identifier) and their associated non-VCL NAL units. For instance, an HEVC layered video sub-bitstream may be defined to be all VCL NAL units with nuh_layer_id belonging to an HEVC layer set of an HEVC extension video stream and associated non-VCL NAL units that conform to one or more profiles defined in Annex F or Annex G of Rec. ITU-T H.265|ISO/IEC 23008-2. The T-STD and the P-STD may operate in the manner described above and elsewhere in this disclosure. Thus, in some examples, video decoder 30 may assemble access units using separate instances of the buffer model for each respective HEVC layered video stream of a video data stream. In such examples, each respective HEVC layered video stream comprises a plurality of HEVC video layer sub-bitstreams, and each respective HEVC video layer sub-bitstream of the plurality of HEVC video layer sub-bitstreams comprises VCL NAL units with a same layer identifier value.

As previously indicated, a hierarchy extension descriptor is a descriptor that provides information to identify program elements containing components of hierarchically-coded video, audio, and private streams. In other words, a hierarchy extension descriptor provides information about a program element corresponding to the hierarchy extension descriptor. A hierarchy extension descriptor may include a hierarchy_ext_embedded_layer_index field for each direct dependent program element that needs to be accessed and be present in decoding order before decoding of the elementary stream associated with the hierarchy extension descriptor. In other words, a hierarchy extension descriptor may include a plurality of hierarchy_ext_embedded_layer_index fields. Each respective hierarchy_ext_embedded_layer_index field of the hierarchy extension descriptor identifies a respective direct dependent program element for a corresponding program element (i.e., the program element corresponding to the hierarchy extension descriptor). The respective direct dependent program element for the corresponding program element is a program element that needs to be available to the target decoder before the target decoder is able to decode the corresponding program element. For instance, the corresponding program element may include data for a non-base layer and the respective direct dependent program element may include data for a base layer. Because respective program elements may correspond to respective layers, each respective hierarchy_ext_embedded_layer_index of a hierarchy extension descriptor may identify a respective reference layer required for decoding a layer corresponding to the hierarchy extension descriptor. In this way, when assembling an access unit, the target decoder may identify, based on one or more fields in a descriptor corresponding to an output layer of a current operation point, reference layers required to decode the output layer of the current operation point.

In accordance with a third technique of this disclosure, when assembling HEVC layer pictures within an access unit from multiple streams in a T-STD or P-STD model, the hierarchy_ext_embedded_layer_index values indicated in the associated hierarchy extension descriptor are used to identify the reference layers required for decoding the output layers of the current operation point. For instance, when re-assembling a j-th access unit $A_H(j)$, the target decoder may collect HEVC layer picture subsets from HEVC layer picture subset buffers for each program element of a program in a transport stream or a program stream. The target decoder collects the HEVC layer picture subsets such that the following apply:

The value y indicates a layer identifier. The value y is a greater than or equal to 0.

An HEVC layer picture subset $VS_{y+1}(j_{y+1})$ corresponds to a program element for layer y+1. Because y≥0, a layer with the layer identifier y+1 is a non-base layer.

$td_{y+1}(j_{y+1})$ denotes a decoding time stamp (DTS) value for $VS_{y+1}(j_{y+1})$.

A hierarchy extension descriptor corresponds to the program element for layer y+1 (i.e., the corresponding program element).

The hierarchy extension descriptor includes zero or more hierarchy_ext_embedded_layer_index fields.

For each respective hierarchy_ext_embedded_layer_index field:

The respective hierarchy_ext_embedded_layer_index field has a respective value identifying a respective direct dependent program element for the corresponding program element.

$VS_y(j_y)$ is an HEVC layer picture subset corresponding to the respective direct dependent program element.

$td_y(j_y)$ is a DTS value for $VS_y(j_y)$.

$td_y(j_y)$ is equal to $td_{y+1}(j_{y+1})$.

In accordance with a fourth technique of this disclosure, an HEVC timing and HRD descriptor as in the current HEVC MPEG-2 systems can be present for each operation point. In other words, for each respective operation point, a respective HEVC timing and HRD descriptor can be present. The HEVC timing and HRD descriptor provides timing and HRD parameters, as defined in Annex C of Rec. ITU-T H.265|ISO/IEC 23008-2, for the associated HEVC video stream or the HEVC highest temporal sub-layer representation thereof, respectively. An example syntax of the HEVC timing and HRD descriptor is provided in section 2.6.95, below.

In one example of the fourth technique of this disclosure, in an HEVC_extension_descriptor, in the loop of each operation point, an HEVC timing and HRD descriptor can be present. As shown above, an HEVC extension descriptor includes a loop (i.e., "for(i=0; i<num_operation_points; i++){ . . . }") in which each respective iteration of the loop corresponds to a sequence of elements for the respective operation point (e.g., profile_space, tier_flag, profile_idc, etc.). In this example, elements for the respective operation point further include an HEVC timing and HRD descriptor.

In another example of the fourth technique of this disclosure, an HEVC timing and HRD descriptor is only present once for operation points sharing the same layer identifier set of the layers to be decoded. In another example, an HEVC timing and HRD descriptor is only present once for all operation points of all output layer sets.

A fifth technique of this disclosure involves a layer picture delimiter NAL unit. The layer picture delimiter NAL unit may contain the same syntax structure as a NAL unit header in HEVC and may have the following syntax elements: forbidden_zero_bit, nal_unit_type, nuh_layer_id, and nuh_temporal_id_plus1. The forbidden_zero_bit syntax element is a 1-bit syntax element that is always equal to 0. The nal_unit_type syntax element specifies the type of RBSP data structure contained in the NAL unit. The nuh_layer_id syntax element specifies an identifier of a layer to which the NAL unit belongs. NAL units that have nuh_layer_id syntax elements that specify different values belong to different layers of the bitstream. The nuh_temporal_id_plus1 syntax element, minus 1, specifies a temporal identifier for the NAL unit.

In accordance with some examples of the fifth technique of this disclosure, the nal_unit_type syntax element of the layer picture delimiter NAL unit is set to be 0x30 (i.e. 48). In other examples, the nal_unit_type syntax element of the layer picture delimiter NAL unit has a value in the range of 0x30 to 0x3F, inclusive (i.e., 48 to 63, inclusive). The HEVC specification marks values in the range of 0x30 to 0x3F as "unspecified."

In accordance with some examples of the fifth technique of this disclosure, the nuh_layer_id and nuh_temporal_id_plus1 syntax elements in the layer picture delimiter NAL unit are set equal to the nuh_layer_id and nuh_temporal_id_plus1 syntax elements of a picture associated with VCL NAL units that immediately follow the layer picture delimiter NAL unit. In each elementary stream with stream_type equal to 0x26 (i.e., an elementary stream comprising an HEVC extension video stream conforming of one or more profiles as defined in Annex G or Annex H of ITU-T Rec. H.264|ISO/IEC 23008), exactly one LPD_nal_unit (i.e., a layer presentation delimiter NAL unit) may precede all the NAL units with the values of nuh_layer_id and nuh_temporal_id_plus1 equal to those of the LPD_nal_unit. In other examples, the values of the nuh_layer_id and nuh_temporal_id_plus1 syntax elements in the layer picture delimiter NAL unit are fixed to be 0 and 0. Furthermore, in some examples, the nuh_temporal_id_plus1 syntax element of the layer picture delimiter NAL unit is set to be 0 to indicate that the layer picture delimiter NAL unit is a layer picture delimiter NAL unit. In some examples, in each elementary stream with stream_type equal to 0x26, exactly one LPD_nal_unit may precede all the NAL units with the value of nuh_layer_id equal to that of the LPD_nal_unit. In some examples, in each elementary stream with stream_type equal to 0x26, exactly one LPD_nal_unit may precede all the NAL units with the value belonging to a HEVC layer identifier set, the minimum value of which is equal to the nuh_layer_id of the LPD_nal_unit.

Figure 2:
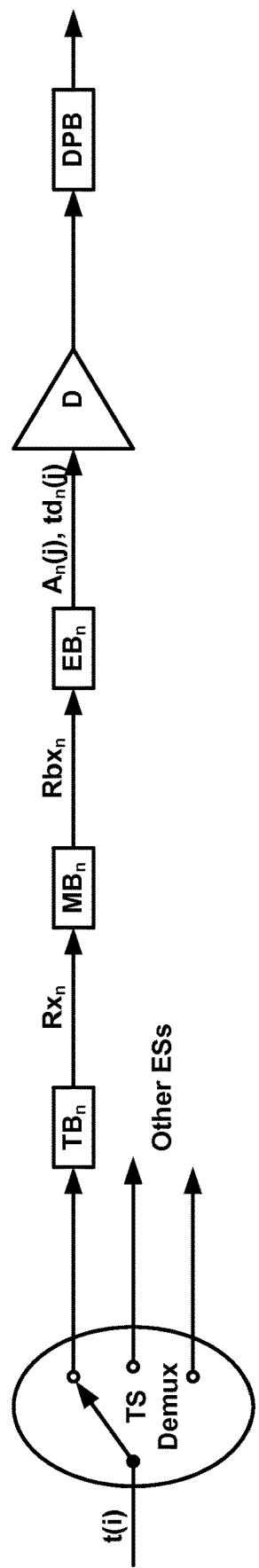
FIG. 2 is a conceptual diagram illustrating example transport stream system target decoder (T-STD) model extensions for single-layer High Efficiency Video Coding (HEVC).
Figure 3:
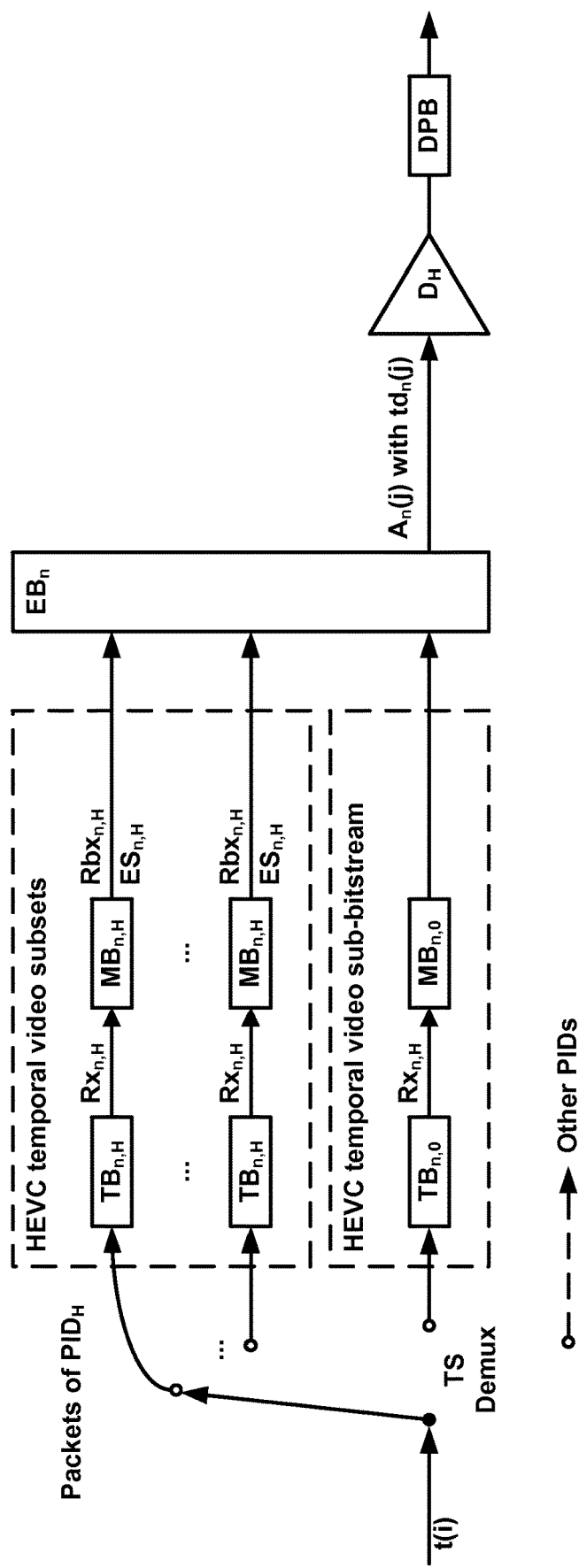
FIG. 3 is a conceptual diagram illustrating example T-STD model extensions for layered transport of HEVC temporal video subsets.
Figure 4:
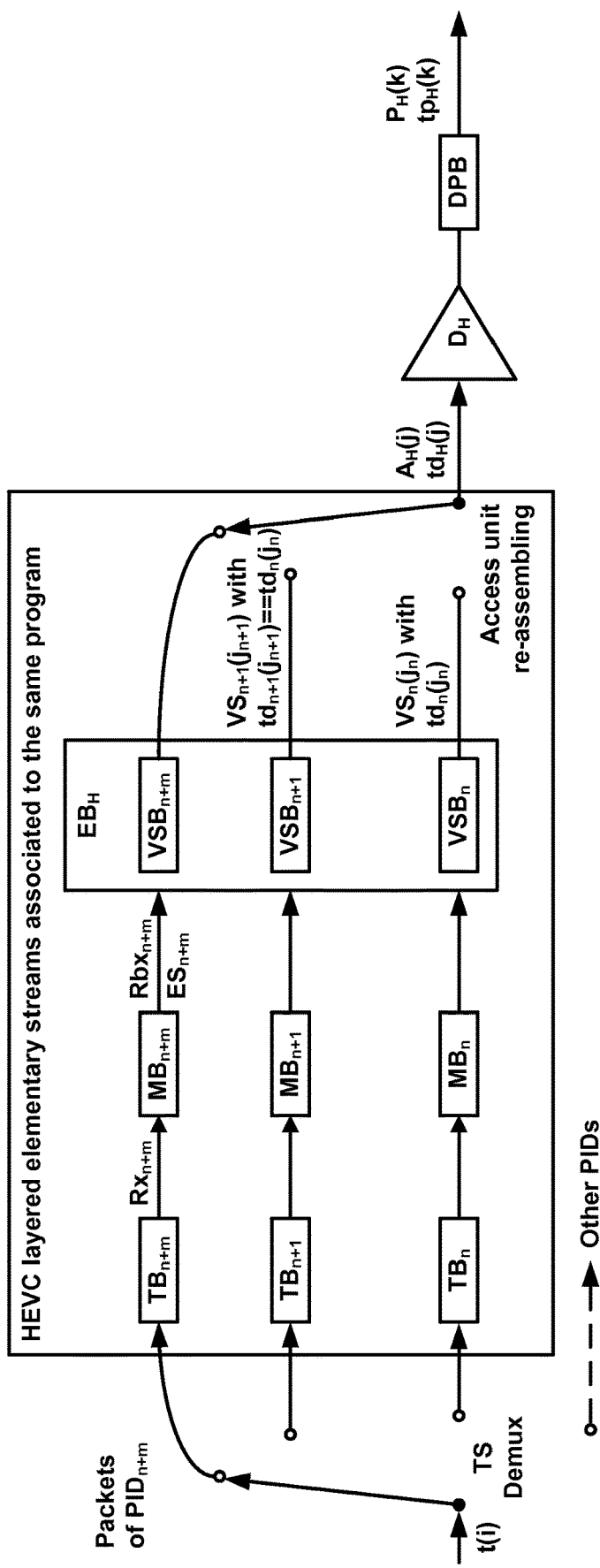
FIG. 4 is a conceptual diagram illustrating example T-STD model extension for HEVC layered video sub-bitstreams, in accordance with one or more techniques of this disclosure.
Figure 5:
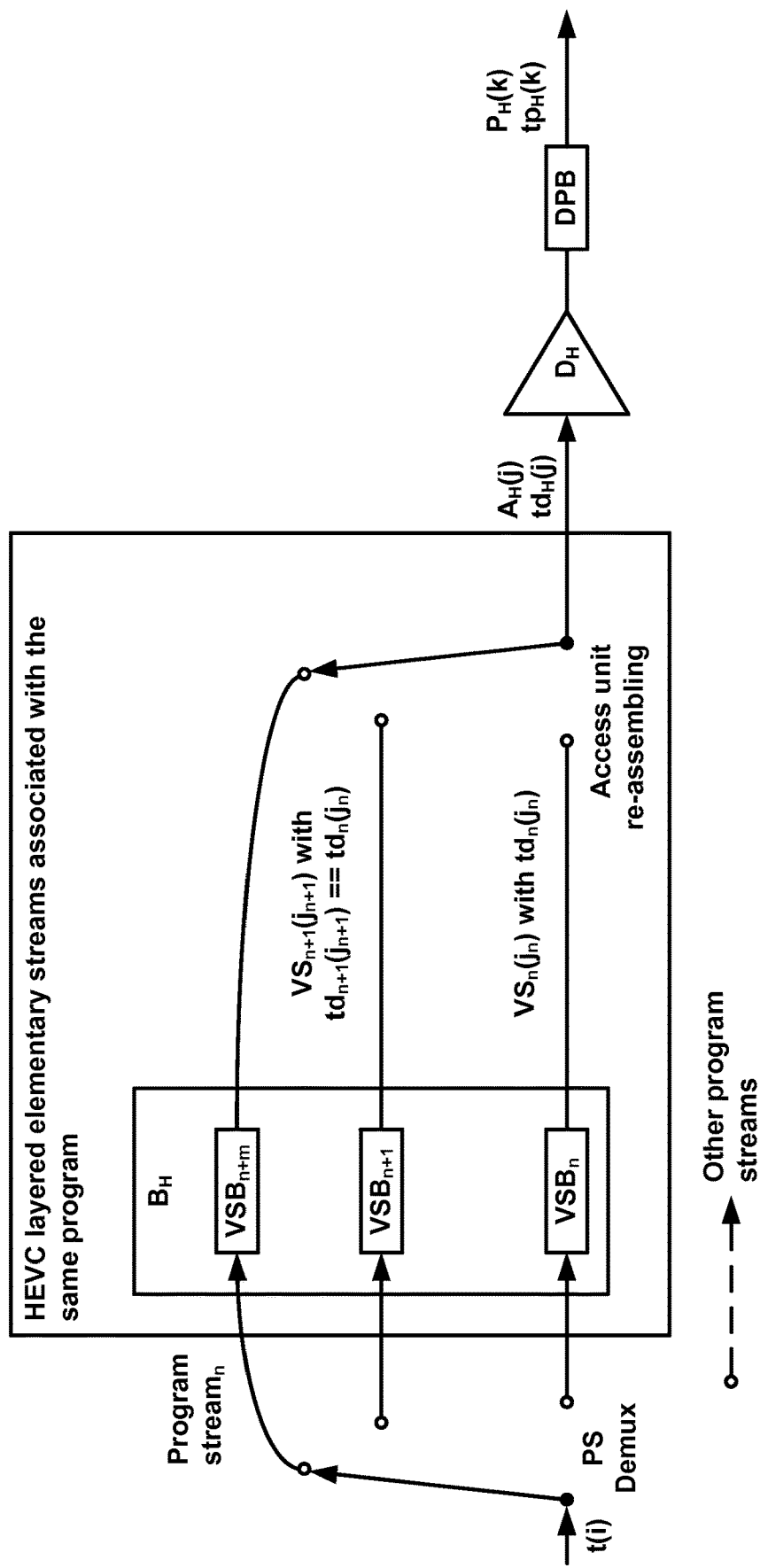
FIG. 5 is a conceptual diagram illustrating example P-STD model extensions for HEVC layered video sub-bitstreams, in accordance with one or more techniques of this disclosure.

A working draft text of the proposed solution is set forth in this disclosure as an example at the end of this detailed description (and entitled "INFORMATION TECHNOLOGY—GENERIC CODING OF MOVING PICTURES AND ASSOCIATED AUDIO INFORMATION: SYSTEMS, AMENDMENT 3, Transport of HEVC video over MPEG-2 systems). The newly added text is indicated with bold italics. For a sub-section that is completely new, only the sub-section title might be indicated in bold italics. The implementation of the specification text is based on MPEG output document N13656, which contains only the transport of HEVC video, but not HEVC layered video, such as MV-HEVC, SHVC or 3D-HEVC. The following text refers to Figures X-1, X-2, 2-15, and X-4. Figure X-1 is presented as FIG. 2 of this disclosure. Thus, FIG. 2 is a conceptual diagram illustrating example T-STD model extensions for single layer HEVC. Figure X-2 is presented as FIG. 3 of this disclosure. Thus, FIG. 3 is a conceptual diagram illustrating example T-STD model extensions for layered transport of HEVC temporal video subsets, in accordance with one or more techniques of this disclosure. FIG. 2-15 is presented as FIG. 4 of this disclosure. Thus, FIG. 4 is a conceptual diagram illustrating example T-STD model extension for Rec. ITU-T H.265|ISO/IEC 23008-2 Video with HEVC layered video sub-bitstreams, in accordance with one or more techniques of this disclosure. Figure X-4 is presented as FIG. 5 of this disclosure. Thus, FIG. 5 is a conceptual diagram illustrating example P-STD model extensions for Rec. ITU-T H.265|ISO/IEC 23008-2 Video with HEVC layered video sub-bitstreams, in accordance with one or more techniques of this disclosure.

INFORMATION TECHNOLOGY—GENERIC CODING OF MOVING PICTURES AND ASSOCIATED AUDIO INFORMATION: SYSTEMS

Amendment 3

Transport of HEVC Video Over MPEG-2 Systems

Clause 1.2.2
Add the following references:
Recommendation ITU-T H.265, High efficiency video coding ISO/IEC 23008-2, Information technology—High efficiency coding and media delivery in heterogeneous environments—Part 2: High efficiency video coding Clause 2.1.95 to 2.1.109
Add the following definitions after 2.1.94:

2.1.95 HEVC video stream: A byte stream as specified in Rec. ITU-T H.265|ISO/IEC 23008-2 Annex B, Annex F or Annex G. It is a joint term of HEVC layered video stream or HEVC base layer video sub-bitstream.

2.1.96 HEVC access unit: An access unit as defined in Rec. ITU-T H.265|ISO/IEC 23008-2 with the constraints specified in section 2.17.1.

2.1.97 HEVC 24-hour picture (system): An HEVC access unit with a presentation time that is more than 24 hours in the future. For the purpose of this definition, HEVC access unit n has a presentation time that is more than 24 hours in the future if the difference between the initial arrival time $t_{ai}(n)$ and the DPB output time $t_{o,dpb}(n)$ is more than 24 hours.

2.1.98 HEVC slice: An HEVC independent slice segment and zero or more subsequent HEVC dependent slice segments preceding the next HEVC independent slice segment (if any) within the same HEVC access unit.

2.1.99 HEVC slice segment: A byte_stream_nal_unit with nal_unit_type in the range of 0 to 9 and 16 to 23 as defined in Rec. ITU-T H.265|ISO/IEC 23008-2.

2.1.100 HEVC dependent slice segment: An HEVC slice segment with the syntax element dependent slice segment flag in the slice header set to a value equal to 1 as defined in Rec. ITU-T H.265|ISO/IEC 23008-2.

2.1.101 HEVC independent slice segment: An HEVC slice segment with the syntax element dependent_slice_segment_flag in the slice header set to a value 0 or inferred to be equal to 0 as defined in Rec. ITU-T H.265|ISO/IEC 23008-2.

2.1.102 HEVC tile of slices: One or more consecutive HEVC slices which form the coded representation of a tile as defined in Rec. ITU-T H.265|ISO/IEC 23008-2.

2.1.103 HEVC still picture (system): An HEVC still picture consists of an HEVC access unit containing an IDR picture preceded by VPS, SPS and PPS NAL units, as defined in Rec. ITU-T H.265|ISO/IEC 23008-2, that carry sufficient information to correctly decode this IDR picture. Preceding an HEVC still picture, there shall be another HEVC still picture or an End of Sequence NAL unit terminating a preceding coded video sequence as defined in Rec. ITU-T H.265|ISO/IEC 23008-2.

2.1.104 HEVC video sequence (system): coded video sequence as defined in Rec. ITU-T H.265|ISO/IEC 23008-2.

2.1.105 HEVC video sub-bitstream: A subset of the NAL units of an HEVC video stream in their original order.

2.1.106 HEVC temporal video sub-bitstream: An HEVC video sub-bitstream that contains all VCL NAL units and associated non-VCL NAL units of the temporal sub-layer, as specified in Rec. ITU-T H.265|ISO/IEC 23008-2, associated to TemporalId equal to 0 and which may additionally contain all VCL NAL units and associated non-VCL NAL units of all temporal sub-layers associated to a contiguous range of TemporalId from 1 to a value equal to or smaller than sps_max_sub_layers_minus1 included in the active sequence parameter set, as specified in Rec. ITU-T H.265|ISO/IEC 23008-2.

2.1.107 HEVC temporal video subset: An HEVC video sub-bitstream that contains all VCL NAL units and the associated non-VCL NAL units of one or more temporal sub-layers, as specified in Rec. ITU-T H.265|ISO/IEC 23008-2, with each temporal sub-layer not being present in the corresponding HEVC temporal video sub-bitstream and TemporalId associated with each temporal sub-layer forming a contiguous range of values.

NOTE X1 According to the constraints for the transport of HEVC specified in 2.17.1, each temporal sub-layer of an HEVC video stream is present either in the HEVC temporal video sub-bitstream or in exactly one HEVC temporal video subset which are carried in a set of elementary streams that are associated by hierarchy descriptors. This prevents multiple inclusion of the same temporal sub-layer and allows aggregation of the HEVC temporal video sub-bitstream with associated HEVC temporal video subsets according to the hierarchy descriptors as specified in 2.17.3.

2.1.108 HEVC highest temporal sub-layer representation: The sub-layer representation of the temporal sub-layer with the highest value of TemporalId, as defined in Rec. ITU-T H.265|ISO/IEC 23008-2, in the associated HEVC temporal video sub-bitstream or HEVC temporal video subset.

2.1.109 HEVC complete temporal representation: A sub-layer representation as defined in Rec. ITU-T H.265|ISO/IEC 23008-2 that contains all temporal sub-layers up to the temporal sub-layer with TemporalId equal to sps_max_sub_layers_minus1+1 as included in the active sequence parameter set, as specified in Rec. ITU-T H.265|ISO/IEC 23008-2.

[Ed. (CY): the newly introduced definitions need to be reordered.]

2.1.110 HEVC layer picture: A coded picture as defined in Rec. ITU-T H.265|ISO/IEC 23008-2 Annex F with the constraints specified in section 2.17.1. An HEVC layer picture is associated with a particular nuh_layer_id.

2.1.111 HEVC layer picture subset: The HEVC layer pictures of an access unit associated with a layer identifier set.

2.1.112 HEVC extension video stream: The video bitstream which conforms to one or more profiles defined in Rec. ITU-T H.265|ISO/IEC 23008-2 G.11 or H.11. [Ed (CY): could be replaced with HEVC video stream or HEVC layered video stream.]

2.1.113 HEVC video sequence (system): coded video sequence as defined in Rec. ITU-T H.265|ISO/IEC 23008-2.

2.1.114 HEVC base layer: The layer with nuh_layer_id equal to 0 in an HEVC extension video stream.

2.1.115 HEVC base layer video sub-bitstream: The video sub-bitstream that contains all VCL and non-VCL NAL units with nuh_layer_id equal to 0.

2.1.116 HEVC layer: The layer of an HEVC extension video stream, including all VCL NAL units with a particular value of nuh_layer_id and associated non-VCL NAL units, as defined in Annex F of Rec. ITU-T H.265|ISO/IEC 23008-2 Annex F in the NAL unit header syntax element.

2.1.117 HEVC layer identifier set: A set of nuh_layer_id values.

2.1.118 HEVC layer set: The video sub-bitstream that contains the HEVC layers with nuh_layer_id values forming an HEVC layer identifier set.

2.1.119 HEVC layered video stream: The HEVC layered video sub-bitstream that may have been assembled from one or more HEVC layered video sub-streams and is represented in the HEVC extension descriptor as an operation point.

2.1.120 HEVC layered video sub-bitstream: The HEVC layered video sub-bitstream is defined to be all VCL NAL units with nuh_layer_id belonging to an HEVC layer set of an HEVC extension video stream and associated non-VCL NAL units that conform to one or more profiles defined in Annex F (or Annex G) of Rec. ITU-T H.265|ISO/IEC 23008-2.

2.1.121 operation point: An operation point is identified by a temporal_id value representing a target temporal level and a set of nuh_layer_id values representing the target output layers. One operation point is associated with an HEVC layered video stream, or HEVC base layer video sub-bitstream that conforms to one or more profiles defined in Annex E or Annex G (Annex H) of Rec. ITU-T H.265|ISO/IEC 23008-2.

Clause 2.4.2.6

Replace the following 2 paragraphs:

Replace:

The delay of any data through the System Target Decoder buffers shall be less than or equal to one second except for still picture video data and ISO/IEC 14496 streams. Specifically: $td_n(j)-t(i) \leq 1$ second for all j, and all bytes i in access unit $A_n(j)$.

by:

The delay of any data through the System Target Decoder buffers shall be less than or equal to one second except for still picture video data, ISO/IEC 14496 and ISO/IEC 23008-2 streams. Specifically: $td_n(j)-t(i) \leq 1$ second for all j, and all bytes i in access unit $A_n(j)$.

Replace:

For ISO/IEC 14496 streams, the delay is constrained by $td_n(j)-t(i) \leq 10$ seconds for all j, and all bytes i in access unit $A_n(j)$.

by:

For ISO/IEC 14496 and ISO/IEC 23008-2 streams, the delay is constrained by $td_n(j)-t(i) \leq 10$ seconds for all j, and all bytes i in access unit $A_n(j)$.

Clause 2.4.2.11

Add the following immediately after 2.4.2.10 as a new subclause:

2.4.2.11, T-STD Extensions for Carriage of HEVC:

T-STD extensions and T-STD parameters for decoding of HEVC video streams are defined in 2.17.2 and 2.17.3. Program stream support including P-STD extensions and P-STD parameters are not specified for HEVC video streams.

Clause 2.4.3.5

In the section specifying the discontinuity_indicator, add at the end of the bulleted list introduced by "For the purpose of this clause, an elementary stream access point is defined as follows":

HEVC video streams or HEVC temporal video sub-bitstreams—The first byte of an HEVC access unit. The VPS, SPS and PPS parameter sets, as defined in Rec. ITU-T H.265|ISO/IEC 23008-2, referenced in this and all subsequent HEVC access units in the HEVC video sequence shall be provided after this access point in the byte stream and prior to their activation.

In the section specifying the elementary_stream_priority_indicator, add:

In the case of HEVC video streams or HEVC temporal video sub-bitstreams or HEVC temporal video subsets, this field may be set to '1' only if the payload contains one or more bytes from a slice with slice_type set to 2. A value of '0' indicates that the payload has the same priority as all other packets which do not have this bit set to '1'.

Clause 2.4.3.7

In Table 2-22, Stream_id assignments, replace the following line:

1110 xxxx   Rec. ITU-T H.262|ISO/IEC 13818-2, ISO/IEC 11172-2, ISO/IEC 14496-2 or Rec. ITU-T H.264|ISO/IEC 14496-10 video stream number xxxx With 1110 xxxx   Rec. ITU-T H.262|ISO/IEC 13818-2, ISO/IEC 11172-2, ISO/IEC 14496-2, Rec. ITU-T H.264|ISO/IEC 14496-10 or Rec. ITU-T H.265| ISO/IEC 23008-2 video stream number xxxx In the section specifying the PTS (presentation time stamp), add:

For HEVC video streams, HEVC temporal video sub-bitstreams and HEVC temporal video subsets, if a PTS is present in the PES packet header, it shall refer to the first HEVC access unit that commences in this PES packet. To achieve consistency between the STD model and the HRD model defined in Annex C of Rec. ITU-T H.265|ISO/IEC 23008-2, for each HEVC access unit the PTS value in the STD shall, within the accuracy of their respective clocks, indicate the same instant in time as the nominal DPB output time in the HRD, as defined in Annex C of Rec. ITU-T H.265|ISO/IEC 23008-2.

In the section specifying the DTS (decoding time stamp), add:

For HEVC video streams, HEVC temporal video sub-bitstreams and HEVC temporal video subsets, if a DTS is present in the PES packet header, it shall refer to the first HEVC access unit that commences in this PES packet. To achieve consistency between the STD model and the HRD model defined in Annex C of Rec. ITU-T H.265|ISO/IEC 23008-2, for each HEVC access unit the DTS value in the STD shall, within the accuracy of their respective clocks, indicate the same instant in time as the nominal CPB removal time $t_r$ in the HRD, as defined in Annex C of Rec. ITU-T H.265|ISO/IEC 23008-2.

Clause 2.4.4.9

In Table 2-34, Stream type assignments, replace the following line:

| 0x24-0x7E | ITU-T Rec. H.222.0|ISO/IEC 13818-1 Reserved |
|---|---| with:

| 0x24 | HEVC video stream or an HEVC temporal video sub-bitstream |
|---|---|
| 0x25 | HEVC temporal video subset of an HEVC video stream conforming to one or more profiles defined in Annex A of ITU-T Rec. H.265|ISO/IEC 23008-2 |
| 0x26 | HEVC extension video stream conforming to one or more profiles as defined in Annex G or Annex H of ITU-T Rec. H.265|ISO/IEC 23008-2 |
| 0x27-0x7E | ITU-T Rec. H.222.0|ISO/IEC 13818-1 Reserved |

Clause 2.6.1
Replace Table 2-45 by:

TABLE 2-45

Program and program element descriptors

| descriptor_tag | TS | PS | Identification |
|---|---|---|---|
| 0 | n/a | n/a | Reserved |
| 1 | n/a | X | Forbidden |
| 2 | X | X | video_stream_descriptor |
| 3 | X | X | audio_stream_descriptor |

TABLE 2-45-continued

Program and program element descriptors

| descriptor_tag | TS | PS | Identification |
|---|---|---|---|
| 4 | X | X | hierarchy_descriptor |
| 5 | X | X | registration_descriptor |
| 6 | X | X | data_stream_alignment_descriptor |
| 7 | X | X | target_background_grid_descriptor |
| 8 | X | X | video_window_descriptor |
| 9 | X | X | CA_descriptor |
| 10 | X | X | ISO_639_language_descriptor |
| 11 | X | X | system_clock_descriptor |
| 12 | X | X | multiplex_buffer_utilization_descriptor |
| 13 | X | X | copyright_descriptor |
| 14 | X |   | maximum_bitrate_descriptor |
| 15 | X | X | private_data_indicator_descriptor |
| 16 | X | X | smoothing_buffer_descriptor |
| 17 | X |   | STD_descriptor |
| 18 | X | X | IBP_descriptor |
| 19-26 | X |   | Defined in ISO/IEC 13818-6 |
| 27 | X | X | MPEG-4_video_descriptor |
| 28 | X | X | MPEG-4_audio_descriptor |
| 29 | X | X | IOD_descriptor |
| 30 | X |   | SL_descriptor |
| 31 | X | X | FMC_descriptor |
| 32 | X | X | external_ES_ID_descriptor |
| 33 | X | X | MuxCode_descriptor |
| 34 | X | X | FmxBufferSize_descriptor |
| 35 | X |   | multiplexBuffer_descriptor |
| 36 | X | X | content_labeling_descriptor |
| 37 | X | X | metadata_pointer_descriptor |
| 38 | X | X | metadata_descriptor |
| 39 | X | X | metadata_STD_descriptor |
| 40 | X | X | AVC video descriptor |
| 41 | X | X | IPMP_descriptor (defined in ISO/IEC 13818-11, MPEG-2 IPMP) |
| 42 | X | X | AVC timing and HRD descriptor |
| 43 | X | X | MPEG-2_AAC_audio_descriptor |
| 44 | X | X | FlexMuxTiming_descriptor |
| 45 | X | X | MPEG-4_text_descriptor |
| 46 | X | X | MPEG-4_audio_extension_descriptor |
| 47 | X | X | Auxiliary_video_stream_descriptor |
| 48 | X | X | SVC extension descriptor |
| 49 | X | X | MVC extension descriptor |
| 50 | X | n/a | J2K video descriptor |
| 51 | X | X | MVC operation point descriptor |
| 52 | X | X | MPEG2_stereoscopic_video_format_descriptor |
| 53 | X | X | Stereoscopic_program_info_descriptor |
| 54 | X | X | Stereoscopic_video_info_descriptor |
| 55 | X | n/a | Transport_profile_descriptor |
| 56 | X | n/a | HEVC video descriptor |
| 57 | X | n/a | hierarchy_extension_descriptor |
| 58 | X | n/a | HEVC_extension_descriptor |
| 57-62 | n/a | n/a | Rec. ITU-T H.222.0|ISO/IEC 13818-1 Reserved |
| 63 | X | X | Extension_descriptor |
| 64-255 | n/a | n/a | User Private |

Clause 2.6.6
Replace in Table 2-50 the description for value 15:

TABLE 2-50

Hierarchy_type field values

| Value | Description |
|---|---|
| 15 | Base layer or MVC base view sub-bitstream or AVC video sub-bitstream of MVC or HEVC temporal video sub-bitstream. |

Clause 2.6.11
Add the following immediately after Table 2-54:
Table 2-xx describes the alignment type for HEVC when the data alignment indicator in the PES packet header has a value of '1'.

TABLE 2-XX

HEVC video stream alignment values

| Alignment type | Description |
|---|---|
| 00 | Reserved |
| 01 | HEVC access unit |
| 02 | HEVC slice |
| 03 | HEVC access unit or slice |
| 04 | HEVC tile of slices |
| 05 | HEVC access unit or tile of slices |
| 06 | HEVC slice or tile of slices |
| 07 | HEVC access unit or slice or tile of slices |
| 08 | HEVC slice segment |
| 09 | HEVC slice segment or access unit |
| 10 | HEVC slice segment or slice |
| 11 | HEVC slice segment or access unit or slice |
| 12 | HEVC slice segment or tile of slices |
| 13 | HEVC slice segment or access unit or tile of slices |
| 14 | HEVC slice segment or slice or tile of slices |
| 15 | HEVC slice segment or access unit or slice or tile of slices |
| 16-255 | Reserved |

Clause 2.6.88
Replace Table AMD8-1 by:

TABLE AMD8-1

Extension descriptor

| Syntax | No. of bits | Mnemonic |
|---|---|---|
| Extension_descriptor ( ) { | | |
|   descriptor_tag | 8 | uimsbf |
|   descriptor_length | 8 | uimsbf |
|   extension_descriptor_tag | 8 | uimsbf |
|   if ( extension_descriptor_tag == 0x02) | | |
|   { | | |
|     ObjectDescriptorUpdate( ) | | |
|   } | | |
|   else if ( extension_descriptor_tag == 0x03) { | | |
|     HEVC_timing_and_HRD_descriptor ( ) | | |
|   } | | |
|   else { | | |
|     for ( i=0; i<N; i++ ) { | | |
|       reserved | 8 | bslbf |
|     } | | |
|   } | | |
| } | | |

Clause 2.6.89
Add the following immediately before Table AMD8-2:
HEVC_timing_and_HRD_descriptor( )—This structure is defined in 2.6.95 and 2.6.96.
Replace Table AMD8-2 by:

TABLE AMD8-2

Extension descriptor Tag values

| Extension_descriptor_tag | TS | PS | Identification |
|---|---|---|---|
| 0 | n/a | n/a | Reserved |
| 1 | n/a | X | Forbidden |
| 2 | X | X | ODUpdate_descriptor |
| 3 | X | n/a | HEVC_timing_and_HRD_descriptor( ) |
| 3-255 | n/a | n/a | Rec. ITU-T H.222.0|ISO/IEC 13818-1 Reserved |

Clause 2.6.93 to 2.6.96
Add the following immediately after clause 2.6.92 as new subclauses:

2.6.93 HEVC Video Descriptor

For an HEVC video stream, the HEVC video descriptor provides basic information for identifying coding parameters, such as profile and level parameters, of that HEVC video stream. For an HEVC temporal video sub-bitstream or an HEVC temporal video subset, the HEVC video descriptor provides information such as the associated HEVC highest temporal sub-layer representation contained in the elementary stream to which it applies.

TABLE X-1

HEVC video descriptor

| Syntax | No. Of bits | Mnemonic |
|---|---|---|
| HEVC_descriptor( ) { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_idc | 8 | uimsbf |
|   temporal_layer_subset_flag | 1 | bslbf |
|   HEVC_still_present_flag | 1 | bslbf |
|   HEVC_24hr_picture_present_flag | 1 | bslbf |
|   hevc_extension_present_flag | 1 | bslbf |
|   reserved | 4 | bslbf |
|   if ( temporal_layer_subset_flag == '1') { | | |
|     reserved | 5 | bslbf |
|     temporal_id_min | 3 | uimsbf |
|     reserved | 5 | bslbf |
|     temporal_id_max | 3 | uimsbf |
|   } | | |
|   if( hevc_extension_present_flag ) | | |
|     HEVC_extension_descripor( ) | | |
| } | | |

2.6.94 Semantic Definition of Fields in HEVC Video Descriptor profile_space, tier_flag, profile_idc, profile_compatibility_indication, progressive_source_flag, interlaced_source_flag, non_packed_constraint_flag, frame_only_constraint_flag, reserved_zero_44 bits, level_idc—When the HEVC video descriptor applies to an HEVC video stream or to an HEVC complete temporal representation, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, general_level_idc, respectively, for the corresponding HEVC video stream or HEVC complete temporal representation, and the entire HEVC video stream or HEVC complete temporal representation to which the HEVC video descriptor is associated shall conform to the information signaled by these fields.

When the HEVC video descriptor applies to an HEVC temporal video sub-bitstream or HEVC temporal video subset of which the corresponding HEVC highest temporal sub-layer representation is not an HEVC complete temporal representation, these fields shall be coded according to semantics defined in Rec. ITU-T H.265|ISO/IEC 23008-2 for sub_layer_profile_space, sub_layer_tier_flag, sub_ layer_profile_idc, sub_layer_profile_compatibility_flag[i], sub_layer_progressive_source_flag, sub_layer_interlaced_source_flag, sub_layer_non_packed_constraint_flag, sub_layer_frame_only_constraint_flag, sub_layer_reserved_zero_44 bits, sub_layer_level_idc, respectively, for the corresponding HEVC highest temporal sub-layer representation, and the entire HEVC highest temporal sub-layer representation to which the HEVC video descriptor is associated shall conform to the information signalled by these fields.

NOTE X2—In one or more sequences in the HEVC video stream the level may be lower than the level signalled in the HEVC video descriptor, while also a profile may occur that is a subset of the profile signalled in the HEVC video descriptor. However, in the entire HEVC video stream, only subsets of the entire bitstream syntax shall be used that are included in the profile signalled in the HEVC video descriptor, if present. If the sequence parameter sets in an HEVC video stream signal different profiles, and no additional constraints are signalled, then the stream may need examination to determine which profile, if any, the entire stream conforms to. If an HEVC video descriptor is to be associated with an HEVC video stream that does not conform to a single profile, then the HEVC video stream should be partitioned into two or more sub-streams, so that HEVC video descriptors can signal a single profile for each such sub-stream.

temporal_layer_subset_flag—This 1-bit flag, when set to '1', indicates that the syntax elements describing a subset of temporal layers are included in this descriptor. This field shall be set to 1 for HEVC temporal video subsets and for HEVC temporal video sub-bitstreams. When set to '0', the syntax elements temporal_id_min and temporal_id_max are not included in this descriptor.

HEVC_still_present_flag—This 1-bit field, when set to '1', indicates that the HEVC video stream or the HEVC highest temporal sub-layer representation may include HEVC still pictures. When set to '0', then the associated HEVC video stream shall not contain HEVC still pictures.

NOTE X3—According to Rec. ITU-T H.265|ISO/IEC 23008-2, IDR pictures are always associated to a TemporalId value equal to 0, Consequently, if the HEVC video descriptor applies to an HEVC temporal video subset, HEVC still pictures can only be present in the associated HEVC temporal video sub-bitstream.

HEVC_24_hour_picture_present_flag—This 1-bit flag, when set to '1', indicates that the associated HEVC video stream or the HEVC highest temporal sub-layer representation may contain HEVC 24-hour pictures. For the definition of an HEVC 24-hour picture, see 2.1.97. If this flag is set to '0', the associated HEVC video stream shall not contain any HEVC 24-hour picture.

temporal_id_min—This 3-bit field indicates the minimum value of the TemporalId, as defined in Rec. ITU-T H.265|ISO/IEC 23008-2, of all HEVC access units in the associated elementary stream.

temporal_id_max—This 3-bit field indicates the maximum value of the TemporalId, as defined in Rec. ITU-T H.265|ISO/IEC 23008-2, of all HEVC access units in the associated elementary stream.

hevc_extension_present_flag—This 1-bit flag, when set to '1', indicates that the HEVC extension descriptor is present as part of the HEVC video descriptor. When set to '0', the HEVC extension descriptor is not present.

2.6.95 HEVC Timing and HRD Descriptor

For an HEVC video stream, an HEVC temporal video sub-bitstream or an HEVC temporal video subset, the HEVC timing and HRD descriptor provides timing and HRD parameters, as defined in Annex C of Rec. ITU-T H.265|ISO/IEC 23008-2, for the associated HEVC video stream or the HEVC highest temporal sub-layer representation thereof, respectively.

TABLE X-2

HEVC timing and HRD descriptor

| Syntax | No. Of bits | Mnemonic |
|---|---|---|
| HEVC_timing_and_HRD_descriptor( ) { | | |
|   hrd_management_valid_flag | 1 | bslbf |
|   reserved | 6 | bslbf |
|   picture_and_timing_info_present_flag | 1 | bslbf |
|   if (picture_and_timing_info_present_flag == '1') { | | |
|     90kHz_flag | 1 | bslbf |
|     reserved | 7 | bslbf |
|     if (90kHz_flag == '0') { | | |
|       N | 32 | uimsbf |
|       K | 32 | uimsbf |
|     } | | |
|     num_units_in_tick | 32 | uimsbf |
|   } | | |
| } | | |

2.6.96 Semantic Definition of Fields in HEVC Timing and HRD Descriptor hrd_management_valid_flag—This 1-bit flag is only defined for use in transport streams. When the HEVC timing and HRD descriptor is associated to an HEVC video stream or to an HEVC highest temporal sub-layer representation carried in a transport stream, then the following applies.

If the hrd_management_valid_flag is set to '1', then Buffering Period SEI and Picture Timing SEI messages, as defined in Annex C of Rec. ITU-T H.265|ISO/IEC 23008-2, shall be present in the associated HEVC video stream or HEVC highest temporal sub-layer representation. These Buffering Period SEI messages shall carry coded nal_initial_cpb_removal_delay and nal_initial_cpb_removal_delay_offset values and may additionally carry nal_initial_alt_cpb_removal_delay and nal_initial_alt_cpb_removal_delay_offset values for the NAL HRD. If the hrd_management_valid_flag is set to '1', then the transfer of each byte from $MB_n$ to $EB_n$ in the T-STD as defined in 2.17.2 or the transfer from $MB_{n,k}$ to $EB_n$ in the T-STD as defined in 2.17.3 shall be according to the delivery schedule for that byte into the CPB in the NAL HRD, as determined from the coded nal_initial_cpb_removal_delay and nal_initial_cpb_removal_delay_offset or from the coded nal_initial_alt_cpb_removal_delay and nal_initial_alt_cpb_removal_delay_offset values for SchedSelIdx equal to cpb_cnt_minus1 as specified in Annex C of Rec. ITU-T H.265|ISO/IEC 23008-2. When the hrd_management_valid_flag is set to '0', the leak method shall be used for the transfer from $MB_n$ to $EB_n$ in the T-STD as defined in 2.17.2 or the transfer from $MB_{n,k}$ to $EB_n$ in the T-STD as defined in 2.17.3.

picture_and_timing_info_present_flag—This 1-bit flag when set to '1' indicates that the 90 kHz_flag and parameters for accurate mapping to 90-kHz system clock are included in this descriptor.

90 kHz_flag—This 1-bit flag when set to '1' indicates that the frequency of the HEVC time base is 90 kHz.

N, K—For an HEVC video stream or HEVC highest temporal sub-layer representation, the frequency of the HEVC time base is defined by the syntax element vui_time_scale in the VUI parameters, as defined in Annex E of Rec. ITU-T H.265|ISO/IEC 23008-2. The relationship between the HEVC time_scale and the STC shall be defined by the parameters N and K in this descriptor as follows.

time_scale=($N$×system_clock_frequency)/$K$

If the 90 kHz_flag is set to '1', then N equals 1 and K equals 300. If the 90 kHz_flag is set to '0', then the values of N and K are provided by the coded values of the N and K fields.

NOTE X4—This allows mapping of time expressed in units of time_scale to 90 kHz units, as needed for the calculation of PTS and DTS timestamps, for example in decoders for HEVC access units for which no PTS or DTS is encoded in the PES header.

num_units_in_tick—This 32-bit field is coded exactly in the same way as the vui_num_units_in_tick field in VUI parameters in Annex E of Rec. ITU-T H.265|ISO/IEC 23008-2. The information provided by this field shall apply to the entire HEVC video stream or HEVC highest temporal sub-layer representation to which the HEVC timing and HRD descriptor is associated.

2.6.97 Hierarchy Extension Descriptor

The hierarchy extension descriptor provides information to identify the program elements containing components of hierarchically-coded video, audio, and private streams. (See Table 2-49.)

TABLE 2-49

Hierarchy extension descriptor

| Syntax | No. of bits | Mnemonic |
|---|---|---|
| hierarchy_extension_descriptor( ) { | | |
|   descriptor_tag | 8 | uimsbf |
|   descriptor_length | 8 | uimsbf |
|   extension_dimension_bits | 16 | bslbf |
|   hierarchy_layer_index | 6 | uimsbf |
|   temporal_id | 3 | uimsbf |
|   nuh_layer_id | 6 | uimsbf |
|   tref_present_flag | 1 | bslbf |
|   num_embedded_layers | 6 | uimsbf |
|   hierarchy_channel | 6 | uimsbf |
|   reserved | 4 | bslbf |
|   for( i = 0 ; i < num_embedded_layers ; i++) { | | |
|     hierarchy_ext_embedded_layer_index | 6 | uimsbf |
|     reserved | 2 | bslbf |
|   } | | |
| } | | |

2.6.98 Semantic Definition of Fields in Hierarchy Extension Descriptor

When hierarchy extension descriptor is present, it is used to specify the dependency of layers present in different elementary streams. The aggregation of temporal sub-layers, however, is realized by the hierarchy descriptor, as specified in Amd. 3 of ISO/IEC 13818-1.

extension_dimension_bits—A 16-bit field indicating the possible enhancement of the associated program element from the base layer resulting from the program element of the layer with nuh_layer_id equal to 0.

The allocation of the bits to enhancement dimensions is as follows.

| Index to bits | Description |
|---|---|
| 0 | Multi-view enhancement |
| 1 | Spatial scalability, including SNR |
| 2 | Depth enhancement |
| 3 | AVC base layer |
| 4 | MPEG-2 base layer |
| 3~15 | Reserved |

The i-th bit equal to 1 indicates that the corresponding enhancement dimension is present.

hierarchy_layer_index—A 6-bit field that defines a unique index of the associated program element in a table of coding layer hierarchies. Indices shall be unique within a single program definition. For video sub-bitstreams of HEVC video streams conforming to one or more profiles defined in Annex F of Rec. ITU-T H.265|ISO/IEC 23008-2, this is the program element index, which is assigned in a way that the bitstream order will be correct if the associated dependency layers of the video sub-bitstreams of the same access unit are re-assembled in increasing order of hierarchy_layer_index.

tref_present_flag—A 1-bit flag, which when set to '0' indicates that the TREF field may be present in the PES packet headers in the associated elementary stream. The value of '1' for this flag is reserved.

nuh_layer_id—A 6-bit field specifies the highest nuh_layer_id of the NAL units in the the elementary stream associated with this hierarchy_extension_descriptor( ).

temporal_id—A 3-bit field specifies the highest TemporalId of the NAL units in the elementary stream associated with this hierarchy_extension_descriptor( ).

num_embedded_layers—A 6-bit field that specifies the number of direct dependent program elements that needs to be accessed and be present in decoding order before decoding of the elementary stream associated with this hierarchy_extension_descriptor( ).

hierarchy_ext_embedded_layer_index—A 6-bit field that defines the hierarchy_layer_index of the program element that needs to be accessed and be present in decoding order before decoding of the elementary stream associated with this hierarchy_extension_descriptor( ). This field is undefined if the hierarchy_type value is 15.

hierarchy_channel—A 6-bit field that indicates the intended channel number for the associated program element in an ordered set of transmission channels. The most robust transmission channel is defined by the lowest value of this field with respect to the overall transmission hierarchy definition.

NOTE—A given hierarchy_channel may at the same time be assigned to several program elements.

2.6.99 HEVC Extension Descriptor

TABLE X

HEVC extension descriptor

| Syntax | No. Of bits | Mnemonic |
|---|---|---|
| HEVC_extension_descriptor( ) { | | |
|   descriptor_tag | 8 | uimsbf |
|   descriptor_length | 8 | uimsbf |
|   num_operation_points | 8 | uimsbf |
|   for( i=0; i < num_operation_points; i++) { | | bslbf |
|     profile_space | 2 | uimsbf |
|     tier_flag | 1 | bslbf |
|     profile_idc | 5 | uimsbf |
|     profile_compatibility_indication | 32 | bslbf |

TABLE X-continued

HEVC extension descriptor

| Syntax | No. Of bits | Mnemonic |
|---|---|---|
|     progressive_source_flag | 1 | bslbf |
|     interlaced_source_flag | 1 | bslbf |
|     non_packed_constraint_flag | 1 | bslbf |
|     frame_only_constraint_flag | 1 | bslbf |
|     reserved_zero_44bits | 44 | bslbf |
|     level_idc | 8 | bslbf |
|     max_temporal_id | 3 | bslbf |
|     reserved_zero_5bits | 5 | bslbf |
|     for (j =0 ; j < 64 ; j++) { | | |
|         hevc_output_layer_flag | 1 | bslbf |
|         hevc_layer_present_flag | 1 | bslbf |
|     } | | |
|     average_bit_rate | 16 | uimsbf |
|     maximum_bitrate | 16 | uimsbf |
|     frame_rate | 16 | uimsbf |
|     } | | |
| } | | |

2.6.100 Semantic Definition of Fields in HEVC Extension Descriptor num_operation_points—An 8-bit field that specifies the number of operation points specified by this descriptor.

profile_space—A 2-bit field specifies the context for the interpretation of profile_idc for all values of i in the range of 0 to 31, inclusive. profile_space shall not be assigned values other than those specified in Annex A or subclause G.11 or in subclause H.11 of Rec. ITU-T H.265|ISO/IEC 23008-2. Other values of profile_idc are reserved for future use by ITU-T|ISO/IEC.

tier_flag—A 1-bit field specifies the tier context for the interpretation of level_idc as specified in Annex A or subclause G.11 or subclause H.11 of Rec. ITU-T H.265|ISO/IEC 23008-2.

profile_idc—A 5-bit field that when profile_space is equal to 0, indicates a profile to which the CVS conforms as specified in Annex A or of Rec. ITU-T H.265|ISO/IEC 23008-2. profile_idc shall not be assigned values other than those specified in Annex A or G.11 or H.11 of Rec. ITU-T H.265|ISO/IEC 23008-2. Other values of profile_idc are reserved for future use by ITU-T|ISO/IEC.

profile_compatibility_indication, progressive_source_flag, interlaced_source_flag, non_packed_constraint_flag, frame_only_constraint_flag, reserved_zero_44 bits, level_idc—When the HEVC extension video descriptor applies to an HEVC extension video stream, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, general_level_idc, respectively, for the corresponding HEVC video stream or HEVC extension video stream or HEVC complete temporal representation, and the entire HEVC video stream or HEVC complete temporal representation to which the HEVC video descriptor is associated shall conform to the information signaled by these fields.

level_idc—A 8-bit field indicates a level to which the CVS conforms as specified in Annex A, G.11 or H.11 of Rec. ITU-T H.265|ISO/IEC 23008-2. level_idc shall not be assigned values of level_idc other than those specified in Annex A, G.11 or H.11 of Rec. ITU-T H.265|ISO/IEC 23008-2. Other values of level_idc are reserved for future use by ITU-T|ISO/IEC.

max_temporal_id—A 3-bit field that specifies the highest TemporalId of the NAL units of the layers in the i-th operation point.

reserved_zero_5 bits—A 5-bit field reserved of value '0'.

hevc_output_layer_flag—A 1-bit field when assigned value '1' indicates that layer with nuh_layer_id equal to j belongs to an output layer set and is required for output when the i-th operation point is decoded. When assigned value '0', the layer with nuh_layer_id equal to j is not required for output when the i-th operation. When the j-th hevc_output_layer_flag is equal to '1', the value of the j-th hevc_layer_present_flag shall be equal to '1'.

hevc_layer_flag—A 1-bit field when assigned value '1' indicates that nuh_layer_id equal to j belongs to a layer identifier set, each entry of which identifies a layer required to be decoded when the i-th operation point is decoded. When assigned value '0', the nuh_layer_id equal to i does not belong to the layer identifier set.

average_bitrate—A 16-bit field that indicates that the average bit rate, in 1000 bits per second, of the HEVC extension video stream corresponding to the i-th operation point.

maxitnum_bitrate—A 16-bit field that indicates the maximum bit rate, in kbit per second, of the HEVC extension video stream corresponding to the i-th operation point.

frame_rate—A 16-bit field indicates the maximum picture rate, in pictures per 256 seconds of the HEVC extension video stream corresponding to the i-th operation point.

Clause 2.17

Add the following after clause 2.16 as new subclause:

2.17 Carriage of HEVC 2.17.1 Constraints for the Transport of HEVC

For HEVC video streams, HEVC temporal video sub-bitstreams or HEVC temporal video subsets, the following constraints additionally apply:

Each HEVC access unit shall contain an access unit delimiter NAL unit;

NOTE X5—HEVC requires that an access unit delimiter NAL unit, if present, is the first NAL unit within an HEVC access unit. Access unit delimiter NAL units simplify the ability to detect the boundary between HEVC access units.

An HEVC video stream or HEVC temporal video sub-bitstream shall be an element of an ITU-T Rec. H.222.0|ISO/IEC 13818-1 program and the stream_type for this elementary stream shall be equal to 0x24.

The video parameter sets, sequence parameter sets and picture parameter sets, as specified in ITU-T Rec. H.265|ISO/IEC 23008-2, necessary for decoding an HEVC video stream or HEVC temporal video sub-bitstream shall be present within the elementary stream carrying that HEVC video stream or HEVC temporal video sub-bitstream.

For each HEVC temporal video subset that is an element of the same ITU-T Rec. H.222.0|ISO/IEC 13818-1 program, the stream_type for this elementary stream shall be equal to 0x25.

When an ITU-T Rec. H.222.0|ISO/IEC 13818-1 program includes more than one HEVC temporal video subset, or more than one HEVC temporal video sub-bitstream and at least one HEVC temporal video subset, a hierarchy descriptor as defined in 2.6.7 shall be present for all associated elementary streams with stream type equal to 0x24 or 0x25. The hierarchy descriptors shall be used to indicate the dependencies of all HEVC temporal video sub-bitstreams and all HEVC temporal video subsets.

In each elementary stream with stream_type equal to 0x24 with a hierarchy descriptor the hierarchy_type in the hierarchy descriptor shall be equal to 15.

In each elementary stream with stream_type equal to 0x25 with a hierarchy descriptor, the hierarchy_type in the hierarchy descriptor shall be equal to 3.

The video parameter sets, sequence parameter sets and picture parameter sets, as specified in ITU-T Rec. H.265|ISO/IEC 23008-2, necessary for decoding the HEVC highest temporal sub-layer representation of an HEVC temporal video subset shall be present within the elementary stream carrying the HEVC temporal video sub-bitstream associated by a hierarchy descriptor.

The aggregation of the HEVC temporal video sub-bitstream with associated HEVC temporal video subsets according to the hierarchy descriptors, as specified in section 2.17.3, shall result in a valid HEVC video stream.

NOTE X6—The resulting HEVC video stream contains a set of temporal sub-layers, as specified in Rec. ITU-T H.265|ISO/IEC 23008-2, with TemporalId values forming a contiguous range of integer numbers.

Each HEVC picture shall contain a layer picture delimiter NAL unit;

Each HEVC picture with nuh_layer_id larger than 0 shall either be contained within an elementary stream with stream_type equal to 0x26 or be contained within an elementary stream that has stream_type equal to 0x25 and contains HEVC pictures with nuh_layer_id equal to 0.

In each elementary stream with stream_type equal to 0x26 with a hierarchy descriptor, the hierarchy_type in the hierarchy descriptor shall be equal to 3.

2.14.3.9 Layer Picture Delimiter NAL Unit

See Table X-1.

TABLE X+1

| Layer picture delimiter NAL unit | | |
| --- | --- | --- |
| Syntax | No. of bits | Mnemonic |
| LPD_nal_unit( ) { | | |
|    forbidden_zero_bit | 1 | bslbf |
|    nal_unit_type | 6 | bslbf |
|    nuh_layer_id | 6 | bslbf |
|    nuh_temporal_id_plus1 | 3 | bslbf |
| } | | |

2.14.3.10 Semantics of Layer Picture Delimiter NAL Unit forbidden_zero_bit—shall be equal to 0x0 nal_unit_type—shall equal to 0x30 nuh_layer_id—specifies the layer identifier of the NAL unit.

nuh_temporal_id_plus1—nuh_temporal_id_plus1 minus 1 specifies a temporal identifier for the NAL unit. The value of nuh_temporal_id_plus1 shall not be equal to 0.

In each elementary stream with stream_type equal to 0x26, exactly one LPD_nal_unit may precede all the NAL units with the value of nuh_layer_id equal to that of the LPD_nal_unit.

Carriage in PES Packets

ITU-T Rec. H.265|ISO/IEC 23008-2 Video is carried in PES packets as PES_packet_data_bytes, using one of the 16 stream_id values assigned to video, while signalling the ITU-T Rec. H.265|ISO/IEC 23008-2 video stream by means of the assigned stream-type value in the PMT (see Table 2-34). The highest level that may occur in an HEVC video stream as well as a profile and tier that the entire stream conforms to should be signalled using the HEVC video descriptor. Other levels that may occur in an HEVC video stream as well as profiles and tiles of the sub-bistrems of the entire stream confirm to should be signalled using the HEVC extension video descriptor. If an HEVC video descriptor is associated with an HEVC video stream, an HEVC temporal video sub-bitstream, an HEVC temporal video subset, then this descriptor shall be conveyed in the descriptor loop for the respective elementary stream entry in the Program Map Table. This Recommendation|International Standard does not specify presentation of ITU-T Rec. H.265|ISO/IEC 23008-2 streams in the context of a program.

For PES packetization, no specific data alignment constraints apply. For synchronization and STD management, PTSs and, when appropriate, DTSs are encoded in the header of the PES packet that carries the ITU-T Rec. H.265|ISO/IEC 23008-2 video elementary stream data. For PTS and DTS encoding, the constraints and semantics apply as defined in 2.17.1.

DPB Buffer Management

Carriage of an HEVC video stream, an HEVC temporal video sub-streams or an HEVC temporal video subset over ITU-T Rec. H.222.0|ISO/IEC 13818-1 does not impact the size of buffer DPB. For decoding of an HEVC video stream, an HEVC temporal video sub-bitstream or an HEVC temporal video sub-bitstream and its associated HEVC temporal video subsets in the STD, the size of DPB is as defined in ITU-T Rec. H.265|ISO/IEC 23008-2. The DPB shall be managed as specified in Annex C or clause F.13 of ITU-T Rec. H.265|ISO/IEC 23008-2 (clauses C.3 and C.5). A decoded HEVC access unit enters the DPB instantaneously upon decoding of the HEVC access unit, hence at the CPB removal time of the HEVC access unit. A decoded HEVC access unit is presented at the DPB output time. If the HEVC video stream, HEVC temporal video sub-bitstream, HEVC temporal video subset or HEVC extension video stream provides insufficient information to determine the CPB removal time and the DPB output time of HEVC access units, then these time instants shall be determined in the STD model from PTS and DTS timestamps as follows:

1) The CPB removal time of HEVC layer pictures of HEVC access unit n is the instant in time indicated by DTS(n) where DTS(n) is the DTS value of HEVC access unit n. [Ed. (CY): MV-HEVC and SHVC support two HRD operation modes: the first one assumes the same CPB removal time for all HEVC layer pictures in an access unit, and the second one may assume different CPB removal times for different HEVC layer pictures. The first mode is typical and is the same as in MVC and SVC. Currently only the first mode is supported in the current spec. text. Further studies needed for the support of the second mode.]

2) The DPB output time of HEVC layer pictures of HEVC access unit n is the instant in time indicated by PTS(n) where PTS(n) is the PTS value of HEVC access unit n.

NOTE X7—HEVC video sequences in which the low_delay_hrd_flag in the syntax structure hrd_parameters( ) is set to 1 carry sufficient information to determine the DPB output time and the CPB removal time of each HEVC access unit. Hence for HEVC access units for which STD underflow may occur, the CPB removal time and the DPB output time are defined by HRD parameters, and not by DTS and PTS timestamps.

NOTE X8—An HEVC video stream may carry information to determine compliance of the HEVC video stream to the HRD, as specified in Annex C of ITU-T Rec. H.265|ISO/IEC 23008-2. The presence of this information can be signalled in a transport stream using the HEVC timing and HRD descriptor with the hrd_management_valid_flag set to '1'. Irrespective of the presence of this information, compliance of an HEVC video stream to the T-STD ensures that HRD buffer management requirements for CPB are met when each byte in the HEVC video stream is delivered to and removed from CPB in the HRD at exactly the same instant in time at which the byte is delivered to and removed from $EB_n$ in the T-STD.

2.17.2 T-STD Extensions for Single Layer HEVC

When there is an HEVC video stream or HEVC temporal video sub-bitstream in an ITU-T Rec. H.222.0|ISO/IEC 13818-1 program and there is no HEVC temporal video subset associated with this elementary stream of stream_type 0x24 in the same ITU-T Rec. H.222.0|ISO/IEC 13818-1 program, the T-STD model as described in 2.4.2 is extended as illustrated in Figure X-1 and as specified below.

Figure X-1—T-STD Model Extensions for Single Layer HEVC $TB_n$, $MB_n$, $EB_n$ Buffer Management The following additional notations are used to describe the T-STD extensions and are illustrated in Figure X-1 above.

t(i) indicates the time in seconds at which the i-th byte of the Transport Stream enters the system target decoder $TB_n$ is the transport buffer for elementary stream n TBS is the size of the transport buffer $TB_n$, measured in bytes $MB_n$ is the multiplexing buffer for elementary stream n $MBS_n$ is the size of the multiplexing buffer $MB_n$, measured in bytes $EB_n$ is the elementary stream buffer for the HEVC video stream j is an index to the HEVC access unit of the HEVC video stream $A_n(j)$ is the j-th access unit of the HEVC video bitstream $td_n(j)$ is the decoding time of $A_n(j)$, measured in seconds, in the system target decoder $Rx_n$ is the transfer rate from the transport buffer $TB_n$ to the multiplex buffer $MB_n$ as specified below.

$Rbx_n$ is the transfer rate from the multiplex buffer $MB_n$ to the elementary stream buffer $EB_n$ as specified below.

The following applies:

There is exactly one transport buffer $TB_n$ for the received HEVC video stream or HEVC temporal video sub-bitstream where the size TBS is fixed to 512 bytes.

There is exactly one multiplexing buffer $MB_n$ for the HEVC video stream or HEVC temporal video sub-bitstream, where the size $MBS_n$ of the multiplexing buffer MB is constrained as follows:

$MBS_n = BS_{mux} + BS_{oh} + CpbBrNal\text{Factor} \times Max CPB[\text{tier,level}] - cpb\_size$ where $BS_{oh}$, packet overhead buffering, is defined as:

$BS_{oh} = (1/750) \text{seconds} \times \max\{CpbBrNal\text{Factor} \times MaxBR[\text{tier,level}], 2\,000\,000\text{ bit/s}\}$ and $BS_{mux}$, additional multiplex buffering, is defined as:

$BS_{mux} = 0.004 \text{ seconds} \times \max\{CpbBrNal\text{Factor} \times MaxBR[\text{tier,level}], 2\,000\,000\text{ bit/s}\}$ MaxCPB[tier, level] and MaxBR[tier, level] are taken from Annex A of Rec. ITU-T H.265|ISO/IEC 23008-2 for the tier and level of the HEVC video stream or HEVC temporal video sub-bitstream. cpb_size is taken from the HRD parameters, as specified in Annex E of Rec. ITU-T H.265|ISO/IEC 23008-2, included in the HEVC video stream or HEVC temporal video sub-bitstream.

There is exactly one elementary stream buffer $EB_n$ for all the elementary streams in the set of received elementary streams associated by hierarchy descriptors, with a total size $EBS_n$ $EBS_n = cpb\_size$ (measured in bytes)

where cpb_size is taken from the HRD parameters, as specified in Annex E of Rec. ITU-T H.265|ISO/IEC 23008-2, included in the HEVC video stream or the HEVC temporal video sub-bitstream.

Transfer from $TB_n$ to $MB_n$ is applied as follows:

When there is no data in $TB_n$, then $Rx_n$ is equal to zero. Otherwise:

$Rx_n = bit\_rate$ where bit_rate is CpbBrNalFactor/CpbBrVclFactor×BitRate[SchedSelIdx] of data flow into the CPB for the byte stream format and BitRate[SchedSelIdx] is as defined in Annex E of Rec. ITU-T H.265|ISO/IEC 23008-2 when NAL HRD parameters are present in the VUI parameters of the HEVC video stream.

NOTE X9—Annex E also specifies default values for BitRate[SchedSelIdx] based on profile, tier and level when NAL HRD parameters are not present in the VUI.

Transfer from $MB_n$ to $EB_n$ is applied as follows:

If the HEVC_timing_and_HRD_descriptor is present with the hrd_management_valid_flag set to '1' for the elementary stream, then the transfer of data from $MB_n$ to $EB_n$ shall follow the HRD defined scheme for data arrival in the CPB of elementary stream as defined in Annex C of Rec. ITU-T H.265|ISO/IEC 23008-2.

Otherwise, the leak method shall be used to transfer data from $MB_n$ to $EB_n$ as follows:

$Rbx_n = CpbBrNal\text{Factor} \times MaxBR[\text{tier, level}]$ where MaxBR[tier, level] is taken from Annex A of Rec. ITU-T H.265|ISO/IEC 23008-2 for the tier and level of the HEVC video stream or HEVC temporal video sub-bitstream.

If there is PES packet payload data in $MB_n$, and buffer $EB_n$ is not full, the PES packet payload is transferred from $MB_n$ to $EB_n$ at a rate equal to $Rbx_n$. If $EB_n$ is full, data are not removed from $MB_n$. When a byte of data is transferred from $MB_n$ to $EB_n$, all PES packet header bytes that are in $MB_n$ and precede that byte are instantaneously removed and discarded. When there is no PES packet payload data present in $MB_n$, no data is removed from $MB_n$. All data that enters $MB_n$ leaves it. All PES packet payload data bytes enter $EB_n$ instantaneously upon leaving $MB_n$.

STD Delay

The STD delay of any ITU-T Rec. H.265|ISO/IEC 23008-2 data other than HEVC still picture data through the System Target Decoders buffers $TB_n$, $MB_n$, and $EB_n$ shall be constrained by $td_n(j) - t(i) \le 10$ seconds for all j, and all bytes i in access unit $A_n(j)$.

The delay of any HEVC still picture data through the System Target Decoders $TB_n$, $MB_n$, and $EB_n$ shall be constrained by $td_n(j) - t(i) \le 60$ seconds for all j, and all bytes i in access unit $A_n(j)$.

Buffer Management Conditions

Transport streams shall be constructed so that the following conditions for buffer management are satisfied:

Each $TB_n$ shall not overflow and shall be empty at least once every second.

Each $MB_n$, $EB_n$, and DPB shall not overflow.

$EB_n$ shall not underflow, except when VUI parameters are present for the HEVC video sequence with the low_delay_hrd_flag set to '1'. Underflow of $EB_n$ occurs for HEVC access unit $A_n(j)$ when one or more bytes of $A_n(j)$ are not present in $EB_n$ at the decoding time $td_n(j)$.

2.17.3 T-STD Extensions for Layered Transport of HEVC Temporal Video Subsets

When there is an HEVC video sub-bitstream and at least one associated elementary stream of type 0x25 in an ITU-T Rec. H.222.0|ISO/IEC 13818-1 program, the T-STD model as described in 2.4.2 is extended as illustrated in Figure X-2 and as specified below.

Figure X-2—T-STD Model Extensions for Layered Transport of HEVC Temporal Video Subsets The following additional notations are used to describe the T-STD extensions and are illustrated in Figure X-2 above.

t(i) indicates the time in seconds at which the i-th byte of the Transport Stream enters the system target decoder H is the number of received HEVC temporal video subsets, associated by hierarchy descriptors with the same HEVC temporal video sub-bitstream.

k is an index identifying the H+1 received elementary streams which contain exactly one HEVC temporal video sub-bitstream and H HEVC temporal video subsets associated by hierarchy descriptors. The index value k equal to 0 identifies the elementary stream which contains the HEVC temporal video sub-bitstream and index values k ranging from 1 up to H identify the associated HEVC temporal video subsets.

$ES_{n,k}$ is the received elementary stream which contains the k-th HEVC temporal video subset or the HEVC temporal video sub-bitstream if k equals 0

$ES_{n,H}$ is the received elementary stream containing the highest HEVC temporal video subset present in the set of received elementary streams $PID_H$ is the packet identifier value which identifies $ES_{n,H}$ j is an index to the output access units $A_n(j)$ is the j-th access unit of the HEVC complete temporal representation $td_n(j)$ is the decoding time of $A_n(j)$ in the system target decoder $TB_{n,k}$ is the transport buffer for elementary stream k $TBS_{n,k}$ is the size of the transport buffer $TB_{n,k}$, measured in bytes $MB_{n,k}$ is the multiplexing buffer for elementary stream k $MBS_{n,k}$ is the size of the multiplexing buffer $MB_{n,k}$, measured in bytes $EB_n$ is the elementary stream buffer for the received HEVC temporal video sub-bitstream $ES_{n,0}$ and the received HEVC temporal video subsets $ES_{n,1}$ to $ES_{n,H}$ $EBS_n$ is the size of elementary stream buffer $EB_n$, measured in bytes $RX_{n,k}$ is the transfer rate from the k-th transport buffer $TB_{n,k}$ to the k-th multiplex buffer $MB_{n,k}$ as specified below $Rbx_{n,k}$ is the transfer rate from the k-th multiplex buffer $MB_{n,k}$ to the elementary stream buffer $EB_n$ as specified below NOTE X10—The index n, where used, indicates that the received elementary streams and associated buffers belong to a certain HEVC temporal video sub-bitstream and its associated HEVC temporal video subsets, distinguishing these elementary streams and associated buffers from other elementary streams and buffers, maintaining consistency with the notation in Figure X-1.

$TB_{n,k}$, $MB_{n,k}$, $EB_n$ Buffer Management

The following applies:

There is one transport buffer $TB_{n,k}$ for each received elementary stream $ES_{n,k}$, where the size $TBS_{n,k}$ is fixed to 512 bytes.

There is one multiplex buffer $MB_{n,k}$ for each received elementary stream $ES_{n,k}$, where the size $MBS_{n,k}$ of the multiplex buffer $MB_{n,k}$ is constrained as follows:

$$MBS_{n,k} = BS_{mux} + BS_{oh} + CpbBrNalFactor \times MaxCPB[\text{tier, level}] - cpb\_size \text{ (measured in bytes)}$$

where $BS_{oh}$, packet overhead buffering, and $BS_{mux}$, additional multiplex buffering, are as specified in clause 2.17.2;

MaxCPB[tier, level] and MaxBR[tier, level] are taken from the tier and level specification of HEVC for the tier and level of the HEVC highest temporal sub-layer representation associated with $ES_{n,k}$;

cpb_size is taken from the HRD parameters, as specified in Annex E of Rec. ITU-T H.265|ISO/IEC 23008-2, included in the HEVC highest temporal sub-layer representation associated with $ES_{n,k}$.

There is exactly one elementary stream buffer $EB_n$ for the H+1 elementary streams in the set of received elementary streams $ES_{n,0}$ to $ES_{n,H}$, with a total size $EBS_n$ $EBS_n = cpb\_size$ (measured in bytes)

where cpb_size is taken from the HRD parameters, as specified in Annex E of Rec. ITU-T H.265|ISO/IEC 23008-2, included in the HEVC highest temporal sub-layer representation associated with $ES_{n,H}$.

Transfer from $TB_{n,k}$ to $MB_{n,k}$ is applied as follows:

When there is no data in $TB_{n,k}$ then $Rx_{n,k}$ is equal to zero. Otherwise:

$Rx_{n,k} = bit\_rate$ where bit_rate is as specified in clause 2.17.2.

Transfer from $MB_{n,k}$ to $EB_n$ is applied as follows:

If the HEVC_timing_and_HRD_descriptor is present with the hrd_management_valid_flag set to '1' for the HEVC video sub-bitstream, then the transfer of data from $MB_{n,k}$ to $EB_n$ shall follow the HRD defined scheme for data arrival in the CPB of elementary stream $ES_{n,H}$ as defined in Annex C of Rec. ITU-T H.265|ISO/IEC 23008-2.

Otherwise, the leak method shall be used to transfer data from $MB_{n,k}$ to $EB_n$ as follows:

$Rbx_{n,k} = CpbBrNalFactor \times MaxBR[\text{tier, level}]$ where MaxBR[tier, level] is defined for the byte stream format in Annex A of Rec. ITU-T H.265|ISO/IEC 23008-2 for the tier and level of the HEVC video stream or the HEVC highest temporal sub-layer representation associated with $ES_{n,k}$.

If there is PES packet payload data in $MB_{n,k}$, and $EB_n$ is not full, the PES packet payload is transferred from $MB_{n,k}$ to $EB_n$ at a rate equal to $Rbx_{n,k}$. If $EB_n$ is full, data are not removed from $MB_{n,k}$. When a byte of data is transferred from $MB_{n,k}$ to $EB_n$, all PES packet header bytes that are in $MB_{n,k}$ and precede that byte are instantaneously removed and discarded. When there is no PES packet payload data present in $MB_{n,k}$, no data is removed from $MB_{n,k}$. All data that enters $MB_{n,k}$ leaves it. All PES packet payload data bytes enter $EB_n$ instantaneously upon leaving $MB_{n,k}$.

At the output of the elementary stream buffer $EB_n$, the elementary streams are aggregated by removing all HEVC access units in ascending DTS order and transferring them to the HEVC decoder $D_H$, irrespective of which elementary stream $ES_{n,k}$ each HEVC access unit belongs to.

STD Delay

The STD delay of any ITU-T Rec. H.265|ISO/IEC 23008-2 data other than HEVC still picture data through the System Target Decoders buffers $TB_{n,k}$, $MB_{n,k}$, and $EB_n$ shall be constrained by $td_n(j)-t(i) \leq 10$ seconds for all k, all j, and all bytes i in access unit $An(j)$.

The delay of any HEVC still picture data through the System Target Decoders $TB_{n,k}$, $MB_{n,k}$, and $EB_n$ shall be constrained by $td_n(j)-t(i) \leq 60$ seconds for all k, all j, and all bytes i in access unit $A_n(j)$.

Buffer Management Conditions

Transport streams shall be constructed so that the following conditions for buffer management are satisfied:

Each $TB_{n,k}$ shall not overflow and shall be empty at least once every second.

Each $MB_{n,k}$, $EB_n$, and DPB shall not overflow.

$EB_n$ shall not underflow, except when VUI parameters are present for the HEVC video sequence with the low_delay_hrd_flag set to '1'. Underflow of $EB_n$ occurs for HEVC access unit $A_n(j)$ when one or more bytes of $A_n(j)$ are not present in $EB_n$ at the decoding time $td_n(j)$.

2.17.4 T-STD Extensions for Layered Transport of HEVC Layered Video Sub-Bitstream The T-STD model described in 2.17.2 or 2.17.3 is applied if the received elementary stream is a video sub-bitstream of stream_type 0x24 or 0x25, i.e. only the HEVC base layer video sub-bitstream or HEVC temporal video subset of the base layer is received and decoded.

When there is a set of HEVC layered video sub-bitstreams in a Rec. ITU-T H.222.0|ISO/IEC 13818-1 program, of which dependencies may be signalled in the hierarchy extension descriptor, as defined in 2.6.97, and when there is at least one of the HEVC layered video sub-bitstreams in the set of received elementary streams having the value of stream_type equal to 0x26, the T-STD model as described in 2.14.3.1 is extended as illustrated in Figure X-3 and as specified below.

FIG. 2-15—T-STD Model Extensions for Rec. ITU-T H.265|ISO/IEC 23008-2 Video with HEVC Layered Video Sub-Bitstreams The following additional notations are used to describe the T-STD extensions and are illustrated in FIG. 2-15 above.

$ES_n$ is the received elementary stream associated with the n-th HEVC layered video sub-bitstream, where n is the index to the HEVC layer identifier subsets starting with value 0 for the HEVC layer identifier subset containing the base layer and ordered according to the minimum nuh_layer_id of the layer identifier subsets $ES_H$ is the received elementary stream associated with the H-th HEVC layered video sub-bitstream which includes the layers with the highest nuh_layer_id present in all HEVC layered video sub-bitstreams of received elementary streams j is an index to the re-assembled access units $j_n$ is an index to the HEVC layer identifier sets of the elementary stream in $ES_n$ associated with the n-th HEVC layered video sub-bitstream $VS_n(j_n)$ is the $j_n$-th HEVC layer picture subset of the HEVC layered video sub-bitstream associated with $ES_n$ $A_H(j)$ is the j-th access unit resulting from re-assembling (up to) the H-th HEVC layer picture subset associated with $H_H$ $td_n(j_n)$ is the decoding time, measured in seconds, in the system target decoder of the HEVC layer picture subset $VS_n(j_n)$ $td_H(j)$ is the decoding time, measured in seconds, in the system target decoder of the j-th access unit $A_H(j)$ resulting from re-assembling (up to) the HEVC layer picture subset $VS_H(j_H)$ $TB_n$ is the transport buffer for elementary stream $ES_n$ $TBS_n$ is the size of the transport buffer $TB_n$, measured in bytes $MB_n$ is the multiplexing buffer for elementary stream $ES_n$ $MBS_n$ is the size of the multiplexing buffer $MB_n$, measured in bytes $VSB_n$ is the HEVC layer picture subset buffer for elementary stream $ES_n$ $VSBS_n$ is the size of HEVC layer picture subset buffer $VSB_n$, measured in bytes $EB_H$ is the elementary stream buffer for the HEVC layered video sub-bitstream, including the HEVC base layer video sub-bitstream $EBS_H$ is the size of elementary stream buffer $EB_H$, measured in bytes $Rx_n$ transfer rate from $TB_n$ to $MB_n$, as specified below $Rbx_n$ transfer rate from $MB_n$ to $VSB_n$, as specified below Carriage in PES Packets For correct re-assembling of the HEVC layer picture subsets to an HEVC access unit, the following applies:

a PES packet per HEVC layer picture subset start shall be present, i.e., at most one HEVC layer picture subset may commence in the same PES packet;

the PTS and, if applicable, the DTS value shall be provided in the PES header of each HEVC layer picture subset DPB Buffer Management The DPB buffer management for the re-assembled HEVC video stream shall conform to 2.17.2 or 2.17.3 using HEVC access unit timing values, as DTS or CPB removal time, and PTS or DPB removal time, associated with the HEVC layer picture subset of the HEVC layered video sub-bitstream in elementary stream $ES_H$.

$TB_n$, $MB_n$, $EB_n$ Buffer Management

The following applies:

There is exactly one transport buffer TB, as defined in 2.14.3.1, for each received elementary stream in the set of received HEVC layered video sub-bitstreams, including the HEVC base layer video sub-bitstream, contained in the elementary streams as shown in Figure X-3.

There is exactly one multiplexing buffer $MB_0$ for the HEVC base layer video sub-bitstream in the elementary stream $ES_0$, where the size of the multiplexing buffer $MBS_0$ is constrained as follows:

$$MBS_0 = BSmux_{,0} + BSoh_{,0} + CpbBrNalFactor \times MaxCPB[tier, level]_0 - cpb\_size_0$$

where $BSmux_{,0}$, $BSoh_{,0}$ are defined in 2.14.3.1 for the HEVC base layer video sub-bitstream in elementary stream $ES_0$.

where $MaxCPB[tier, level]_0$ and $cpb\_size_0$ for the elementary stream $ES_0$ are defined, as in 2.14.3.1.

NOTE 1—If HRD parameters are present in at least one of the HEVC layered video sub-bitstreams, those parameters have to be carefully handled in order to not unnecessarily increase the multiplexing buffers allocation.

There is exactly one multiplexing buffer $MB_n$ for each received elementary stream associated with nuh_layer_id value not equal to 0, where the size of each multiplexing buffer $MBS_n$ in the set of received elementary streams is constrained as follows:

$$MBS_n = BSmux, n + BSoh, n$$

where BSmux,n, BSoh,n are defined in 2.14.3.1 for the HEVC video stream resulting from re-assembling (up to) the HEVC layered video sub-bitstream in elementary stream $ES_n$.

There is exactly one elementary stream buffer $EB_H$ for all the elementary streams in the set of received elementary streams as shown in Figure X-3, of which the size $EBS_H$ has the following value:

$$EBS_H = cpb\_size_H$$

where $cpb\_size_H$ is the cpb_size for the HEVC layered video sub-bitstream in elementary stream $ES_H$ as defined in 2.14.3.1 for the re-assembled HEVC video stream.

There is exactly one HEVC layer picture subset buffer $VSB_n$ for each elementary stream in the set of received elementary streams as shown in Figure X-3, where each HEVC layer picture subset buffer $VSB_n$ in the set of received elementary streams is allocated within $EB_H$. Even though the size $VSBS_n$ of individual $VSB_n$ is not constrained, the sum of the sizes $VSBS_n$ is constrained as follows:

$$EBS_H = \Sigma_n(VSBS_n)$$

Transfer from $TB_n$ to $MB_n$ is applied as follows:

Rate $Rx_n$:

If there is no data in $TB_n$, $Rx_n$ is equal to zero.

Otherwise: $Rx_n$ = bit_rate where bit_rate is CpbBrNalFactor/CpbBrVclFactor×BitRate[SchedSelIdx] of data flow into the CPB for the byte stream format and BitRate[SchedSelIdx] is as defined in Rec. ITU-T H.265|ISO/IEC 23008-2 when NAL HRD parameters are present in the VPS for the HEVC layered video sub-bitstream.

Transfer from $MB_n$ to $VSB_n$ is applied as follows:

If the HEVC_timing_and_HRD_descriptor is present with the hrd_management_valid_flag set to '1' for the elementary stream $ES_H$, then the transfer of data from $MB_n$ to $VSB_n$ shall follow the HRD defined scheme for data arrival in the CPB of elementary stream $ES_H$ as defined in Annex C of Rec. ITU-T H.265|ISO/IEC 23008-2.

Otherwise, the leak method shall be used to transfer data from $MB_n$ to $VSB_n$ as follows:

Rate $Rbx_n$:

$$Rbx_n = CpbBrNal\text{Factor} \times \text{Max}BR[\text{tier,level}]_n$$

where MaxBR[tier, level]$_n$ is defined for the byte stream format in Table A.1 (Level limits) in Rec. ITU-T H.265|ISO/IEC 23008-2 for the level of the HEVC video stream resulting from re-assembling (up to) the associated HEVC layered video sub-bitstream n in elementary stream $ES_n$. If there is PES packet payload data in $MB_n$, and buffer $EB_H$ is not full, the PES packet payload is transferred from $MB_n$ to $VSB_n$ at a rate equal to $Rbx_n$. If $EB_H$ is full, data are not removed from $MB_n$. When a byte of data is transferred from $MB_n$ to $VSB_n$, all PES packet header bytes that are in $MB_n$ and precede that byte are instantaneously removed and discarded. When there is no PES packet payload data present in $MB_n$, no data is removed from $MB_n$. All data that enters $MB_n$ leaves it. All PES packet payload data bytes enter $VSB_n$ instantaneously upon leaving $MB_n$.

[Ed (CY): to be updated based on the latest MV-HEVC specification.]

Access Unit Re-Assembling and EB Removal

The following specifies the access unit re-assembling that results in HEVC access unit $A_H(j)$.

i) Assemble the HEVC layer picture subsets for the j-th access unit $A_H(j)$ following the rule below:

For an HEVC layer picture subsets $VS_{y+1}(j_{y+1})$ and each $VS_y(j_y)$ collected for access unit $A_H(j)$, where $VS_y$ is associated with a program element identified by each value of hierarchy_ext_embedded_layer_index indicated in the associated hierarchy extension descriptor, the DTS value of $td_{y+1}(j_{y+1})$ of $VS_{y+1}(j_{y+1})$ shall be equal to DTS value $td_y(j_y)$ of $VS_y(j_y)$.

NOTE 3—If no hierarchy extension descriptor is present, $VS_y$ is associated with the HEVC base layer video sub-bitstream and $VS_{y+1}$ is associated with the HEVC layered video sub-bitstream.

[Ed. (CY): reordering of the SEI messages as for MVC and SVC are removed here.]

The following specifies the removal of access unit $A_H(j)$ from buffer $EB_H$:

At the decoding time $td_H(j)$, the HEVC access unit $A_H(j)$ shall be re-assembled and available for removal from buffer $EB_H$. The decoding time $td_H(j)$ is specified by the DTS or by the CPB removal time that is associated with the HEVC layer picture subsets in elementary stream $ES_H$, as derived from information in the re-assembled AVC video stream.

STD Delay

The STD delay for re-assembled HEVC access units shall follow the constraints specified in 2.17.1.

Buffer Management Conditions

Transport streams shall be constructed so that the following conditions for buffer management are satisfied:

Each $TB_n$ shall not overflow and shall be empty at least once every second.

Each $MB_n$, $EB_H$, and DPB shall not overflow.

$EB_H$ shall not underflow, except when VUI parameters are present for the AVC video sequence of the re-assembled AVC video stream with the low_delay_hrd_flag set to '1'. Underflow of $EB_H$ occurs for HEVC access unit $A_H(j)$ when one or more bytes of $A_H(j)$ are not present in $EB_H$ at the decoding time $td_H(j)$.

2.17.5 P-STD Extensions for HEVC Layered Video Sub-Bitstream

The P-STD model is applied if the decoded elementary stream is a video sub-bitstream of stream_type 0x24 or 0x25, i.e., only the HEVC base layer video sub-bitstream is decoded.

When there is a set of decoded HEVC layered video sub-bitstreams in a Rec. ITU-T H.222.0|ISO/IEC 13818-1 program, of which layer identifier subset values may be signalled in the HEVC_extension_descriptor, as defined in 2.6.99, and when there is at least one of the HEVC layered video sub-bitstreams in the set of decoded elementary streams having the value of stream_type equal to 0x26, the P-STD model, as described in 2.14.3.2, is extended as illustrated in Figure X-4 and as specified below.

Figure X-4—P-STD Model Extensions for Rec. ITU-T H.265|ISO/IEC 23008-2 Video with HEVC Layered Video Sub-Bitstreams The following additional notations are used to describe the P-STD extensions and are illustrated in Figure X-4 above.

$ES_n$ is the received elementary stream associated with the n-th HEVC layered video sub-bitstream, where n is the index to the HEVC layer identifier subsets starting with value 0 for the HEVC layer identifier subset containing the base layered and ordered according to the minimum nuh_layer_id contained in each HEVC layer identifier subset $ES_H$ is the received elementary stream associated with the H-th layered video sub-bitstream which includes the HEVC layer pictures with the highest nuh_layer_id present in all HEVC layer identifier subsets of received elementary streams j is an index to the re-assembled access units $j_n$ is an index to the HEVC layer picture subsets of the elementary stream in associated with the n-th HEVC layer picture subset $VS_n(j_n)$ is the $j_n$-th HEVC layer picture subset of the HEVC layered video sub-bitstream associated with $ES_n$ $A_H(j)$ is the j-th access unit resulting from re-assembling (up to) the H-th HEVC layer picture subset associated with $ES_H$ $td_n(j_n)$ is the decoding time, measured in seconds, in the system target decoder of the HEVC layer picture subset $VS_n(j_n)$ $td_H(j)$ is the decoding time, measured in seconds, in the system target decoder of the j-th access unit $A_H(j)$ resulting from re-assembling (up to) the HEVC layer picture subset $VS_H(j_H)$ $B_H$ is the input buffer for all decoded HEVC layered video sub-bitstreams $BS_H$ is the size of the input buffer $B_H$, measured in bytes $VSB_n$ is the HEVC layered picture subset buffer for elementary stream $ES_n$ $VSBS_n$ is the size of HEVC layered picture subset buffer $VSB_n$, measured in bytes Carriage in PES Packets For correct re-assembling of the HEVC layer picture subsets to an HEVC access unit, the following applies:
  a PES packet per HEVC layer picture start shall be present, i.e., at most one HEVC layer picture subset may commence in the same PES packet;
  the PTS and, if applicable, the DTS value shall be provided in the PES header of each HEVC layer picture subset.

DPB Buffer Management

The DPB buffer management for the re-assembled HEVC video stream shall conform to 2.14.3.1 of MPEG-2 TS using HEVC access unit timing values, as DTS or CPB removal time, and PTS or DPB removal time, associated with the HEVC layer picture subsets of the HEVC layered video sub-bitstream in elementary stream $ES_H$.

$B_n$ Buffer Management

The following applies:
  There is exactly one elementary stream buffer $B_H$ for all the elementary streams in the set of decoded elementary streams as shown in Figure X-4, where the size of $BS_H$ is defined by the P-STD_buffer_size field in the PES packet header of elementary stream $ES_H$.
  There is exactly one HEVC layer picture subset buffer $VSB_n$ for each elementary stream in the set of decoded elementary streams as shown in Figure X-4, where each HEVC layer subset buffer $VSB_n$ in the set of decoded elementary streams is allocated within $BS_H$.

Even though the size $VSBS_n$ of individual $VSB_n$ is not constrained, the sum of the sizes $VSBS_n$ is constrained as follows:

$$BS_H = \Sigma_n(VSBS_n)$$

where $BS_H$ is the size of the input buffer for the MVC video sub-bitstream in elementary stream $ES_H$, as defined in 2.14.3.2, for the re-assembled AVC video stream.

Access Unit Re-Assembling and B Removal

The following specifies the access unit re-assembling that results in AVC access unit $A_H(j)$:
  i) Assemble the HEVC layer picture subsets for the j-th access unit $A_H(j)$ following the rule below:
    For an HEVC layer picture subset $VS_{y+1}(j_{y+1})$ and each $VS_y(j_y)$ collected for access unit $A_H(j)$, where $VS_y$ is associated with a program element identified by each value of the hierarchy_ext_embedded_layer_index indicated in the associated hierarchy extension descriptor, the DTS value of $td_{y+1}(j_{y+1})$ of $VS_{y+1}(j_{y+1})$ shall be equal to DTS value $td_y(j_y)$ of $VS_y(j_y)$.

The following specifies the removal of access unit $A_H(j)$ from buffer $B_H$:
  At the decoding time $td_H(j_H)$, the HEVC access unit $A_H(j_H)$ shall be re-assembled and available for removal from buffer $B_H$. The decoding time $td_H(j)$ is specified by the DTS or by the CPB removal time that is associated with the HEVC layer picture subsets in elementary stream $ES_H$, as derived from information in the re-assembled AVC video stream.

STD Delay

The STD delay for the re-assembled HEVC access units shall follow the constraints specified in 2.17.1.

Buffer Management Conditions

Program streams shall be constructed so that the following conditions for buffer management are satisfied:
  $B_H$ shall not overflow.
  $B_H$ shall not underflow, except when VUI parameters are present for the HEVC video sequence of the re-assembled HEVC video stream with the low_delay_hrd_flag set to '1', or when trick_mode status is true. Underflow of $B_H$ occurs for AVC access unit $A_H(j)$ when one or more bytes of $A_H(j)$ are not present in $B_H$ at the decoding time $td_H(j)$.

The techniques described in this disclosure may be performed by any of a variety of video processing devices, such as video encoder 20, video decoder 30, or other devices, such as splicing engines, media aware network elements (MANEs), streaming servers, routers, and other devices that encode, decode, assemble, construct, extract or otherwise process coded video bitstreams.

Figure 6:
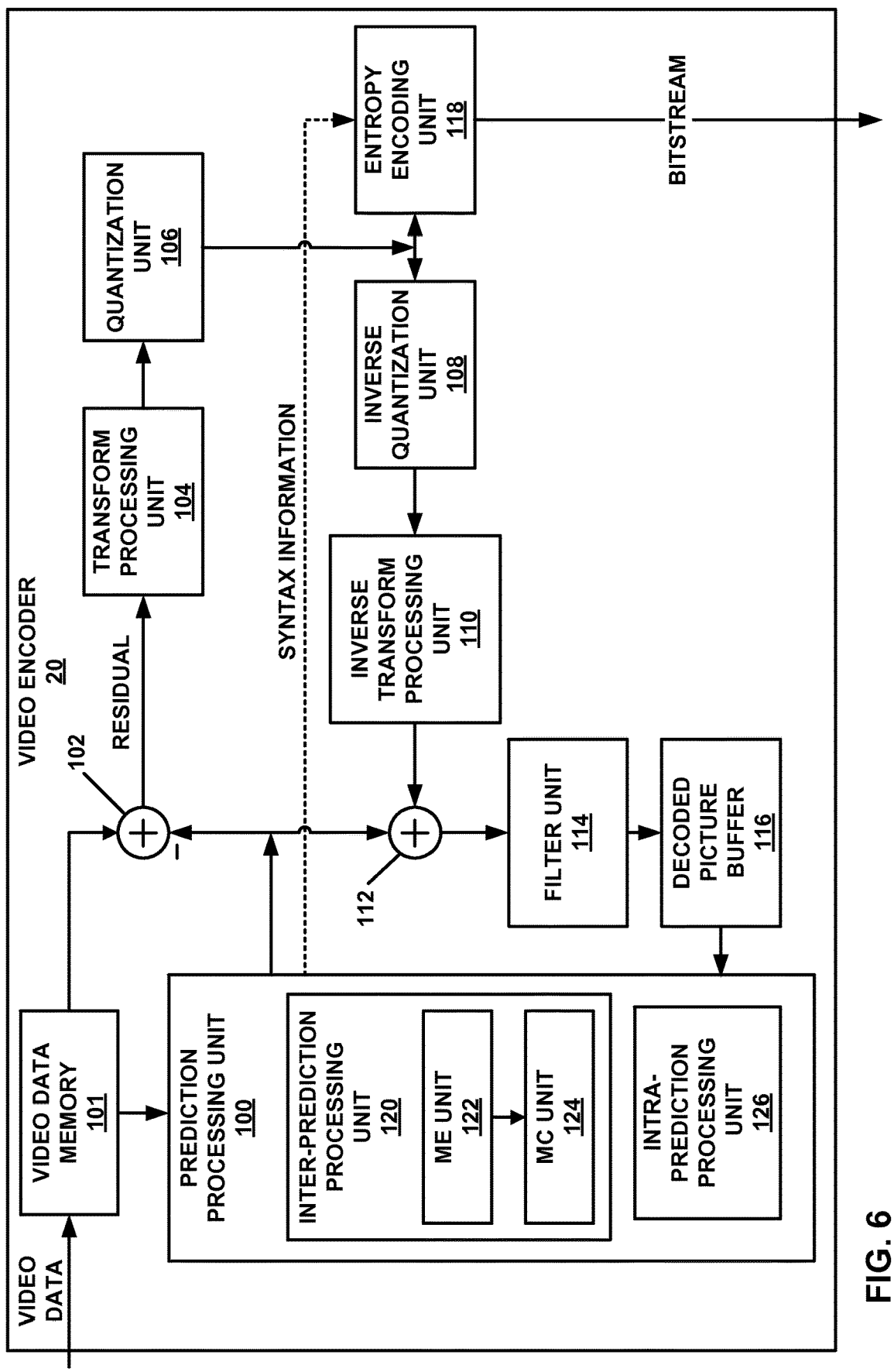
FIG. 6 is a block diagram illustrating an example video encoder that may implement the techniques of this disclosure.

FIG. 6 is a block diagram illustrating an example video encoder 20 that may be configured to implement the techniques of this disclosure, such as techniques for carriage of HEVC multi-layer extension bitstreams, including multiview HEVC (MV-HEVC), scalable HEVC (SHVC), and three-dimensional HEVC (3D-HEVC) extension bitstreams, with MPEG-2 systems.

This disclosure describes video encoder 20 in the context of HEVC coding and, more particularly, MV-HEVC, SHVC, and 3D-HEVC coding extensions. However, the techniques of this disclosure may be applicable to other video coding standards or methods. Accordingly, FIG. 6 is provided for purposes of explanation and should not be considered limiting of the techniques as broadly exemplified and described in this disclosure.

In the example of FIG. 6, video encoder 20 includes a prediction processing unit 100, a video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124.

The components of prediction processing unit 100 are described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding. Video encoder 20 may include more, fewer, or different functional components than shown in FIG. 6.

In some examples, prediction processing unit 100 may operate substantially in accordance with MV-HEVC, SHVC, or 3D-HEVC, e.g., subject to modifications and/or additions described in this disclosure. Prediction processing unit 100 may provide syntax information to entropy encoding unit 118. The syntax information may indicate, for example, which prediction modes were used and information relating to such modes.

Video encoder 20 receives video data to be encoded. Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may encode each of a plurality of coding tree units (CTU) in a slice of a picture of the video data. Each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predictive block is formed using spatial prediction from previously-encoded neighboring blocks within the same picture.

If a PU is in a P slice, motion estimation (ME) unit 122 may search the reference pictures in a list of reference pictures (e.g., "RefPicList0") for a reference region for the PU. The reference pictures may be stored in decoded picture buffer 116. The reference region for the PU may be a region, within a reference picture, that contains sample blocks that most closely correspond to the sample blocks of the PU. Motion estimation (ME) unit 122 may generate a reference index that indicates a position in RefPicList0 of the reference picture containing the reference region for the PU.

In addition, for inter-coding, motion estimation (ME) unit 122 may generate a motion vector (MV) that indicates a spatial displacement between a coding block of the PU and a reference location associated with the reference region. For instance, the MV may be a two-dimensional vector that provides an offset from the coordinates in the current picture to coordinates in a reference picture. Motion estimation (ME) unit 122 may output the reference index and the MV as the motion information of the PU. Motion compensation (MC) unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation (ME) unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 124 may generate the predictive blocks of the PU based at least in part on actual or interpolated samples at the reference region indicated by the motion vector of the PU.

To perform bi-directional inter-prediction for a PU, motion estimation unit 122 may search the reference pictures in RefPicList0 for a reference region for the PU and may also search the reference pictures in RefPicList1 for another reference region for the PU. Motion estimation (ME) unit 122 may generate reference picture indexes that indicate positions in RefPicList0 and RefPicList1 of the reference pictures that contain the reference regions. In addition, motion estimation (ME) unit 122 may generate MVs that indicate spatial displacements between the reference location associated with the reference regions and a sample block of the PU. The motion information of the PU may include the reference indexes and the MVs of the PU. Motion compensation (MC) unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The intra-predictive data for the PU may include predictive blocks for the PU and various syntax elements. Intra-prediction processing unit 126 may perform intra prediction on PUs in I slices, P slices, and B slices. To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques.

To use some intra prediction modes to generate a set of predictive data for the PU, intra-prediction processing unit 126 may extend samples from sample blocks of spatially neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on a coding block (e.g., a luma, Cb or Cr coding block) of a CU and the selected inter- or intra-predictive block (e.g., a luma, Cb or Cr predictive block) of the PUs of the CU, a residual block (e.g., a luma, Cb or Cr residual block) of the CU. For instance, residual generation unit 102 may generate the residual blocks of the CU such that each sample in the residual blocks has a value equal to a difference between a sample in a coding block of the CU and a corresponding sample, i.e., in luma or chroma pixel value, as applicable, in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

For regular residual coding, transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may, for regular residual coding, quantize the residual transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block of a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more filtering operations to reduce artifacts, such as blocking artifacts, in the coding blocks associated with a reconstructed CU. The filtering operations may include one or more of: deblocking to remove blockiness at block boundaries, loop filtering to smooth pixel transitions, sample adaptive offset filtering to smooth pixel transitions, or possibly other types of filtering operations or techniques. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from various functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation. Examples of other entropy coding processes include context-adaptive variable length coding (CAVLC), syntax-based context-adaptive binary arithmetic coding (SBAC), and Probability Interval Partitioning Entropy (PIPE) coding. In HEVC, CABAC is used. Video encoder 20 may output a bitstream that includes entropy-encoded data generated by entropy encoding unit 118. For instance, the bitstream may include bits that represent bins of binary syntax elements or binarized syntax elements.

Figure 7:
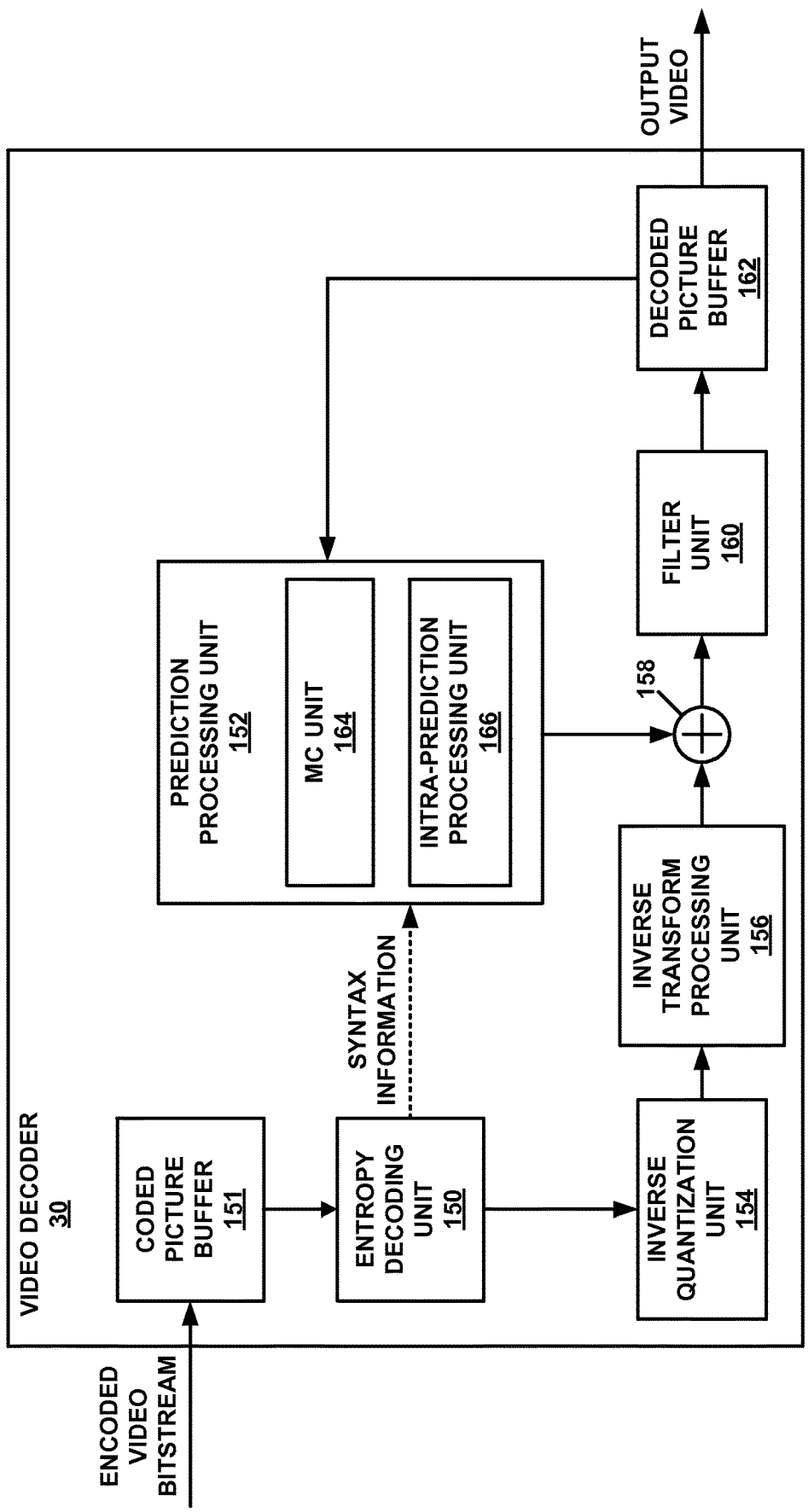
FIG. 7 is a block diagram illustrating an example video decoder that may implement the techniques of this disclosure.

FIG. 7 is a block diagram illustrating an example video decoder 30 that is configured to perform the techniques of this disclosure, such as techniques for carriage of HEVC multi-layer extension bitstreams, including multiview HEVC (MV-HEVC), scalable HEVC (SHVC), and three-dimensional HEVC (3D-HEVC) extension bitstreams, with MPEG-2 systems. FIG. 7 is provided for purposes of illustration and should not be considered limiting of the techniques as broadly exemplified and described in this disclosure. This disclosure describes video decoder 30 in the context of HEVC coding extensions and, in particular, MV-HEVC, SHVC, and 3D-HEVC coding extensions. However, the techniques of this disclosure may be applicable to other video coding standards or methods. Accordingly, FIG. 7 is provided for purposes of explanation and should not be considered limiting of the techniques as broadly exemplified and described in this disclosure.

In the example of FIG. 7, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation (MC) unit 164 for inter-prediction and an intra-prediction processing unit 166. For ease of illustration, the components of prediction processing unit 152 are described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process.

Accordingly, prediction processing unit 152 may operate substantially in accordance with MV-HEVC, SHVC, or 3D-HEVC, subject to modifications and/or additions described in this disclosure. Prediction processing unit 152 may obtain residual data from the encoded video bitstream for intra-decoded or inter-decoded depth data, via entropy decoding unit 150, and reconstruct CU's using intra-predicted or inter-predicted depth data and the residual data. In some examples, video decoder 30 may include more, fewer, or different functional components than shown in FIG. 7.

Video decoder 30 receives an encoded video bitstream. A coded picture buffer (CPB) 151 may receive and store encoded video data (e.g., NAL units) of a bitstream. The video data stored in CPB 151 may be obtained, for example, from computer-readable medium 16, e.g., from a local video source, such as a camera, via wired or wireless network communication of video data, or by accessing physical data storage media. CPB 151 may form a video data memory that stores encoded video data from an encoded video bitstream. Decoded picture buffer 162 may be a reference picture memory that stores reference video data for use in decoding video data by video decoder 30, e.g., in intra- or inter-coding modes. CPB 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 151 and decoded picture buffer 162 may be provided by the same memory device or separate memory devices. In various examples, CPB 151 may be on-chip with other components of video decoder 30, or off-chip relative to those components.

Entropy decoding unit 150 parses the bitstream to decode entropy-encoded syntax elements from the bitstream. In some examples, entropy decoding unit 150 may be configured to use a CABAC coder to decode, from bits in the bitstream, bins for syntax elements. Entropy decoding unit 150 may use the CABAC coder to decode a variety of other syntax elements for different coding modes, including intra- or inter-coding modes.

Prediction processing unit 152, inverse quantization unit 154, inverse transform processing unit 156, reconstruction unit 158, and filter unit 160 may generate decoded video data based on the syntax elements extracted from the bitstream. The bitstream may comprise a series of NAL units. The NAL units of the bitstream may include coded slice NAL units. As part of decoding the bitstream, entropy decoding unit 150 may extract and entropy decode syntax elements from the coded slice NAL units. Some syntax elements of the bitstream are not entropy encoded or decoded.

Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages. Decoded syntax elements in any of the slice header, parameter sets, or SEI messages may include information described herein as being signaled in accordance with example techniques described in this disclosure. Such syntax information may be provided to prediction processing unit 152 for decoding and reconstruction of texture or depth blocks.

Video decoder 30 may perform a reconstruction operation on non-partitioned CUs and PUs. To perform the reconstruction operation, video decoder 30 may perform a reconstruction operation on each TU of the CU. By performing the reconstruction operation for each TU of the CU, video decoder 30 may reconstruct blocks of the CU. As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra-prediction, intra-prediction processing unit 166 may perform intra prediction to generate predictive blocks for the PU. Intra-prediction processing unit 166 may use an intra prediction mode to generate the predictive blocks (e.g., luma, Cb and Cr predictive blocks) for the PU based on the prediction blocks of spatially-neighboring PUs. Intra-prediction processing unit 166 may determine the intra prediction mode for the PU based on one or more syntax elements decoded from the bitstream.

If a PU is encoded using inter-prediction, MC unit 164 may perform inter prediction to generate an inter-predictive block for the PU. MC unit 164 may use an inter prediction mode to generate the predictive blocks (e.g., luma, Cb and Cr predictive blocks) for the PU based on blocks in other pictures or views. MC unit 164 may determine the inter prediction mode for the PU based on one or more syntax elements decoded from the bitstream, and may receive or determine motion information such as motion vectors, prediction direction, and reference picture indexes.

For inter-prediction, MC unit 164 may construct a first reference picture list (RefPicList0) and a second reference picture list (RefPicList1) based on syntax elements extracted from the bitstream. If a PU is encoded using inter prediction, entropy decoding unit 150 may extract or determine motion information for the PU. MC unit 164 may determine, based on the motion information of the PU, one or more reference blocks for the PU. Motion compensation (MC) unit 164 may generate, based on samples in blocks at the one or more reference blocks for the PU, predictive blocks (e.g., luma, Cb and Cr predictive blocks) for the PU.

Reconstruction unit 158 may use the transform blocks (e.g., luma, Cb and Cr transform blocks) of TUs of a CU and the predictive blocks (e.g., luma, Cb and Cr predictive blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add residual samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on luma, Cb and Cr blocks in decoded picture buffer 162, intra prediction or inter prediction operations on PUs of other CUs.

The various techniques described in this disclosure may be performed by video encoder 20 (FIGS. 1 and 6) and/or video decoder 30 (FIGS. 1 and 7), both of which may be generally referred to as a video coder. In addition, video coding may generally refer to video encoding and/or video decoding, as applicable.

While the techniques of this disclosure are generally described with respect to MV-HEVC, SHVC, and 3D-HEVC, the techniques are not necessarily limited in this way. The techniques described above may also be applicable to other current standards or future standards.

Figure 8:
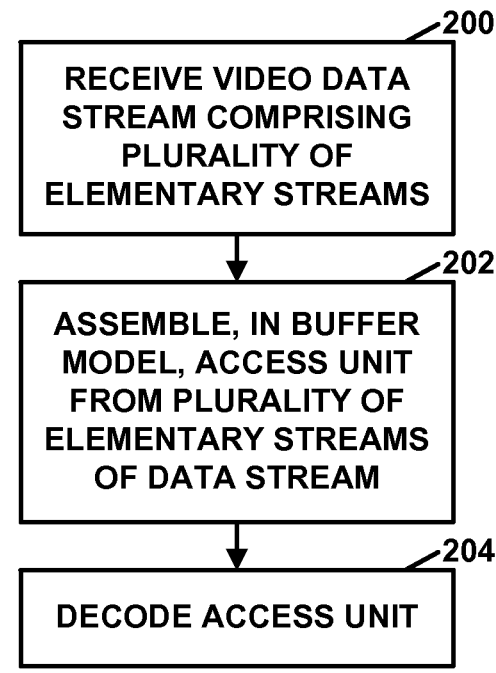
FIG. 8 is a flowchart illustrating an example operation of a video decoder, in accordance with one or more techniques of this disclosure.

FIG. 8 is a flowchart illustrating an example operation of video decoder 30, in accordance with one or more techniques of this disclosure. The operation of FIG. 8 and operations of other flowcharts of this disclosure are provided as examples. Other operations in accordance with the techniques of this disclosure may include more, fewer, or different actions.

Figure 9:
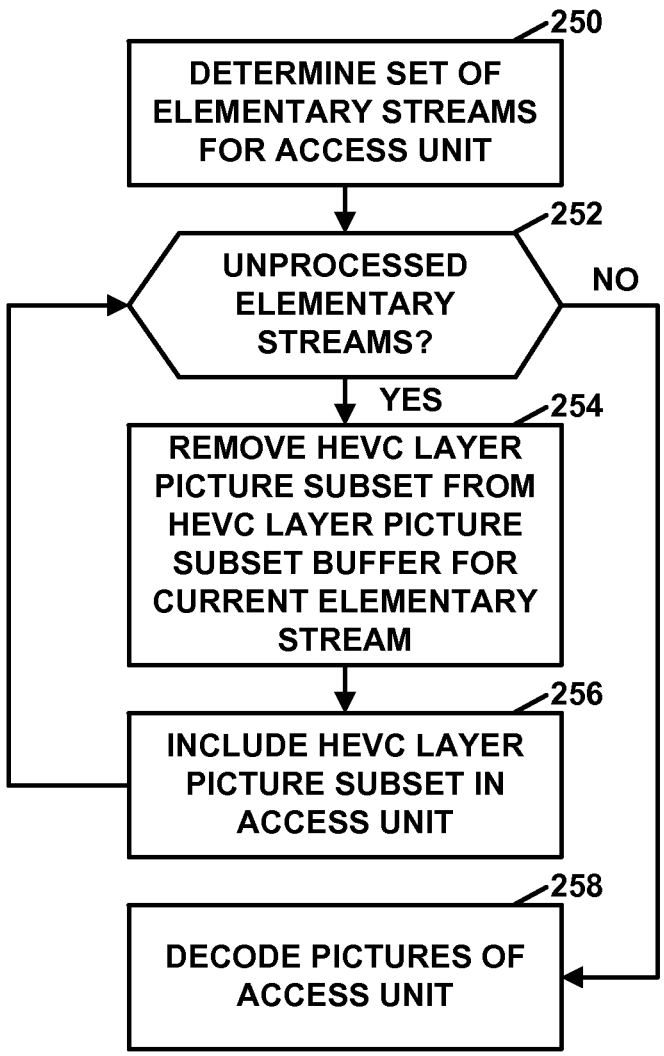
FIG. 9 is a flowchart illustrating an example operation of a video decoder to assemble and decode an access unit, in accordance with one or more techniques of this disclosure.

In the example of FIG. 8, video decoder 30 receives a video data stream comprising a plurality of elementary streams (200). Furthermore, video decoder 30 assembles, in a buffer model, an access unit from the plurality of elementary streams of the video data stream (202). In this example, the video data stream may be a transport stream or a program stream. The same buffer model is used for assembling the access unit regardless of whether the elementary streams contain Scalable High Efficiency Video Coding (SHVC), Multi-View HEVC (MV-HEVC), or 3D-HEVC bitstreams. Furthermore, in the example of FIG. 8, video decoder 30 may decode the access unit (204). The access unit may comprise one or more pictures of the video data FIG. 9 is a flowchart illustrating an example operation of video decoder 30 to assemble and decode an access unit, in accordance with one or more techniques of this disclosure. In the example of FIG. 9, video decoder 30 may determine a set of elementary streams (e.g., program elements) for an access unit (250). Video decoder 30 may determine the set of elementary streams for the access unit in various ways.

For example, video decoder 30 may be decoding a current operation point. In this example, an HEVC extension descriptor may specify hevc_output_layer_flags for the current operation point. The hevc_output_layer_flags indicate whether particular layers are in an output layer set for the current operation point. Thus, in this example, video decoder 30 may determine, based on the hevc_output_layer_flags for the current operation point, the output layer set for the current operation point. In this example, for each respective output layer in the output layer set for the current operation point, video decoder 30 may determine a set of elementary streams. For ease of explanation, this disclosure refers to the determined set of elementary streams as the output set of elementary streams. Each respective elementary stream in the output set of elementary streams corresponds to the respective output layer of the current operation point.

Furthermore, in this example, each respective elementary stream of the output set of elementary streams is associated with a respective hierarchy extension descriptor that includes a respective set of hierarchy_ext_embedded_layer_index fields. The respective set of hierarchy_ext_embedded_layer_index fields identifies dependent elementary streams for the respective elementary stream. Video decoder 30 includes the output set of elementary streams and the dependent elementary streams for each elementary stream of the output set of elementary streams in the set of elementary streams for the access unit.

Furthermore, in the example of FIG. 9, video decoder 30 determines whether a set of elementary streams for the access unit includes any unprocessed elementary streams (252). Responsive to determining that the set of elementary streams for the access unit includes one or more unprocessed elementary streams ("YES" of 252), video decoder 30 may remove an HEVC layer picture subset from an HEVC layer picture subset buffer for one of the unprocessed elementary streams (i.e., the current elementary stream) (254). Each picture of the HEVC layer picture subset has a decoding timestamp equal to a decoding time stamp of the access unit. Video decoder 30 may include the HEVC layer picture subset in the reassembled access unit (256). The current elementary stream is then considered to be processed. Video decoder 30 may then determine again whether the set of elementary streams for the access unit includes one or more unprocessed elementary streams (252).

If there are no remaining unprocessed elementary streams, video decoder 30 has included in the reassembled access unit an HEVC layer picture subset for each elementary stream of the set of elementary streams for the access unit. Thus, responsive to determining that there are no remaining unprocessed elementary streams ("NO" of 252), video decoder 30 may decode pictures of the access unit (258).

The following paragraphs describe various examples of the techniques of this disclosure.

Example 1

A method of processing video data, the method comprising, for carriage of HEVC extension streams with an MPEG-2 system, using SHVC, MV-HEVC and 3D-HEVC buffer models that are unified in a same layer based model.

Example 2

The method of claim 1, wherein the buffer models include T-STD models and P-STD models.

Example 3

The method of example 1, wherein the buffer models are similar to the T-STD model and P-STD model used for MVC.

Example 4

A method of processing video data, the method comprising, for carriage of HEVC extension streams with an MPEG-2 sytem, using a T-STD model and/or P-STD model for each HEVC layered video stream, wherein each HEVC layered video stream corresponds to an operation point that is assembled from HEVC layered video sub-bitstreams.

Example 5

The method of example 4, wherein an HEVC layered video sub-bitstream contains multiple HEVC video layer sub-bitstreams that contain VCL NAL units with the same value of nuh_layer_id (the layer identifier) and their associated non-VCL NAL units.

Example 6

A method of processing video data, the method comprising, for carriage of HEVC extension streams with an MPEG-2 sytem, when assembling HEVC layer pictures within an access unit from multiple streams in a T-STD or P-STD model, using hierarchy_ext_embedded_layer_index values indicated in an associated hierarchy extension descriptor to identify the reference layers required for decoding the output layers of a current operation point.

Example 7

A method of processing video data, the method comprising, for carriage of HEVC extension streams with an MPEG-2 system, using HEVC timing and an HRD descriptor as in the current HEVC MPEG-2 systems for at least some operation points.

Example 8

The method of example 7, wherien the HEVC timing and an HRD descriptor may be presented for each operation point.

Example 9

The method of example 7, further comprising using, in an HEVC extension descriptor, in the loop of each operation point, an HEVC timing and HRD descriptor.

Example 10

The method of any of examples 7-9, wherein such an HEVC timing and HRD descriptor is only present once for operation points sharing the same layer identifier set of the layers to be decoded.

Example 11

The method of any of examples 7-9, wherein such an HEVC timing and HRD descriptor is only present once for all operation points of all output layer sets.

Example 12

A method of processing video data, the method comprising, for carriage of HEVC extension streams with an MPEG-2 sytem, using a layer picture delimiter NAL unit.

Example 13

The method of example 12, wherein the layer picture delimiter NAL unit contains the same syntax structure as the NAL unit header in HEVC and has the following syntax elements: forbidden_zero_bit, nal_unit_type, nuh_layer_id, and nuh_temporal_id_plus1.

Example 14

The method of example 12, wherein the nal_unit_type of the layer picture delimiter NAL unit is set to be 0x30 (i.e. 48).

Example 15

The method of example 12, wherein a different NAL unit type in the range of 0x30 to 0x3F, inclusive (i.e. 48 to 63, inclusive), which are marked as "unspecified" in the HEVC specification, is used for the layer picture delimiter NAL unit.

Example 16

The method of example 12, wherein values of nuh_layer_id and nuh_temporal_id_plus1 are set equal to those of the associated picture for which the VCL NAL units immediately follow the layer picture delimiter NAL unit.

Example 17

The method of example 16, wherein, in each elementary stream with stream_type equal to 0x26, exactly one LPD_nal_unit may precede all the NAL units with the values of nuh_layer_id and nuh_temporal_id_plus1 equal to those of the LPD_nal_unit.

Example 18

The method of example 16, wherein values of nuh_layer_id and nuh_temporal_id_plus1 are fixed to be 0 and 0.

Example 19

The method of example 16, wherein nuh_temporal_id_plus1 is set to be 0 to indicate this NAL unit is a layer picture delimiter NAL unit.

Example 20

The method of example 16, wherien, in each elementary stream with stream_type equal to 0x26, exactly one LPD_nal_unit may precede all the NAL units with the value of nuh_layer_id equal to that of the LPD_nal_unit.

Example 21

The method of example 16, wherein, in each elementary stream with stream_type equal to 0x26, exactly one LPD_nal_unit may precede all the NAL units with the value belonging to a HEVC layer identifier set, the minimum value of which is equal to the nuh_layer_id of the LPD_nal_unit.

Example 22

A method of assembling video data comprising any combination of the methods of examples 1-21.

Example 23

A method comprising any combination of the methods of examples 1-21.

Example 24

A device for processing video data, the device comprising: a memory storing video data; and one or more processors configured to perform the method of any of examples 1-23.

Example 25

The device of example 24, wherein the device is a video decoder.

Example 26

The device of example 24, wherein the device is a video encoder.

Example 27

The device of example 24, wherein the device is a bitstream splicing device.

Example 28

The device of example 24, wherein the device is a media aware network element.

Example 29

A device for processing video data, the device comprising means for performing the method of any of examples 1-23.

Example 30

The device of example 29, wherein the device comprising a video encoder or video decoder.

Example 31

A non-transitory computer-readable storage medium comprising instructions to cause one or more processors of a video processing device to perform the method of any of examples 1-23.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving a video data stream comprising a plurality of elementary streams and a program map table (PMT) separate from the plurality of elementary streams, the PMT comprising information about which of the elementary streams comprises a program, the PMT including a High Efficiency Video Coding (HEVC) extension descriptor, and the PMT including a plurality of hierarchy extension descriptors, wherein:
the HEVC extension descriptor signals a current operation point that corresponds to an output layer set, the HEVC extension descriptor comprising a maximum temporal identifier syntax element and a set of output layer flags, the maximum temporal identifier syntax element indicating a highest temporal identifier of Network Abstraction Layer (NAL) units in the current operation point, each output layer flag in the set of output layer flags indicating whether a different corresponding layer is in the output layer set of the current operation point, and the set of output layer flags including at least one output layer flag indicating the corresponding layer is not in the output layer set of the current operation point,
each respective hierarchy extension descriptor of the plurality of hierarchy extension descriptors corresponds to a respective elementary stream in the plurality of elementary streams, each respective elementary stream of the plurality of elementary streams being a HEVC extension video stream in an MPEG-2 system, the hierarchy extension descriptors comprising respective sets of values,
for each respective hierarchy extension descriptor of the plurality of hierarchy extension descriptors, the respective hierarchy extension descriptor includes a respective number of embedded layers element specifying a number of direct dependent program elements that need to be accessed and be present in decoding order before decoding of the elementary stream corresponding to the respective hierarchy extension descriptor, a total number of values in the respective set of values is equal to the number specified by the respective number of embedded layers element, each value in the respective set of values defines a hierarchy layer index of a different program element that needs to be accessed and be present in decoding order before decoding the elementary stream corresponding to the respective hierarchy extension descriptor, and
for at least a particular hierarchy extension descriptor of the plurality of hierarchy extension descriptors, the respective number of embedded layers element of the particular hierarchy extension descriptor indicates that there are two or more direct dependent program elements that need to be accessed and be present in decoding order before decoding of the elementary stream corresponding to the respective hierarchy extension descriptor;
assembling, in a buffer model, HEVC layer pictures within an access unit from the plurality of elementary streams of the video data stream, wherein:
the buffer model is a transport stream system target decoder model or a program stream system target decoder model,
the video data stream is a transport stream or a program stream, and
the same buffer model is used to assemble the HEVC layer pictures within the access unit regardless of whether the elementary streams in the plurality of elementary streams contain any of a plurality of different types of multi-layer coded bitstreams, and
assembling the HEVC layer pictures within the access unit comprises identifying, based on the sets of values in the hierarchy extension descriptors, a plurality of reference layers required for decoding the output layer set of the current operation point; and
decoding the access unit.

2. The method of claim 1, wherein the plurality of different types of multi-layer coded bitstreams include Scalable High Efficiency Video Coding (SHVC), Multi-View HEVC (MV-HEVC), and 3D-HEVC bitstreams.

3. The method of claim 1, further comprising:
assembling HEVC layer pictures within access units using separate instances of the buffer model for each respective HEVC layered video stream of the video data stream, wherein:
each respective HEVC layered video stream comprises a plurality of HEVC video layer sub-bitstreams, and
each respective HEVC video layer sub-bitstream of the plurality of HEVC video layer sub-bitstreams comprises Video Coding Layer (VCL) Network Abstraction Layer (NAL) units with a same layer identifier value.

4. The method of claim 1, wherein:
for each respective elementary stream associated with the program:
the buffer model comprises a buffer for the respective elementary stream,
the access unit comprises a respective HEVC layer picture subset for the respective elementary stream,
the respective HEVC layer picture subset for the respective elementary stream comprises HEVC layer pictures within the access unit that are associated with a respective layer identifier set,
each of the HEVC layer pictures within the access unit is a coded picture as defined in Rec. ITU-T H.265|ISO/IEC 23008-2 Annex F, and
assembling the HEVC layer pictures within the access unit comprises, for each respective elementary stream associated with the program:

removing the respective HEVC layer picture subset for the respective elementary stream from the buffer for the respective elementary stream; and including the respective HEVC layer picture subset for the respective elementary stream in the access unit.

5. The method of claim 4, wherein:

the video data stream is a transport stream, for each respective elementary stream associated with the program:

the buffer for the respective elementary stream is a first buffer for the respective elementary stream, the buffer model comprises a second buffer for the respective elementary stream; and the method further comprises, for each respective packetized elementary stream (PES) packet of the transport stream belonging to the respective elementary stream, storing the respective PES packet in the second buffer for the respective elementary stream.

6. The method of claim 5, wherein:

for each respective elementary stream associated with the program:

the buffer model comprises a third buffer for the respective elementary stream; and the method further comprises:

removing PES packets from the second buffer for the respective elementary stream;

storing, in the third buffer for the respective elementary stream, the PES packets removed from the second buffer for the respective elementary stream;

removing bytes from the third buffer for the respective elementary stream; and storing, in the first buffer for the respective elementary stream, the bytes removed from the third buffer for the respective elementary stream.

7. The method of claim 1, wherein:

the method further comprises, responsive to determining that there is a set of HEVC layers in the program and that there is at least one HEVC layered video sub-bitstream in the plurality of elementary streams that is an HEVC extension video stream conforming to one or more profiles as defined in Annex G or Annex H of ITU-T Rec. H.265|ISO/IEC 23008-2, selecting the buffer model to use in assembling the HEVC layer pictures within the access unit.

8. A video decoding device comprising:

a memory configured to store video data; and one or more processors configured to:

receive a video data stream comprising a plurality of elementary streams and a program map table (PMT) separate from the plurality of elementary streams, the PMT comprising information about which of the elementary streams comprises a program, the PMT including a High Efficiency Video Coding (HEVC) extension descriptor, and the PMT including a plurality of hierarchy extension descriptors, wherein:

the HEVC extension descriptor signals a current operation point that corresponds to an output layer set, the HEVC extension descriptor comprising a maximum temporal identifier syntax element and a set of output layer flags, the maximum temporal identifier syntax element indicating a highest temporal identifier of Network Abstraction Layer (NAL) units in the current operation point, each output layer flag in the set of output layer flags indicating whether a different corresponding layer is in the output layer set of the current operation point, and the set of output layer flags including at least one output layer flag indicating the corresponding layer is not in the output layer set of the current operation point, each respective hierarchy extension descriptor of the plurality of hierarchy extension descriptors corresponds to a respective elementary stream in the plurality of elementary streams, each respective elementary stream of the plurality of elementary streams being a HEVC extension video stream in an MPEG-2 system, the hierarchy extension descriptors comprising respective sets of values, for each respective hierarchy extension descriptor of the plurality of hierarchy extension descriptors, the respective hierarchy extension descriptor includes a respective number of embedded layers element specifying a number of direct dependent program elements that need to be accessed and be present in decoding order before decoding of the elementary stream corresponding to the respective hierarchy extension descriptor, a total number of values in the respective set of values is equal to the number specified by the respective number of embedded layers element, each value in the respective set of values defines a hierarchy layer index of a different program element that needs to be accessed and be present in decoding order before decoding the elementary stream corresponding to the respective hierarchy extension descriptor, and for at least a particular hierarchy extension descriptor of the plurality of hierarchy extension descriptors, the respective number of embedded layers element of the particular hierarchy extension descriptor indicates that there are two or more direct dependent program elements that need to be accessed and be present in decoding order before decoding of the elementary stream corresponding to the respective hierarchy extension descriptor;

assemble, in a buffer model, HEVC layer pictures within an access unit from the plurality of elementary streams of the video data stream, wherein:

the buffer model is a transport stream system target decoder model or a program stream system target decoder model, the video data stream is a transport stream or a program stream, and the same buffer model is used to assemble the HEVC layer pictures within the access unit regardless of whether the elementary streams in the plurality of elementary streams contain any of a plurality of different types of multi-layer coded bitstreams, and assembling the HEVC layer pictures within the access unit comprises identifying, based on the sets of values in the hierarchy extension descriptors, a plurality of reference layers required for decoding the output layer set of the current operation point; and decode the access unit.

9. The video decoding device of claim 8, wherein the plurality of different types of multi-layer coded bitstreams include Scalable High Efficiency Video Coding (SHVC), Multi-View HEVC (MV-HEVC), and 3D-HEVC bitstreams.

10. The video decoding device of claim 8, wherein the one or more processors are configured to assemble HEVC layer pictures within access units using separate instances of the buffer model for each respective HEVC layered video stream of the video data stream, wherein:

each respective HEVC layered video stream comprises a plurality of HEVC video layer sub-bitstreams, and each respective HEVC video layer sub-bitstream of the plurality of HEVC video layer sub-bitstreams comprises Video Coding Layer (VCL) Network Abstraction Layer (NAL) units with a same layer identifier value.

11. The video decoding device of claim 8, wherein:

for each respective elementary stream associated with the program:

the buffer model comprises a buffer for the respective elementary stream, the access unit comprises a respective HEVC layer picture subset for the respective elementary stream, the respective HEVC layer picture subset for the respective elementary stream comprises HEVC layer pictures within the access unit that are associated with a respective layer identifier set, each of the HEVC layer pictures within the access unit is a coded picture as defined in Rec. ITU-T H.265|ISO/IEC 23008-2 Annex F, and as part of assembling the HEVC layer pictures within the access unit, the one or more processors, for each respective elementary stream associated with the program:

remove the respective HEVC layer picture subset for the respective elementary stream from the buffer for the respective elementary stream; and include the respective HEVC layer picture subset for the respective elementary stream in the access unit.

12. The video decoding device of claim 11, wherein:

the video data stream is a transport stream, for each respective elementary stream associated with the program:

the buffer for the respective elementary stream is a first buffer for the respective elementary stream, the buffer model comprises a second buffer for the respective elementary stream; and the one or more processors are configured to, for each respective packetized elementary stream (PES) packet of the transport stream belonging to the respective elementary stream, store the respective PES packet in the second buffer for the respective elementary stream.

13. The video decoding device of claim 12, wherein:

for each respective elementary stream associated with the program:

the buffer model comprises a third buffer for the respective elementary stream; and the one or more processors are configured to:

remove PES packets from the second buffer for the respective elementary stream;

store, in the third buffer for the respective elementary stream, the PES packets removed from the second buffer for the respective elementary stream;

remove bytes from the third buffer for the respective elementary stream; and store, in the first buffer for the respective elementary stream, the bytes removed from the third buffer for the respective elementary stream.

14. The video decoding device of claim 8, wherein:

the one or more processors are further configured to, responsive to determining that there is a set of HEVC layers in the program and that there is at least one HEVC layered video sub-bitstream in the plurality of elementary streams that is an HEVC extension video stream conforming to one or more profiles as defined in Annex G or Annex H of ITU-T Rec. H.265|ISO/IEC 23008-2, select the buffer model to use in assembling the HEVC layer pictures within the access unit.

15. A video decoding device comprising:

means for receiving a video data stream comprising a plurality of elementary streams and a program map table (PMT) separate from the plurality of elementary streams, the PMT comprising information about which of the elementary streams comprises a program, the PMT including a High Efficiency Video Coding (HEVC) extension descriptor, and the PMT including a plurality of hierarchy extension descriptors, wherein:

the HEVC extension descriptor signals a current operation point that corresponds to an output layer set, the HEVC extension descriptor comprising a maximum temporal identifier syntax element and a set of output layer flags, the maximum temporal identifier syntax element indicating a highest temporal identifier of Network Abstraction Layer (NAL) units in the current operation point, each output layer flag in the set of output layer flags indicating whether a different corresponding layer is in the output layer set of the current operation point, and the set of output layer flags including at least one output layer flag indicating the corresponding layer is not in the output layer set of the current operation point, each respective hierarchy extension descriptor of the plurality of hierarchy extension descriptors corresponds to a respective elementary stream in the plurality of elementary streams, each respective elementary stream of the plurality of elementary streams being a HEVC extension video stream in an MPEG-2 system, the hierarchy extension descriptors comprising respective sets of values, for each respective hierarchy extension descriptor of the plurality of hierarchy extension descriptors, the respective hierarchy extension descriptor includes a respective number of embedded layers element specifying a number of direct dependent program elements that need to be accessed and be present in decoding order before decoding of the elementary stream corresponding to the respective hierarchy extension descriptor, a total number of values in the respective set of values is equal to the number specified by the respective number of embedded layers element, each value in the respective set of values defines a hierarchy layer index of a different program element that needs to be accessed and be present in decoding order before decoding the elementary stream corresponding to the respective hierarchy extension descriptor, and for at least a particular hierarchy extension descriptor of the plurality of hierarchy extension descriptors, the respective number of embedded layers element of the particular hierarchy extension descriptor indicates that there are two or more direct dependent program elements that need to be accessed and be present in decoding order before decoding of the elementary stream corresponding to the respective hierarchy extension descriptor;

means for assembling, in a buffer model, HEVC layer pictures within an access unit from the plurality of elementary streams of the video data stream, wherein:

the buffer model is a transport stream system target decoder model or a program stream system target decoder model, the video data stream is a transport stream or a program stream, and the same buffer model is used to assemble the HEVC layer pictures within the access unit regardless of whether the elementary streams in the plurality of elementary streams contain any of a plurality of different types of multi-layer coded bitstreams, and assembling the HEVC layer pictures within the access unit comprises identifying, based on the sets of values in the hierarchy extension descriptors, a plurality of reference layers required for decoding the output layer set of the current operation point; and means for decoding the access unit, the access unit comprising one or more pictures of the video data.

16. The video decoding device of claim 15, wherein the plurality of different types of multi-layer coded bitstreams include Scalable High Efficiency Video Coding (SHVC), Multi-View HEVC (MV-HEVC), and 3D-HEVC bitstreams.

17. The video decoding device of claim 15, further comprising:

means for assembling HEVC layer pictures within access units using separate instances of the buffer model for each respective HEVC layered video stream of the video data stream, wherein:

each respective HEVC layered video stream comprises a plurality of HEVC video layer sub-bitstreams, and each respective HEVC video layer sub-bitstream of the plurality of HEVC video layer sub-bitstreams comprises Video Coding Layer (VCL) Network Abstraction Layer (NAL) units with a same layer identifier value.

18. The video decoding device of claim 15, wherein:

for each respective elementary stream associated with the program:

the buffer model comprises a buffer for the respective elementary stream, the access unit comprises a respective HEVC layer picture subset for the respective elementary stream, the respective HEVC layer picture subset for the respective elementary stream comprises HEVC layer pictures within the access unit that are associated with a respective layer identifier set, each of the HEVC layer pictures within the access unit is a coded picture as defined in Rec. ITU-T H.265|ISO/IEC 23008-2 Annex F, and the means for assembling the HEVC layer pictures within the access unit comprises, means for, for each respective elementary stream associated with the program:

removing the respective HEVC layer picture subset for the respective elementary stream from the buffer for the respective elementary stream; and including the respective HEVC layer picture subset for the respective elementary stream in the access unit.

19. The video decoding device of claim 18, wherein:

the video data stream is a transport stream, for each respective elementary stream associated with the program:

the buffer for the respective elementary stream is a first buffer for the respective elementary stream, the buffer model comprises a second buffer for the respective elementary stream; and the video decoding device further comprises means for storing, for each respective packetized elementary stream (PES) packet of the transport stream belonging to the respective elementary stream, the respective PES packet in the second buffer for the respective elementary stream.

20. The video decoding device of claim 19, wherein:

for each respective elementary stream associated with the program:

the buffer model comprises a third buffer for the respective elementary stream; and the video decoding device further comprises:

means for removing PES packets from the second buffer for the respective elementary stream;

means for storing, in the third buffer for the respective elementary stream, the PES packets removed from the second buffer for the respective elementary stream;

means for removing bytes from the third buffer for the respective elementary stream; and means for storing, in the first buffer for the respective elementary stream, the bytes removed from the third buffer for the respective elementary stream.

21. The video decoding device of claim 15, wherein:

the video decoding device further comprises, means for selecting, responsive to determining that there is a set of HEVC layers in the program and that there is at least one HEVC layered video sub-bitstream in the plurality of elementary streams that is an HEVC extension video stream conforming to one or more profiles as defined in Annex G or Annex H of ITU-T Rec. H.265|ISO/IEC 23008-2, the buffer model to use in assembling the HEVC layer pictures within the access unit.

22. A computer-readable data storage medium having instructions stored thereon that, when executed, cause a video decoding device to:

receive a video data stream comprising a plurality of elementary streams and a program map table (PMT) separate from the plurality of elementary streams, the PMT comprising information about which of the elementary streams comprises a program, the PMT including a High Efficiency Video Coding (HEVC) extension descriptor, and the PMT including a plurality of hierarchy extension descriptors, wherein:

the HEVC extension descriptor signals a current operation point that corresponds to an output layer set, the HEVC extension descriptor comprising a maximum temporal identifier syntax element and a set of output layer flags, the maximum temporal identifier syntax element indicating a highest temporal identifier of Network Abstraction Layer (NAL) units in the current operation point, each output layer flag in the set of output layer flags indicating whether a different corresponding layer is in the output layer set of the current operation point, and the set of output layer flags including at least one output layer flag indicating the corresponding layer is not in the output layer set of the current operation point, each respective hierarchy extension descriptor of the plurality of hierarchy extension descriptors corresponds to a respective elementary stream in the plurality of elementary streams, each respective elementary stream of the plurality of elementary streams being a HEVC extension video stream in an MPEG-2 system, the hierarchy extension descriptors comprising respective sets of values, for each respective hierarchy extension descriptor of the plurality of hierarchy extension descriptors, the respective hierarchy extension descriptor includes a respective number of embedded layers element specifying a number of direct dependent program elements that need to be accessed and be present in decoding order before decoding of the elementary stream corresponding to the respective hierarchy extension descriptor, a total number of values in the respective set of values is equal to the number specified by the respective number of embedded layers element, each value in the respective set of values defines a hierarchy layer index of a different program element that needs to be accessed and be present in decoding order before decoding the elementary stream corresponding to the respective hierarchy extension descriptor, and for at least a particular hierarchy extension descriptor of the plurality of hierarchy extension descriptors, the respective number of embedded layers element of the particular hierarchy extension descriptor indicates that there are two or more direct dependent program elements that need to be accessed and be present in decoding order before decoding of the elementary stream corresponding to the respective hierarchy extension descriptor;

assemble, in a buffer model, HEVC layer pictures within an access unit from the plurality of elementary streams of the video data stream, wherein:

the buffer model is a transport stream system target decoder model or a program stream system target decoder model, the video data stream is a transport stream or a program stream, and the same buffer model is used to assemble the HEVC layer pictures within the access unit regardless of whether the elementary streams in the plurality of elementary streams contain any of a plurality of different types of multi-layer coded bitstreams, and assembling the HEVC layer pictures within the access unit comprises identifying, based on the sets of values in the hierarchy extension descriptors, a plurality of reference layers required for decoding the output layer set of the current operation point; and decode the access unit.

23. The computer-readable data storage medium of claim 22, wherein the plurality of different types of multi-layer coded bitstreams include Scalable High Efficiency Video Coding (SHVC), Multi-View HEVC (MV-HEVC), and 3D-HEVC bitstreams.

24. The computer-readable data storage medium of claim 22, the instructions further causing the video decoding device to:

assemble HEVC layer pictures within access units using separate instances of the buffer model for each respective HEVC layered video stream of the video data stream, wherein:

each respective HEVC layered video stream comprises a plurality of HEVC video layer sub-bitstreams, and each respective HEVC video layer sub-bitstream of the plurality of HEVC video layer sub-bitstreams comprises Video Coding Layer (VCL) Network Abstraction Layer (NAL) units with a same layer identifier value.

25. The computer-readable data storage medium of claim 22, wherein:

for each respective elementary stream associated with the program:

the buffer model comprises a buffer for the respective elementary stream, the access unit comprises a respective HEVC layer picture subset for the respective elementary stream, the respective HEVC layer picture subset for the respective elementary stream comprises HEVC layer pictures within the access unit that are associated with a respective layer identifier set, each of the HEVC layer pictures within the access unit is a coded picture as defined in Rec. ITU-T H.265|ISO/IEC 23008-2 Annex F, and as part of assembling the HEVC layer pictures within the access unit, for each respective elementary stream associated with the program, the instructions cause the video decoding device to:

remove the respective HEVC layer picture subset for the respective elementary stream from the buffer for the respective elementary stream; and include the respective HEVC layer picture subset for the respective elementary stream in the access unit.

26. The computer-readable data storage medium of claim 25, wherein:

the video data stream is a transport stream, for each respective elementary stream associated with the program:

the buffer for the respective elementary stream is a first buffer for the respective elementary stream, the buffer model comprises a second buffer for the respective elementary stream; and the instructions further cause the video decoding device to store, for each respective packetized elementary stream (PES) packet of the transport stream belonging to the respective elementary stream, the respective PES packet in the second buffer for the respective elementary stream.

27. The computer-readable data storage medium of claim 26, wherein:

for each respective elementary stream associated with the program:

the buffer model comprises a third buffer for the respective elementary stream; and the instructions further cause the video decoding device to:

remove PES packets from the second buffer for the respective elementary stream;

store, in the third buffer for the respective elementary stream, the PES packets removed from the second buffer for the respective elementary stream;

remove bytes from the third buffer for the respective elementary stream; and store, in the first buffer for the respective elementary stream, the bytes removed from the third buffer for the respective elementary stream.

28. The computer-readable data storage medium of claim 22, wherein:

the instructions further cause the video decoding device to select, responsive to determining that there is a set of HEVC layers in the program and that there is at least one HEVC layered video sub-bitstream in the plurality of elementary streams that is an HEVC extension video stream conforming to one or more profiles as defined in Annex G or Annex H of ITU-T Rec. H.265|ISO/IEC 23008-2, the buffer model to use in assembling the HEVC layer pictures within the access unit.

* * * * *